(12) United States Patent
Hozumi et al.

(10) Patent No.: US 7,474,472 B2
(45) Date of Patent: Jan. 6, 2009

(54) ZOOM LENS, AND IMAGING SYSTEM COMPRISING THE SAME

(75) Inventors: Kouki Hozumi, Shibuya-ku (JP); Masato Miyata, Shibuya-ku (JP); Tomoyuki Satori, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 36 days.

(21) Appl. No.: 11/810,362

(22) Filed: Jun. 4, 2007

(65) Prior Publication Data

US 2007/0279759 A1    Dec. 6, 2007

(30) Foreign Application Priority Data

Jun. 6, 2006    (JP)    ............................. 2006-156979

(51) Int. Cl.
*G02B 15/14*    (2006.01)

(52) U.S. Cl. ........................ 359/695; 359/708; 359/761; 359/770; 359/781; 359/787

(58) Field of Classification Search ................ 359/695, 359/708, 761, 770, 781, 786, 787
See application file for complete search history.

(56) References Cited

U.S. PATENT DOCUMENTS

| 5,009,491 | A | 4/1991 | Hata |
| 6,304,389 | B1 | 10/2001 | Shibayama |
| 6,396,642 | B2 | 5/2002 | Takatsuki |
| 6,930,839 | B2 * | 8/2005 | Hagimori et al. ............ 359/684 |

FOREIGN PATENT DOCUMENTS

| JP | 1-40913 | 2/1989 |
| JP | 04-114116 | 4/1992 |
| JP | 2001-42218 | 2/2001 |
| JP | 2001-208969 | 8/2001 |
| JP | 2004-318099 | 11/2004 |

* cited by examiner

*Primary Examiner*—Joseph Martinez
(74) *Attorney, Agent, or Firm*—Kenyon & Kenyon LLP

(57) ABSTRACT

The invention relates to a zoom lens favorable for offering a tradeoff between slimming down a lens system upon received in an associated lens mount and making sure a small F-number. There is a zoom lens provided, which comprises, in order from its object side, a first lens group G1 having negative refracting power, a second lens group G2 having positive refracting power, and a third lens group G3 having positive refracting power. Upon zooming from a wide-angle end to a telephoto end, the first second and third lens groups G1, G2 and G3 each move along an optical axis while a spacing between the first lens group and the second lens group becomes narrow and a spacing between the second lens group and the third lens group becomes wide. The first lens group G1 comprises one single lens that is a double-concave negative lens or two lenses: a double-concave negative lens and a positive lens. The second lens group G2 comprises two positive lenses and one negative lens. At least one of the positive lenses has an aspheric lens surface. The zoom lens satisfies condition (1) that defines the relation between the total length of the lens system and the height of a marginal ray at the entrance surface in the first lens group G1.

24 Claims, 34 Drawing Sheets

- 61 Focal length changing button
- 45 Shutter button
- 46 Flash
- 40 Camera
- 43 Finder optical system
- 60 Cover
- 41 Taking optical system
- 42 Taking optical path
- 44 Finder optical path

- 45 Shutter button
- 43 Finder optical system
- 61 Focal length changing button
- 62 Mode changing switch
- 47 Liquid crystal display monitor

ZOOM LENS, AND IMAGING SYSTEM COMPRISING THE SAME

This application claims benefit of Japanese Application No. 2006-156979 filed in Japan on Jun. 6, 2006, the contents of which are incorporated by this reference.

BACKGROUND OF THE INVENTION

The present invention relates generally to a zoom lens and an imaging system comprising it, and more particularly to a fast zoom lens that works for slimming down upon received in an associated lens mount. The present invention is also concerned with an imaging system such as digital camera or video camera, which comprises an electronic imaging device adapted to convert an image formed on an imaging plane into electrical signals.

As recently developed digital cameras diminish in size, there is a growing demand for size reductions of the cameras when not in use; in particular, there is a strong demand for size reductions in the thickness direction. As a result, imaging optical systems for such cameras, too, are required to be received in their lens mounts thinly in the thickness direction when not in use.

On the other hand, as cameras become much smaller and imaging devices have much more pixels, the pixel pitch of the imaging devices grow by far finer, offering problems such as severe limits to sensitivity due to SN ratio drops, the likelihood of camera shakes and subject shakes, and so on.

There is also now on the market a great demand for cameras that can just only address such shake problems but also cope with a lot more photographic applications than would be possible with prior art cameras and can take images of low-luminance subjects as well.

Possible approaches to these problems include a method of reducing camera shakes by means of a mechanical correction mechanism, a method of enhancing the sensitivity of an imaging device, thereby achieving faster shutter speeds, or the like.

With the method of correcting shakes by mechanical movement of a part of taking lenses or an imaging device, however, there is an extended exposure time that results in the inability to cope with subject shakes. To address this, there is a complicated control mechanism needed (for instance, the need of moving a taking position following a subject movement, the need for control of images by electrical computation processing after taking).

On the other hand, imparting high sensitivity to the imaging device may cope with both subject shakes and camera shakes; however, there is image quality degradation likely to be caused by noises from the imaging device.

Therefore, if the F-number of a taking lens is made so small (fast) that the quantity of light incident on the imaging device is increased, it would be effective for providing a solution to these problems.

With a prior art fast zoom lens having a minimum F-number of as small as 1.8, however, there is still much difficulty in ensuring that it is received in the associated lens mount thinly enough to be mounted on a compact camera.

Therefore, the primary object of the invention as described below is to provide a fast zoom lens having an F-number small enough to be mounted on a slimmed-down compact camera.

As well known generally in the art, the zoom lens type that the first lens group has positive refracting power is favorable for those having a small F-number. However, this type of zoom lens is found to work against being stowed away in the associated lens mount when not in use, because the first lens group grows large in the diametrical direction, and tends to increase in the number of lenses involved.

Optical system arrangements known to be put away compactly when not in use include the zoom lens type wherein the first lens group has negative refracting power.

This type of zoom lens, because of being put away more thinly than a zoom lens of the type having a lens group of negative refracting power first, is used with most slimmed-down compact cameras.

With conventional zoom lenses of the type having the lens group of negative refracting power first, however, there is still no sensible tradeoff between size reductions upon stowed in the lens mounts and a small F-number.

For instance, the zoom lenses of Patent Publication 1 that would seem to comprise fewer lenses and make sure a slimmed-down lens mount have an F-number of as large as about 2.9. For this reason, they are not suited for obtaining plenty of light quantity.

On the other hand, all zoom lenses having a small F-number, described in Patent Publications 2, 3, 4 and 5, comprise a lot more lenses, and so have difficulty in being stowed away in the associated lens mounts.

Patent Publication 1
JP(A)2004-318099
Patent Publication 2
JP(A)4-114116
Patent Publication 3
JP (A)1-40913
Patent Publication 4
JP(A)2001-42218
Patent Publication 5
JP(A)2001-208969

SUMMARY OF THE INVENTION

In view of such problems with the prior art as described above, the present invention has for its object the provision of a zoom lens that works for offering a sensible tradeoff between the slimming-down of a lens system upon received in a lens mount and a small F-number.

Another object of the present invention is to provide a slimmed-down imaging system due to the thinness of the zoom lens upon received in an associated lens mount.

According to the first aspect of the invention, the aforesaid objects are achieved by the provision of a zoom lens comprising, in order from its object side, a first lens group having negative refracting power, a second lens group having positive refracting power, and a third lens group having positive refracting power, wherein upon zooming from a wide-angle end to a telephoto end, said first lens group, said second lens group and said third lens group each move along an optical axis while a spacing between said first lens group and said second lens group becomes narrow and a spacing between said second lens group and said third lens group becomes wide, said first lens group comprises one single lens that is a double-concave negative lens or two lenses: a double-concave negative lens and a positive lens, said second lens group comprises two positive lenses and one negative lens wherein at least one of said positive lenses has an aspheric lens surface, and characterized in that the following condition (1) is satisfied:

$$16 < C_{jw}/h_{1w} < 23 \qquad (1)$$

where $h_{1w}$ is the height of an axial marginal ray at an entrance surface in the first lens group at the wide-angle end and upon focusing on the farthest distance, and $C_{jw}$ is a length on the optical axis from the entrance surface in the first lens group and upon focusing at the farthest distance to an image plane.

According to the second aspect of the invention, there is a zoom lens provided, which comprises, in order from its object side, a first lens group having negative refracting power, a second lens group having positive refracting power, and a third lens group having positive refracting power, wherein upon zooming from a wide-angle end to a telephoto end, said first lens group, said second lens group and said third lens group each move along an optical axis while a spacing between said first lens group and said second lens group becomes narrow and a spacing between said second lens group and said third lens group becomes wide, said first lens group comprises one single lens that is a double-concave negative lens or two lenses: a double-concave negative lens and a positive lens, said second lens group comprises two positive lenses and one negative lens wherein at least one of said positive lenses has an aspheric lens surface, and which is characterized in that the following condition (5) is satisfied:

$$1.5 < f_2/f_w < 1.9 \quad (5)$$

where $f_2$ is the focal length of the second lens group, and $f_w$ is the focal length of the whole zoom lens system at the wide-angle end and upon focusing at the farthest distance.

According to the third aspect of the invention, there is a zoom lens provided, which comprises, in order from its object side, a first lens group having negative refracting power, a second lens group having positive refracting power, and a third lens group having positive refracting power, wherein upon zooming from a wide-angle end to a telephoto end, said first lens group, said second lens group and said third lens group each move along an optical axis while a spacing between said first lens group and said second lens group becomes narrow and a spacing between said second lens group and said third lens group becomes wide, said first lens group comprises one single lens that is a double-concave negative lens or two lenses: a double-concave negative lens and a positive lens, said second lens group comprises two positive lenses and one negative lens wherein at least one of said positive lenses has an aspheric lens surface, and which is characterized in that the following condition (8) is satisfied:

$$0.4 < h_{1w}/IH < 0.5 \quad (8)$$

where $h_{1w}$ is the height of an axial marginal ray at an entrance surface in the first lens group at the wide-angle end and upon focusing on the farthest distance, and IH is the maximum image height.

The requirements for, and the advantages of, the aforesaid arrangements of the invention are now explained.

Throughout the first, second and third aspects of the invention, the zoom lens is of the lens type that comprises, in order from its object side, a first lens group having negative refracting power, a second lens group having positive refracting power and a third lens group having positive refracting power.

And, the zoom lens of the invention works in the zooming mode that upon zooming from the wide-angle end to the telephoto end, the first lens group, the second lens group and the third lens group each move along the optical axis with the spacing between the first lens group and the second lens group becoming narrow and the spacing between the second lens group and the third lens group becoming wide.

And then, the first lens group is made up of one single lens that is a double-concave negative lens, or two lenses: a double-concave negative lens and a positive lens, and the second lens group is made up of two positive lenses and one negative lens wherein at least one of two such positive lenses has an aspheric lens surface.

Thus, if the zoom lens of the invention is of the type that has the negative lens group first: the first lens group having negative refracting power, the diameter of the first lens group is then kept small enough to achieve size reductions.

And if two positive lens groups, each having positive refracting power, located subsequent to the first lens group are designed to work in the aforesaid zooming mode, it then allows the second lens group to have a zooming function and the third lens group to have an imaging adjustment function.

In this time, if the first, second and third lens groups are each designed to move, it is then easy to adjust the influences of higher-order spherical aberrations and comae resulting from the elevations of rays incident on lens surfaces in the zoom lens having a small F-number.

And, if the first lens group is made up of a single lens that is a double-concave negative lens, or two lenses: a double-concave negative lens and a positive lens, it then works for offering fairly good balances between the size reduction of the zoom lens received in a lens mount and aberrations.

At the first lens group, an off-axis beam near the wide-angle end gains height. Therefore, if the lens components of the first lens group are reduced as much as possible to reduce its axial thickness, it then works for size reductions. In other words, as more lenses are used for the first lens group, it works against size reductions, because the object-side effective diameter of the first lens group grows too large, rendering the axial or off-axis thickness of the lenses or an air lens likely to become large.

Further, if the negative lens is configured into a double-concave shape, it is then easy to prevent projection of the lens periphery with respect to the lens center, thereby holding back an increase in the thickness of the first lens group. Furthermore, the lens arrangement having a small F-number makes sure there are axial marginal rays gaining height, but it shows up the influences of spherical aberrations and comae. Therefore, if the entrance surface of the negative lens in the first lens group is concaved as mentioned above, it allows the entrance surface of the negative lens in the first lens group to have negative power, thereby keeping the curvature of the surface of negative power from growing tight (the radius of curvature from becoming small). It is thus possible to hold back the generation of spherical aberrations and comae and, hence, facilitate keeping the whole aberration balance satisfactory.

If the first lens group is made up of one double-concave single lens, it works for the size reduction of the zoom lens upon received in a lens mount.

If the first lens group is made up of two lenses: a double-concave negative lens and a positive lens, it is then possible to reduce the influences of chromatic aberrations. (If that positive lens is in a meniscus form convex on the negative lens side, it is then possible to make the first lens group thin and favor the correction of aberrations as well.)

And then, the second lens group is made up of two positive lenses and one negative lens, and at least one of the positive lenses is designed to have an aspheric lens surface. This arrangement works for allowing the second lens group to have chiefly an imaging function and a zooming function. In other words, if the positive power of the second lens group is allocated to the two positive lenses, it is then easy to hold back the generation of spherical aberrations, etc. Here, if there is the negative lens located in the second lens group, it is then easy to cancel or otherwise correct spherical aberrations, longitudinal chromatic aberration, etc. occurring at the two positive lenses. The use of the aspheric surface in the positive lens works for correction of spherical aberrations and comae, in spite of the zoom lens having a small F-number. (As that aspheric surface is configured such that the refracting power becomes weaker at the periphery rather than at or near the optical axis, it works for correction of spherical aberrations and comae. The aspheric surface should preferably be used at the convex surface of the positive lens in the second lens group. More preferably, two or more aspheric surfaces should be used.)

And, the zoom lens according to the first aspect of the invention is characterized by satisfying the following condition (1).

$$16 < C_{jw}/h_{1w} < 23 \quad (1)$$

Here $h_{1w}$ is the height of an axial marginal ray at the entrance surface in the first lens group at the wide-angle end and upon focusing on the farthest distance, and $C_{jw}$ is an axial length from the entrance surface in the first lens group and upon focusing at the farthest distance to an image plane.

This condition defines a pertinent relation between the whole length of the lens system and the height of the marginal ray at the entrance surface in the first lens group for the purpose of receiving the zoom lens compactly in a lens mount while there is the good imaging performance maintained at the wide-angle end. With a zoom lens, as contemplated herein, of the type that has a lens group of negative refracting power first (located nearest to the object side), there is an increase in the height of axial marginal rays at the second and subsequent lens groups. By complying with at least the lower limit of 16 to condition (1), the height of axial marginal rays is kept low or the whole zoom lens length at the wide-angle end is kept short to reduce the refracting power at each lens group, so that the amount of spherical aberrations produced at both the first lens group and the second lens group is kept small enough to facilitate designing both longitudinal aberrations and off-axis aberrations. Otherwise, the amount of movement of the second lens group to let the second lens group exercise the desired zooming effect is kept small enough to facilitate making short the whole zoom lens length at the telephoto end.

Preferably by complying with at least the upper limit of 23 to condition (1), the F-number at the wide-angle end is prevented from becoming too large, thereby making sure brightness. Otherwise, the whole length of the zoom lens upon taking at the wide-angle end is kept so short that the amount of extension of the first lens group from the lens mount to the state of use is kept small, making the lens mount thin.

Further, it is preferable to satisfy the following condition (2).

$$16 < C_{jmax}/h_{1w} < 23 \quad (2)$$

Here $C_{jmax}$ is the longest of axial lengths from the entrance surface in the first lens group to the image plane in every state of use.

The maximum amount of extension of the lens mount is dependent on the longest full length of the zoom lens (the axial length from the entrance surface in the first lens group to the image plane) in every state of use. For the purpose of properly limiting the ring number and axial size of the lens mount needed for receiving the zoom lens, it is preferable to satisfy the aforesaid condition.

Preferably by complying with at least the lower limit of 16 to condition (2), the full length of the zoom lens in every state of use is kept from becoming short to make sure the desired zoom ratio and optical performance (the ability to correct aberrations). Also, preferably by the complying with at least the upper limit of 23 to condition (2), the maximum value of the full length of the zoom lens is kept small to reduce an increase in the ring number of the lens mount, or limit the size of the zoom lens in the axial direction.

It is noted that when the full length of the zoom lens (the axial length from the entrance surface in the first lens group to the image plane) becomes longest upon focusing at the wide-angle end and upon focusing on the farthest distance, it has the same meaning as condition (1).

Preferably, any one of the aforesaid embodiments of the zoom lens further comprises an aperture stop located somewhere from a space just before the second lens group up to a space just after the second lens group, and that aperture stop is configured in such a way as to move axially together with the second lens group at the time of zooming. This works for the diameter and size reductions of the zoom lens, and locating the exit pupil away from the image plane, thereby achieving well-balanced aberrations.

For instance, when there is the aperture stop in the rear of the third lens group, the entrance pupil position becomes deep at or near the wide-angle end (the distance from the entrance surface in the first lens group to the entrance pupil becomes long). For this reason, in an effort of making sure the angle of view and the quantity of ambient light in the image plane, the diameter of the lens forming the first lens group will become large with an increase in the (axial or peripheral) thickness of the first lens group. As a result, it will be difficult to receive the zoom lens compactly in the lens mount. Otherwise, the exit pupil will be likely to approach the image plane with an increase in the angle of incidence of off-axis beams on an imaging device, resulting in the likelihood of shading.

On the contrary, when there is the aperture stop located at or near the first lens group, the position of incidence of an off-axis light beam on the second lens group—that takes on a part of the imaging action—will become high, resulting in large changes in the position of incidence although depending on zooming operation. Consequently, it will be difficult to obtain good imaging performance while maintaining a small F-number all over the zoom range from the wide-angle end to the telephoto end.

For any one of the aforesaid embodiments of the zoom lens, it is preferable to satisfy the following condition (3).

$$0.25 < h_{1'w}/f_w < 0.4 \quad (3)$$

Here $h_{1'w}$ is the height of an axial marginal light ray at the exit surface in the first lens group upon focusing at the wide-angle end and upon focusing on the farthest distance, and $f_w$ is the focal length of the whole zoom lens system at the wide-angle end and upon focusing on the farthest distance.

This condition defines a pertinent relation between the focal length of the zoom lens at the wide-angle end and upon focusing on the farthest distance and the height of an axial marginal light ray at the exit surface in the first lens group. Preferably by complying with at least the upper limit of 0.4 to condition (3), the height of an axial marginal light ray at the exit side surface in the first lens group is limited to hold back spherical aberrations produced at the first lens group. Also, preferably by complying with at least the lower limit of 0.25 to condition (3), there is plenty of brightness ensured.

More preferably, there should be an aspheric surface located in the first lens group to hold back the generation of spherical aberrations. The first lens group is susceptible of large fluctuations of the height and angle of incidence of light rays in association with zooming; it is preferable to locate the aspheric surface in the first lens group in such a way as to lessen their influences on field curvature and distortion, thereby achieving well-balanced aberrations throughout the zoom lens system.

More specifically, it is preferable to use an aspheric surface configured such that the negative refracting power at or near the optical axis is larger than the refracting power at the periphery (weaker negative or positive power). That aspheric surface should then preferably be located at the object side surface of the double-concave negative lens, because there is a decrease in the distortion produced on the wide-angle side. More preferably, two or more such aspheric surfaces should be located at two or more concave surfaces in the first lens group, because it is possible to prevent their shape from going too far, thereby facilitating prevention of degradation of imaging performance due to decenteration.

For any one of the aforesaid zoom lenses, it is preferable to satisfy the following condition (4).

$$1.0 < \Sigma d/f_w < 2.2 \quad (4)$$

Here $\Sigma d$ is the total sum of the axial thickness of each lens group in the whole zoom lens system, and $f_w$ is the focal length of the whole zoom lens system at the wide-wide angle and upon focusing on the farthest distance.

This condition gives a definition of the sum of the thickness of each lens group to achieve the compact thickness of the zoom lens received in the lens mount. Preferably by complying with at least the upper limit of 2.2 to condition (4), the sum of the axial thickness of each lens group is limited to reduce the thickness of the lens mount at the time of receiving the zoom lens. Also, by complying with at least the lower limit of 1.0 to condition (4), it is preferable to make sure each lens group has a proper axial thickness, thereby easily taking hold of the positive refracting power of the second, and the third lens group. This in turn facilitates limiting the amount of movement of each lens group for obtaining the desired zoom ratio. As a result, size reductions of the lens mount parts needed for movement are favorably achievable.

For any one of the aforesaid zoom lenses, it is preferable to locate the fourth lens group comprising one aspheric lens on the image side with respect to the third lens group.

In the zoom lens of the invention, the first lens group has a simple arrangement made up of one double-concave negative lens or two lenses: a double-concave negative lens plus a positive lens. With such concave arrangement, it is possible to reduce the size of the zoom lens upon received in the lens mount and easily lessen the influences of spherical aberrations while maintaining the negative refracting power of the lens group. This is going to work for correction of spherical aberrations that is a key factor for zoom lenses having a small F-number; however, there is some difficulty in implementing correction of distortion and field curvature simultaneously with correction of spherical aberrations. For this reason, the fourth lens group composed of one aspheric lens is introduced on the image side of the third lens group, letting the fourth lens group take on correction of distortion and field curvature that are off-axis aberrations and, hence, placing the whole aberrations in a well-balanced state.

Further, it is more preferable for the fourth lens group to have paraxially positive or negative refracting power for aberration tweaks. (More specifically, as the aspheric surface is configured such that the refracting power is weaker at its periphery than at or near the optical axis, it is effective for correction of off-axis aberrations resulting from the first lens group having negative power. Such aspheric surface shape means that when it is a positive convex surface, the refracting power at or near the optical axis turns to a weak positive or negative one, and when it is a negative concave surface, the refracting power at or near the optical axis turns to a strong negative one at its periphery.)

For any one of the aforesaid zoom lenses, it is also preferable to move the third lens group in the axial direction, thereby implementing focusing operation from focusing on the farthest distance to focusing on a near distance. Such an inner focus mode by the movement of the third lens group makes the weight of the driving lens smaller than would be possible with the driving of the first lens group having an increased diameter, and enables faster focusing operation as well. Another advantage is that changes in the angle of view are more limited than could be possible with the second lens group as the focusing group.

Further, for slimming down the zoom lens upon received in the lens mount and reducing the weight load for focusing drive, it is preferable that the third lens group is made up of one positive lens or two lenses: a positive lens and a negative lens.

When there is the fourth lens group involved, it is preferable to move the third lens group and the fourth lens group with a constant or varying space between them, thereby implementing focusing operation from focusing on the farthest distance to focusing on a near distance. Such an inner focus mode by the movement of the third lens group makes the weight of the driving lens smaller than would be possible with the driving of the first lens group having an increased diameter, and enables faster focusing operation as well. Another advantage is that changes in the angle of view are more limited than could be possible with the second lens group as the focusing group.

Further, for slimming down the zoom lens upon received in the lens mount and reducing the weight load for focusing drive, it is preferable that the third lens group is made up of one positive lens or two lenses: a positive lens and a negative lens.

Yet another advantage is that focus driving can be implemented by the movement of the fourth lens group in association with the movement of the third lens group while the field curvature produced from object distance fluctuations is corrected, so that fairly good imaging capabilities are obtained down to the nearest distance.

Further, for slimming down the zoom lens upon received in the lens mount and reducing the weight load for focusing drive, it is preferable that the third lens group is made up of one positive lens or two lenses: a positive lens and a negative lens.

If the preferable, and more preferable (bracketed), arrangements of the zoom lens according to the aforesaid first aspect are achievable in the zoom lenses according to the second and third aspects or the like described below, there are then more favorable advantages achievable.

The zoom lens according to the second aspect of the invention comprises, in order from its object side, a first lens group having negative refracting power, a second lens group having positive refracting power, and a third lens group having positive refracting power, wherein upon zooming from a wide-angle end to a telephoto end, said first lens group, said second lens group and said third lens group each move along an optical axis while a spacing between said first lens group and said second lens group becomes narrow and a spacing between said second lens group and said third lens group becomes wide, said first lens group comprises one single lens that is a double-concave negative lens or two lenses: a double-concave negative lens and a positive lens, and said second lens group comprises two positive lenses and one negative lens wherein at least one of said positive lenses has an aspheric lens surface.

The technical advantages of these requirements are much the same as described above.

And then, this zoom lens is characterized by satisfying the following condition.

$$1.5 < f_2/f_w < 1.9 \tag{5}$$

Here $f_2$ is the focal length of the second lens group, and $f_w$ is the focal length of the whole zoom lens system at the wide-angle and upon focusing on the farthest distance.

This condition (5) defines the proper refracting power of the second lens group to achieve fairly good imaging capabilities while the whole zoom lens length is kept compact. By complying with at least the upper limit of 1.9 to condition (6) thereby making sure the refracting power at the second lens group, it is easy to keep the whole zoom lens system short. This also works for making sure the zooming effect at the second lens group, and enables the amount of movement of the second lens group for zooming to be easily reduced so that the size of the lens mount for that movement, and the size of the zoom lens upon received in the lens mount can be kept compact.

By complying with at least the lower limit of 1.5 to condition (6), it is easy to limit the amounts of aberrations occurring at the second lens group. This works for making sure fairly good imaging capabilities all over the zooming range while maintaining the small F-number.

Further, it is preferable to satisfy the following condition (6).

$$1.09 < |f_1|/(f_w \cdot F_{Now}) < 1.7 \tag{6}$$

Here $f_1$ is the focal length of the first lens group, and $F_{Now}$ is the F-number of the zoom lens at the wide-angle end and upon focusing on the farthest distance.

Condition (6) defines the proper refracting power of the first lens group to achieve a small F-number. By complying with at least the upper limit of 1.7, the first lens group makes sure a negative refracting power so that it is easy to keep the whole zoom lens length short at the wide-angle end. This also works for keeping compact the size of the zoom lens upon received in the lens mount. By complying with at least the lower limit of 1.09, it is possible to hold back an increase in the refracting power of the first lens group with respect to the height of an axial marginal ray so that spherical aberrations can be easily balanced against other aberrations.

Further, it is preferable to satisfy the following condition (7).

$$0.28 < h_{2w}/f_2 < 0.35 \tag{7}$$

Here $h_{2w}$ is the height of an axial marginal ray at the entrance surface in the second lens group at the wide-angle end and upon focusing on the farthest distance.

Condition (7) defines the proper ratio between the height of an axial marginal ray at the second lens group and the focal length of the second lens group. By complying with at least the upper limit of 0.35, the diameter size of the second lens group is limited, working for limiting the thickness of the second lens group and the thickness of the zoom lens upon received in the lens mount. By complying with at least the lower limit of 0.28, the second lens group makes sure the refracting power so that the whole zoom lens length can be easily kept short, and the amount of movement of the lenses for putting away the zoom lens in the lens mount can be limited. For instance, a lens mount parts count may be reduced to make the diametrical size of the lens mount small.

It is also preferable to locate the fourth lens group comprising one aspheric lens on the image side with respect to the third lens group.

In the zoom lens of the invention, the first lens group has a simple arrangement made up of one double-concave negative lens or two lenses: a double-concave negative lens plus a positive lens. With such concave arrangement, it is possible to reduce the size of the zoom lens upon received in the lens mount and easily lessen the influences of spherical aberrations while maintaining the negative refracting power of the lens group. This is going to work for correction of spherical aberrations that is a key factor for zoom lenses having a small F-number; however, there is difficulty in implementing correction of distortion and field curvature simultaneously with correction of spherical aberrations. For this reason, the fourth lens group composed of one aspheric lens is introduced on the image side of the third lens group, letting the fourth lens group take on correction of distortion and field curvature that are off-axis aberrations and, hence, placing the whole aberrations in a well-balanced state.

Further, it is more preferable for the fourth lens group to have paraxially positive or negative refracting power for aberration tweaks. (More specifically, as the aspheric surface is configured such that the refracting power is weaker at its periphery than at or near the optical axis, it is effective for correction of off-axis aberrations resulting from the first lens group having negative power. Such aspheric surface shape means that when it is a positive convex surface, the refracting power at or near the optical axis turns to a weak positive or negative one, and when it is a negative concave surface, the refracting power at or near the optical axis turns to a strong negative one at its periphery.) It is also preferable to move the third lens group in the axial direction, thereby implementing focusing operation from focusing on the farthest distance to focusing on a near distance.

Such an inner focus mode by the movement of the third lens group makes the weight of the driving lens smaller than would be possible with the driving of the first lens group having an increased diameter, and enables faster focusing operation as well. Another advantage is that changes in the angle of view during focusing operation are more limited than could be possible with the second lens group as the focusing group.

Furthermore, it is preferable to move the third lens group and the fourth lens group with a constant or varying space between them, thereby implementing focusing operation from focusing on the farthest distance to focusing on a near distance.

Such an inner focus mode by the movement of the third lens group makes the weight of the driving lens smaller than would be possible with the driving of the first lens group having an increased diameter, and enables faster focusing operation as well. Another advantage is that changes in the angle of view during focusing operation are more limited than could be possible with the second lens group as the focusing group.

The zoom lens according to the third aspect of the invention comprises, in order from its object side, a first lens group having negative refracting power, a second lens group having positive refracting power, and a third lens group having positive refracting power, wherein upon zooming from a wide-angle end to a telephoto end, said first lens group, said second lens group and said third lens group each move along an optical axis while a spacing between said first lens group and said second lens group becomes narrow and a spacing between said second lens group and said third lens group becomes wide, said first lens group comprises one single lens that is a double-concave negative lens or two lenses: a double-concave negative lens and a positive lens, and said second lens group comprises two positive lenses and one negative lens wherein at least one of said positive lenses has an aspheric lens surface.

The technical advantages of these requirements are much the same as described above.

And then, this zoom lens is characterized by satisfying the following condition.

$$0.4 < f_{1w}/IH < 0.5 \tag{8}$$

Here $h_{1w}$ is the height of an axial marginal ray at the entrance surface in the first lens group at the wide-angle end and upon focusing on the farthest distance, and IH is the maximum image height.

This condition (8) defines the proper entrance pupil size with respect to the maximum image height to maintain a small F-number and fairly good imaging capabilities. With a zoom lens, as contemplated herein, of the type that has a negative refracting power first (located nearest to the object side), axial marginal rays gain height at the second and subsequent lens groups.

Complying with at least the lower limit of 0.4 to condition (8) works for making sure a small F-number. Otherwise, limiting the image height facilitates limiting the amount of distortion occurring at the first lens group. By complying with at least the upper limit of 0.5 to condition (8), it is easy to limit the diameter of an axial beam, hold back spherical aberrations at the first lens group, balance correction of spherical aberrations against correction of field curvature, and design the zoom lens such that fairly good imaging capabilities are maintained all over the zooming range. This also works for making sure the angle of view at the wide-angle end.

In some cases, a field stop just before the imaging plane or the imaging area of the imaging device may be varied. When such an imaging area changes, an image height that grows greatest in a range capable of providing the imaging area is here defined as the maximum image height IH.

Similarly, when use is made of an imaging device that obtains image information by photoelectric conversion such as CCD or CMOS, the maximum image height IH is defined by the maximum image height in an effective imaging area.

The effective imaging area means a portion that is used for the reproduction and printing of taken images in an area with the photoelectric conversion plane of the imaging device located in it.

Further, it is preferable to satisfy the following condition (9).

$$0.8 < h_{2w}/IH < 1.2 \tag{9}$$

Here $h_{2w}$ is the height of an axial marginal ray at the entrance surface in the second lens group at the wide-angle end and upon focusing on the farthest distance.

This condition (9) defines the proper height of a marginal ray at the second lens group, which is needed to maintain fairly good imaging capabilities and sensible lens size. For the second lens group, it is easy to have a chief imaging function because it is set up according to the invention. As a result, however, the height of incidence of the axial marginal ray on the second lens group is likely to grow greatest at the second lens group. It is thus preferable to comply with at least the upper limit of 1.2 to condition (9), thereby holding back an increase in the diametrical thickness of the zoom lens with respect to imaging plane size and imaging device size and keeping the diameter of the lens mount small. This in turn leads to keeping the axial thickness of the second lens group small, and so is going to be favorable for the compactness of the zoom lens upon received in the lens amount.

By complying with at least the lower limit of 0.8 to condition (9), it is possible to make sure the imaging action at the second lens group and lessen the imaging function to be taken on by the third and subsequent lens groups. This in turn makes it easy to reduce the number of lenses, working for keeping the thickness of the zoom lens upon received in the lens mount and taking hold of the F-number as desired.

It is also preferable to satisfy the following condition (10).

$$0.4 < D_{2w}/f_w < 1.0 \tag{10}$$

Here $D_{2w}$ is the spacing on the optical axis between the second lens group and the third lens group at the wide-angle end and upon focusing on the farthest distance, and $f_w$ is the focal length of the whole zoom lens system at the wide-angle end and upon focusing on the farthest distance.

This condition (10) defines the proper spacing between the second lens group and the third lens group at the wide-angle end. Complying with at least the upper limit of 1.0 facilitates keeping the whole length of the zoom lens short at the wide-angle end. Otherwise, it is easy to hold back an increase in the height of the marginal ray at the second lens group and, hence, an increase in the thickness of the lenses in the second lens group. Complying with at least the lower limit of 0.4 to condition (1) works for correction of field curvature, and taking hold of the moving space for focusing operation by the third lens group as well.

It is further preferable to satisfy the following condition (11).

$$0.4 < g_{3w}/g_{3t} < 0.88 \tag{11}$$

Here $g_{3w}$ is the height of the most off-axis chief ray at the entrance surface in the third lens group at the wide-angle end and upon focusing on the farthest distance, and $g_{3t}$ is the height of the most off-axis chief ray at the entrance surface in the third lens group at the telephoto end and upon focusing on the farthest distance.

This condition (11) determines the proper height of incidence of an off-axis ray on the third lens group. In the arrangement of the invention, the first lens group should be as simple as possible to slim down the zoom lens upon received in the lens mount. With such arrangement, however, there is some difficulty in satisfactory correction of distortion and field curvature fluctuations with zooming of the first lens group, using the first lens group itself. If the height of an off-axis chief ray incident on the third lens group is properly varied depending on zooming, then it facilitates correction of undercorrected distortion and field curvature occurring at the first lens group. Complying with at least the upper limit of 0.88 and the lower limit of 0.4 to condition (11) facilitates correction of distortion and field curvature fluctuations with zooming.

To make that correction effect better, the third lens group should more preferably comprise an aspheric surface.

Even more preferably, there should be the fourth lens group comprising one aspheric lens provided on the image side with respect to the third lens group.

In the zoom lens of the invention, the first lens group has a simple arrangement made up of one double-concave negative lens or two lenses: a double-concave negative lens plus a positive lens. With such concave arrangement, it is possible to reduce the size of the zoom lens upon received in the lens mount and easily lessen the influences of spherical aberrations while maintaining the negative refracting power of the lens group. This is going to work for correction of spherical aberrations that is a key factor for zoom lenses having a small F-number; however, there is some difficulty in implementing correction of distortion and field curvature simultaneously with correction of spherical aberrations. For this reason, the fourth lens group composed of one aspheric lens is introduced on the image side of the third lens group, letting the fourth lens group take on correction of distortion and field curvature that are off-axis aberrations and, hence, placing the whole aberrations in a well-balanced state.

Further, it is more preferable for the fourth lens group to have paraxially positive or negative refracting power for aberration tweaks. (More specifically, as the aspheric surface is configured such that the refracting power is smaller at its periphery than at or near the optical axis, it is effective for correction of off-axis aberrations resulting from the first lens group having negative power. Such aspheric surface shape means that when it is a positive convex surface, the refracting power at or near the optical axis turns to a weak positive or negative one, and when it is a negative concave surface, the refracting power at or near the optical axis turns to a strong negative one at its periphery.)

It is also preferable to move the third lens group in the axial direction, thereby implementing focusing operation from focusing on the farthest distance to focusing on a near distance.

Such an inner focus mode by the movement of the third lens group makes the weight of the driving lens smaller than would be possible with the driving of the first lens group having an increased diameter, and enables faster focusing operation as well. Another advantage is that changes in the angle of view and the amount of driving during focusing operation are more limited than could be possible with the second lens group as the focusing group.

When there is the fourth lens group involved, it is preferable to move the third lens group and the fourth lens group with a constant or varying space between them, thereby implementing focusing operation from focusing on the farthest distance to focusing on a near distance.

Such an inner focus mode by the movement of the third lens group makes the weight of the driving lens smaller than would be possible with the driving of the first lens group having an increased diameter, and enables faster focusing operation as well. Another advantage is that changes in the angle of view and the amount of driving during focusing operation are more limited than could be possible with the second lens group as the focusing group.

Throughout the zoom lenses according to the first, second and third aspects of the invention, it is preferable to satisfy the following condition (12).

$$2.3 < f_t/f_w < 6.0 \tag{12}$$

Here $f_w$ is the focal length of the whole zoom lens system at the wide-angle end and upon focusing on the farthest distance, and $f_t$ is the focal length of the whole zoom lens system at the telephoto end and upon focusing on the farthest distance.

It is preferable to comply with at least the lower limit of 2.3 to condition (12), thereby making sure the degree of flexibility by changes in the angle of view, and it is preferable to comply with at least the upper limit of 6.0, thereby making sure brightness at the telephoto end.

Throughout the zoom lenses according to the first, second and third aspects of the invention, it is also preferable to satisfy the following condition (13).

$$56° < 2\omega_w < 86° \tag{13}$$

Here $\omega_w$ is the half angle of view of the whole zoom lens system at the wide-angle end and upon focusing on the farthest distance.

By complying with at least the lower limit of 56° to condition (13), it is preferable to make sure the angle of view as desired, thereby lessening the influences of camera shakes at the wide-angle end, and by complying with at least the upper limit of 86°, it is preferable to hold back an increase the diameter of the first lens group, thereby reducing the size of the zoom lens upon received in the lens mount. Otherwise, it is possible to prevent the refracting power of each lens group from growing too strong, thereby lessening the influences of aberrations.

Throughout the zoom lenses according to the first, second and third aspects of the invention, it is further preferable to satisfy the following condition (14).

$$1.2 < D_{12w}/D_{23w} < 20.0 \tag{14}$$

Here $D_{12w}$ is the spacing on the optical axis between the first lens group and the second lens group at the wide-angle end and upon focusing on the farthest distance, and $D_{23w}$ is the spacing on the optical axis between the second lens group and the third lens group at the wide-angle end and upon focusing on the farthest distance.

By complying with at least the lower limit of 1.2 to condition (14), it is preferable to make sure a wide angle of view in a retrofocus or other layout of the first, second and third lens groups and the amount of change in that spacing, thereby making sure the zoom ratio as desired. By complying with at least the upper limit of 20.0, it is preferable to keep the spacing between the second lens group and the third lens group from becoming too narrow, thereby making sure the function of the third lens group of keeping the exit pupil way off. Otherwise, it is preferable to keep the spacing between the first lens group and the second lens group from becoming too long, thereby keeping the whole length of the zoom lens short at the wide-angle end and the diameter of the first lens group from growing large.

While each one of the aforesaid arrangements and conditions has its own advantage, it should be noted that if plural such requirements are satisfied at the same time, it is more preferable in view of making sure brightness, size reductions, higher performance, etc.: proper combinations of them are preferable.

The range of each one of the conditions involved should more preferably be reduced down to:

of condition (1), the lower and upper limits should be reduced down to 17.5 and 22.5, respectively;

of condition (2), the lower and upper limits should be reduced down to 17.5 and 22.5, respectively;

of condition (3), the lower and upper limits should be reduced down to 0.254 and 0.37, respectively;

of condition (4), the lower and upper limits should be reduced down to 1.20 and 2.1, respectively;

of condition (5), the lower limit should be reduced down to 1.55;

of condition (8), the lower limit should be reduced down to 0.45;

of condition (9), the lower and upper limits should be reduced down to 0.85 and 1.15, respectively;

of condition (10), the lower and upper limits should be reduced down to 0.45 and 0.98, respectively;

of condition (11), the upper limit should be reduced down to 0.8;

of condition (12), the lower and upper limits should be reduced down to 2.8 and 5.0, respectively;

of condition (13), the lower and upper limits should be reduced down to 60° and 70°, respectively; and of condition (14), the lower and upper limits should be reduced down to 2.0 and 8.0, respectively.

Some or all of the aforesaid conditions should even more preferably be satisfied at the same time.

The invention also provides an imaging system comprising any one of the aforesaid zoom lenses, and an imaging device located on the image side of that zoom lens and adapted to convert an image formed through the zoom lens into electrical signals.

The present invention provides a zoom lens that works for offering a sensible tradeoff between the size reduction of the zoom lens upon received in an associated lens mount and a small F-number. The present invention also provides an imaging system whose size is reduced by slimming down the zoom lens upon received in the lens mount.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 15 of the zoom lens according to the invention are now explained. FIGS. 1-15 are illustrative in section of Examples 1-15 in the wide-angle end (a), in an intermediate state (b) and at the telephoto end (c) upon focusing on an object point at infinity. In FIGS. 1-15, G1 represents a first lens group, S an aperture stop, G2 a second lens group, G3 a third lens group, G4 a fourth lens group, capital F an optical low-pass filter applied with an infrared cut coating, capital C a cover glass for an electronic imaging device (CCD or CMOS), and capital I an image plane (the receptor plane of the electronic imaging device). It is noted that in addition to the infrared cut coating, there may be an infrared cut absorption filter provide, and instead of the infrared cut coating, the cover glass C may additionally be provided on its surface with a wavelength limiting multilayer film. In FIGS. 1 to 15, the axial marginal light rays and the most off-axis chief ray at the wide-angle end, in the intermediate state and at the telephoto end are also indicated.

Figure 1A:
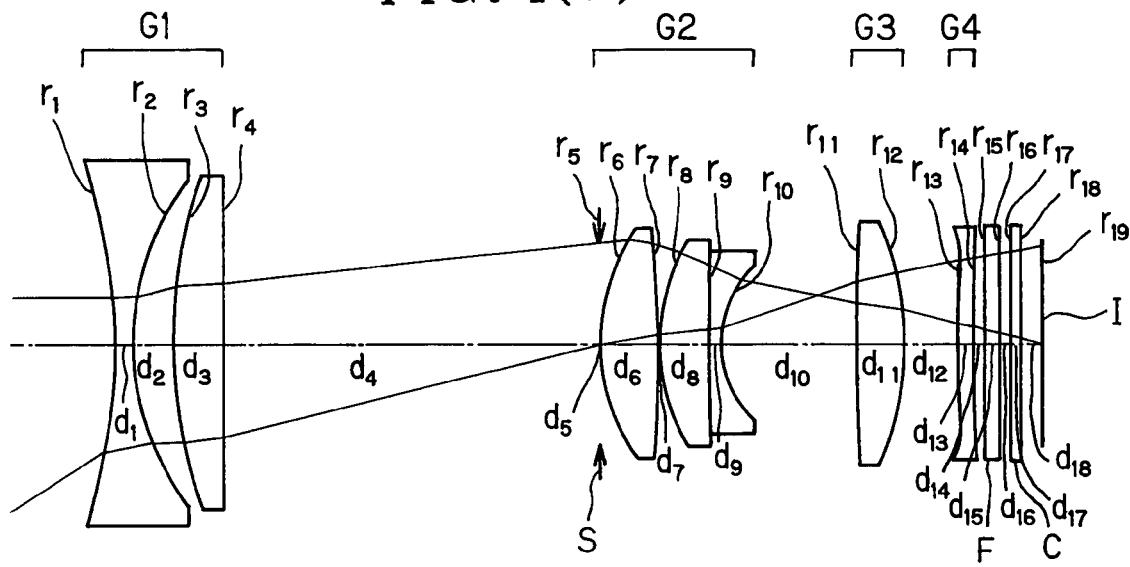
FIG. 1 is illustrative in section of Example 1 of the zoom lens according to the invention at the wide-angle end (a), in an intermediate state (b) and at the telephoto end (c) upon focusing on an object point at infinity.
Figure 1B:
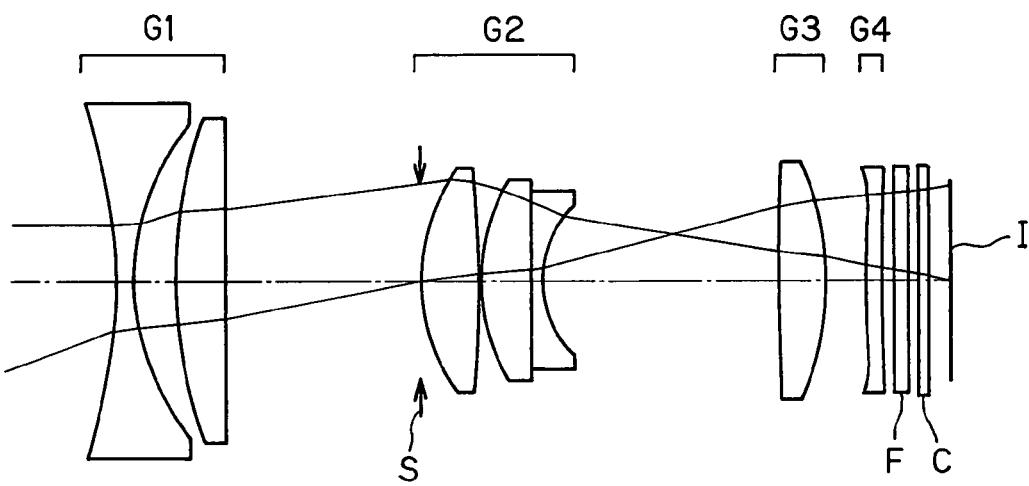
Figure 1C:
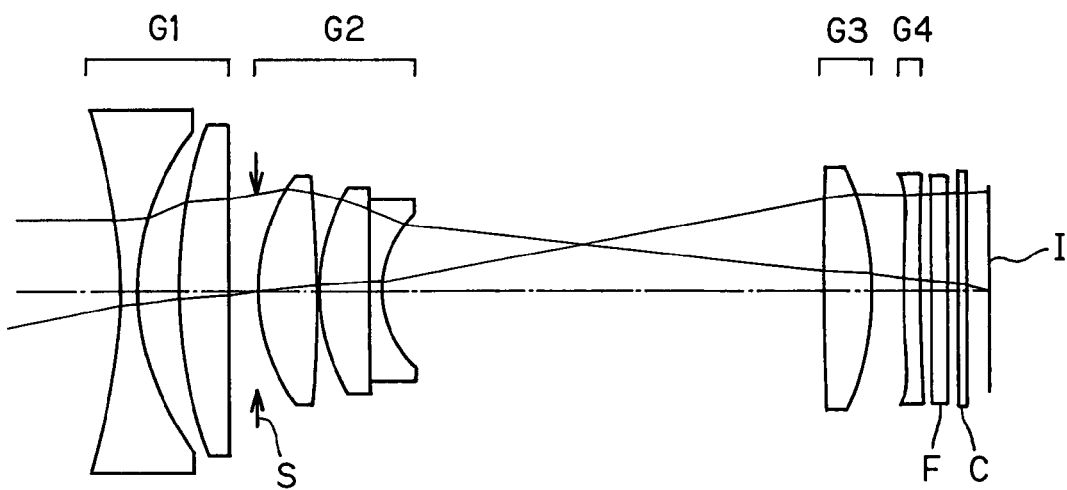
Figure 2A:
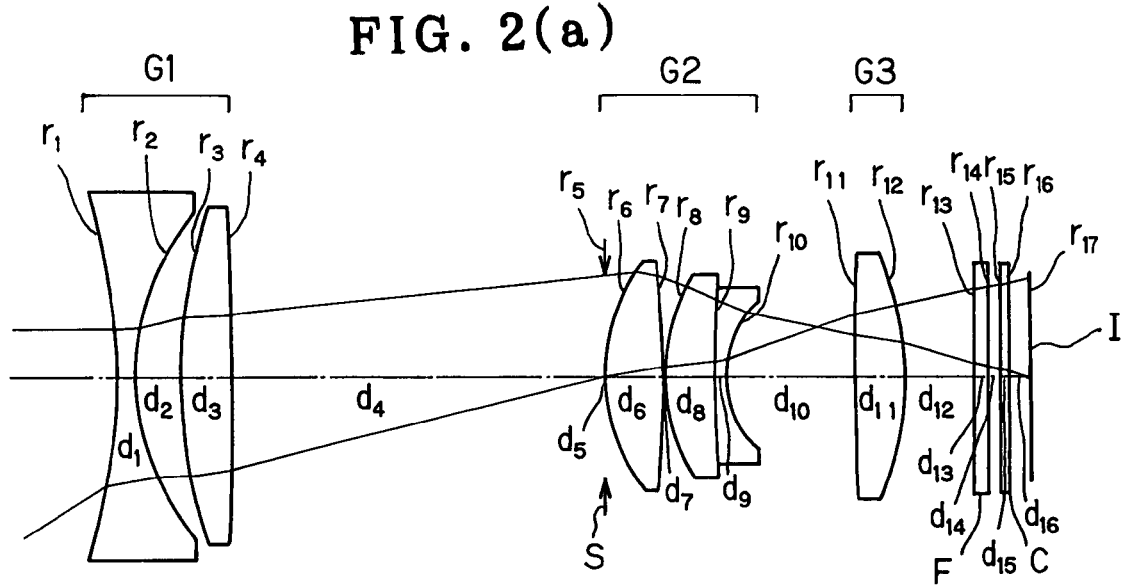
FIG. 2 is illustrative, as in FIG. 1, of Example 2 of the zoom lens according to the invention.
Figure 2B:
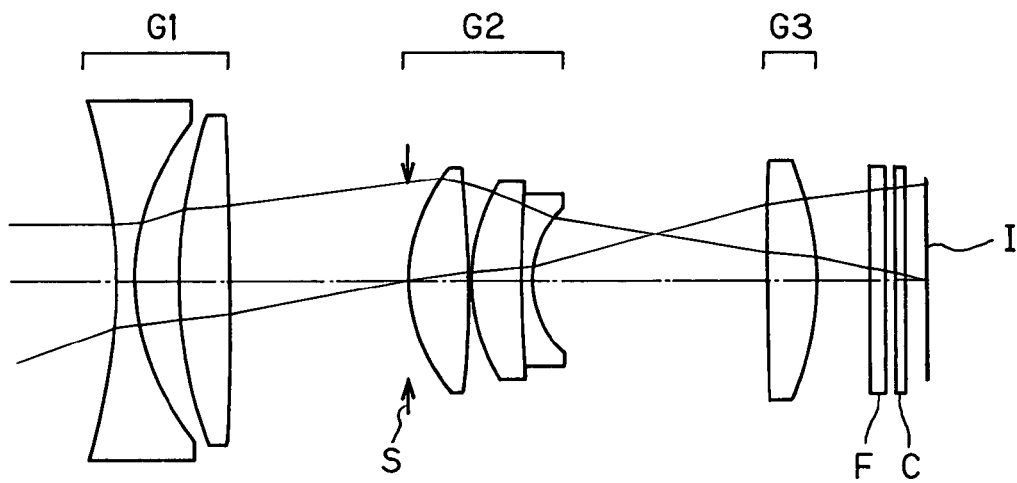
Figure 2C:
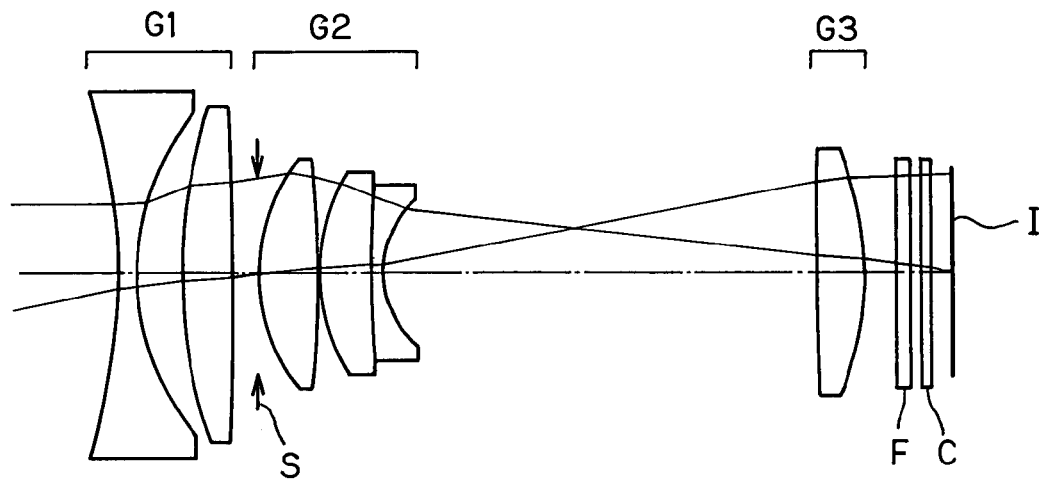

Example 1 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 1, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the image side while the space between it and the second lens group G2 becomes wide. The fourth lens group G4 remains fixed.

In order from the object side, the first lens group G1 is made up of a double-concave negative lens and a double-convex positive lens; the second lens group G2 is made up of a double-convex positive lens and a cemented lens consisting of a positive meniscus lens convex on the object side and a negative meniscus lens convex on the object side; the third lens group G3 is made up of one double-convex positive lens; and the fourth lens group G4 is made up of one positive meniscus lens convex on the object side.

Six aspheric surfaces are used: two at both surfaces of the double-concave negative lens in the first lens group G1, two at both surfaces of the double-convex positive lens in the second lens group G2, one at the image side surface of the double-convex positive lens in the third lens group G3, and one at the object side surface of the positive meniscus lens in the fourth lens group G4.

Example 2 is directed to a zoom lens made up of, in order from its object side, the first lens group G1 of negative refracting power, the second lens group G2 of positive refracting power and the third lens group G3 of positive refracting power, as shown in FIG. 1, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the image side while the space between it and the second lens group G2 becomes wide.

In order from the object side, the first lens group G1 is made up of a double-concave negative lens and a double-convex positive lens; the second lens group G2 is made up of a double-convex positive lens and a cemented lens consisting of a positive meniscus lens convex on the object side and a negative meniscus lens convex on the object side; and the third lens group G3 is made up of one double-convex positive lens.

Five aspheric surfaces are used: two at both surfaces of the double-concave negative lens in the first lens group G1, two at both surfaces of the double-convex positive lens in the second lens group G2, and one at the image side surface of the double-convex positive lens in the third lens group G3.

Figure 3A:
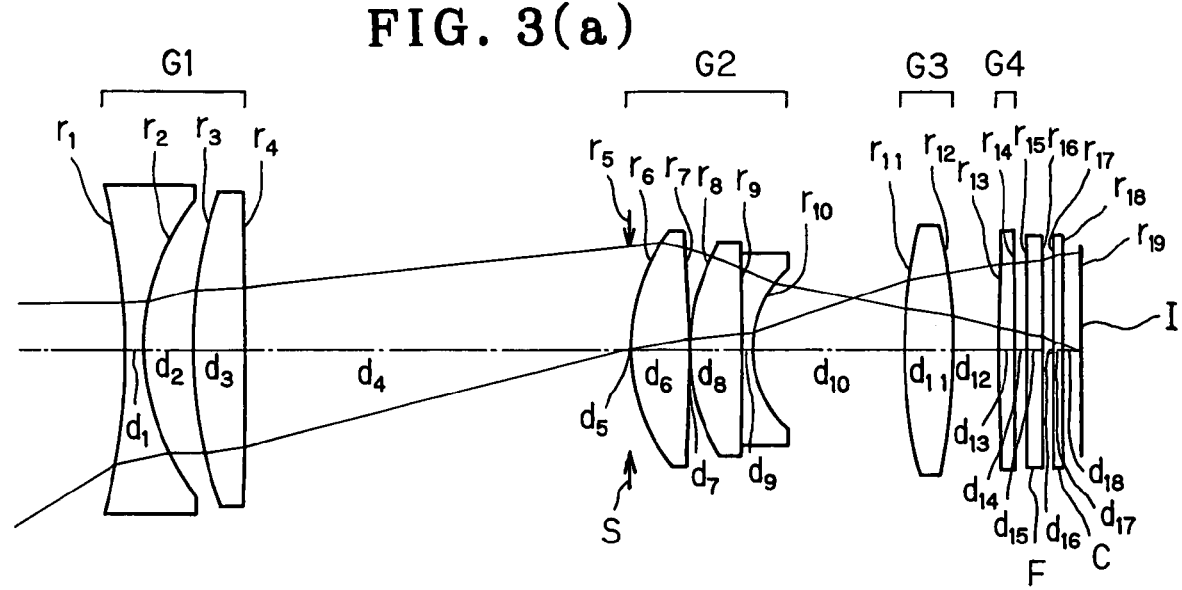
FIG. 3 is illustrative, as in FIG. 1, of Example 3 of the zoom lens according to the invention.
Figure 3B:
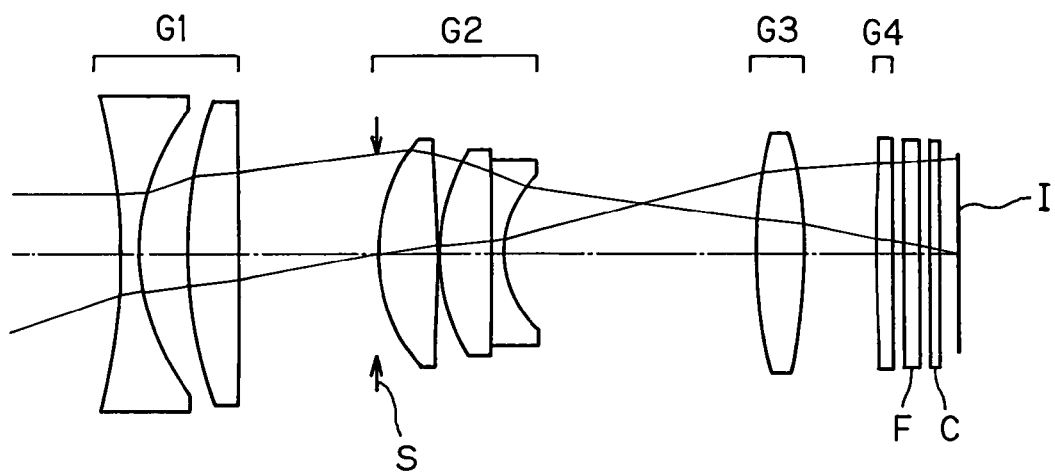
Figure 3C:
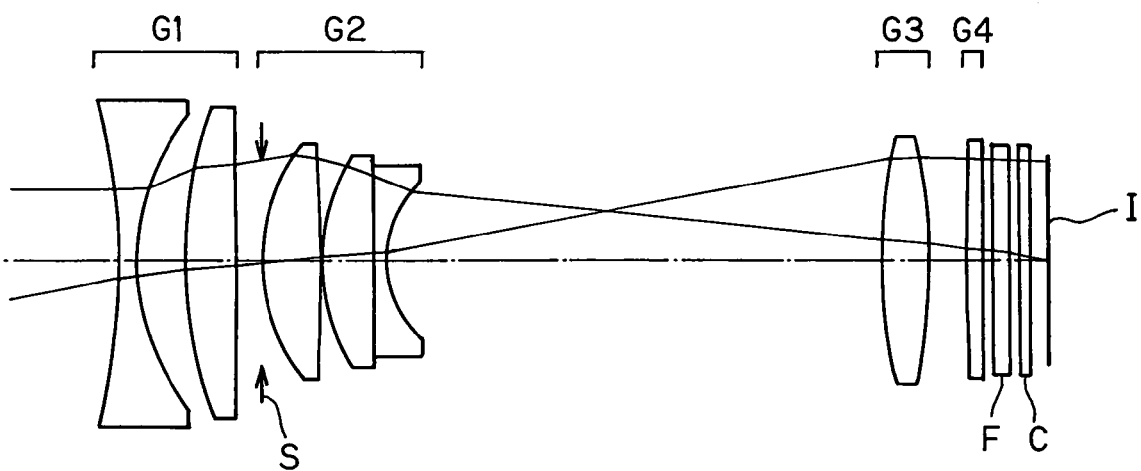

Example 3 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 3, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side in a convex orbit while the space between it and the second lens group G2 becomes wide, and is positioned nearer to the image side at the telephoto end than at the wide-angle end.

In order from the object side, the first lens group G1 is made up of a double-concave negative lens and a double-convex positive lens; the second lens group G2 is made up of a double-convex positive lens and a cemented lens consisting of a double-convex positive lens and a double-concave negative lens; the third lens group G3 is made up of one double-convex positive lens; and the fourth lens group G4 is made up of one plano-convex positive lens convex on the object side.

Six aspheric surfaces are used: two at both surfaces of the double-concave negative lens in the first lens group G1, two at both surfaces of the single double-convex positive lens in the second lens group G2, one at the image side surface of the double-convex positive lens in the third lens group G3, and one at the object side surface of the plano-convex positive lens in the fourth lens group G4.

Figure 4A:
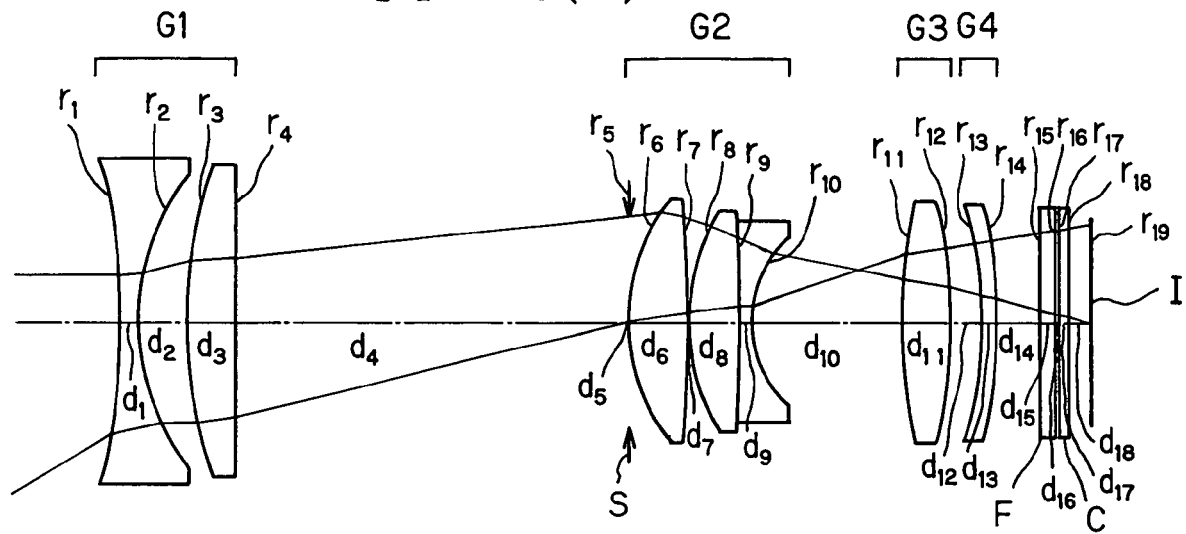
FIG. 4 is illustrative, as in FIG. 1, of Example 4 of the zoom lens according to the invention.
Figure 4B:
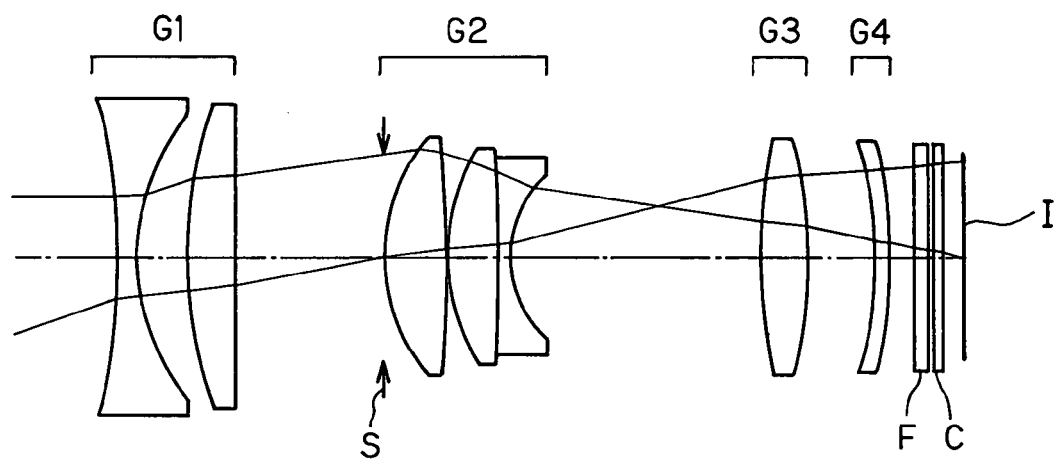
Figure 4C:
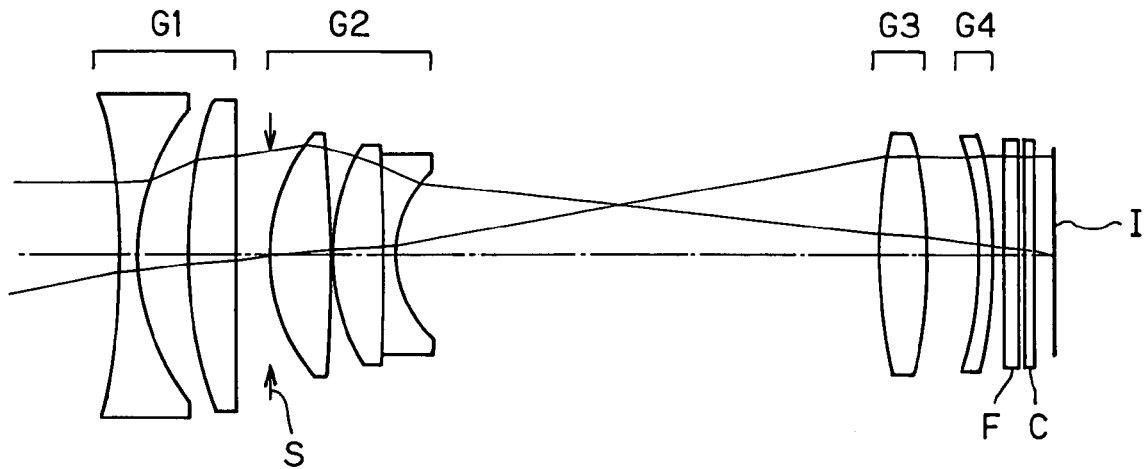

Example 4 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 4, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side in a convex orbit while the space between it and the second lens group G2 becomes wide, and is positioned nearer to the image side at the telephoto end than at the wide-angle end. The fourth lens group G4 moves toward the image side while the space between it and the third lens group G3 becomes wide from the wide-angle end to the intermediate state and then becomes narrows from the intermediate state to the telephoto end.

In order from the object side, the first lens group G1 is made up of a double-concave negative lens and a positive meniscus lens convex on the object side; the second lens group G2 is made up of a double-convex positive lens and a cemented lens consisting of a double-convex positive lens and a double-concave negative lens; the third lens group G3 is made up of one double-convex positive lens; and the fourth lens group G4 is made up of one positive meniscus lnes convex on the image side.

Six aspheric surfaces are used: two at both surfaces of the double-concave negative lens in the first lens group G1, two at both surfaces of the single double-convex positive lens in the second lens group G2, one at the image side surface of the double-convex positive lens in the third lens group G3, and one at the object side surface of the positive meniscus lens in the fourth lens group G4.

Figure 5A:
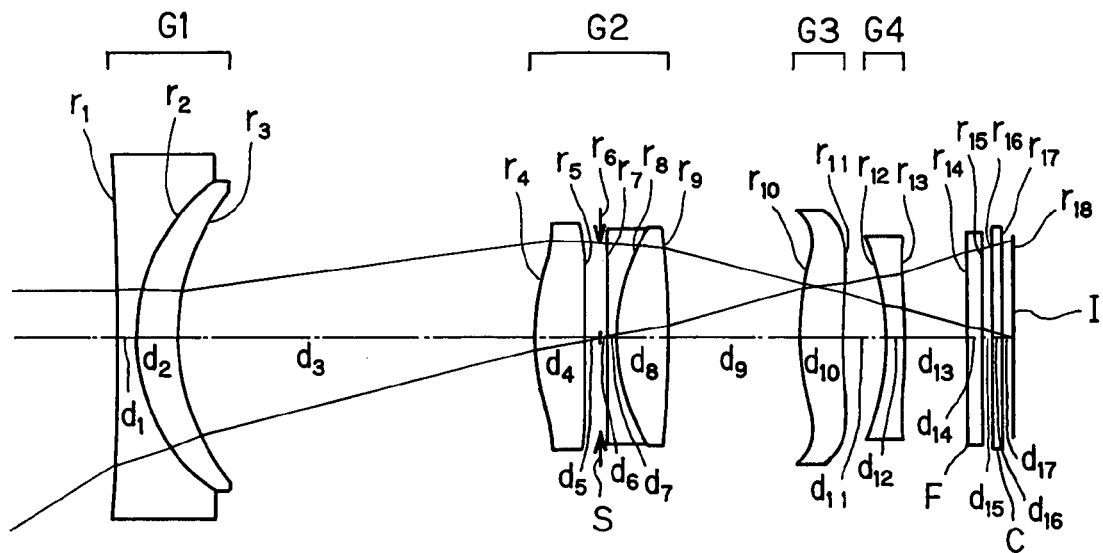
FIG. 5 is illustrative, as in FIG. 1, of Example 5 of the zoom lens according to the invention.
Figure 5B:
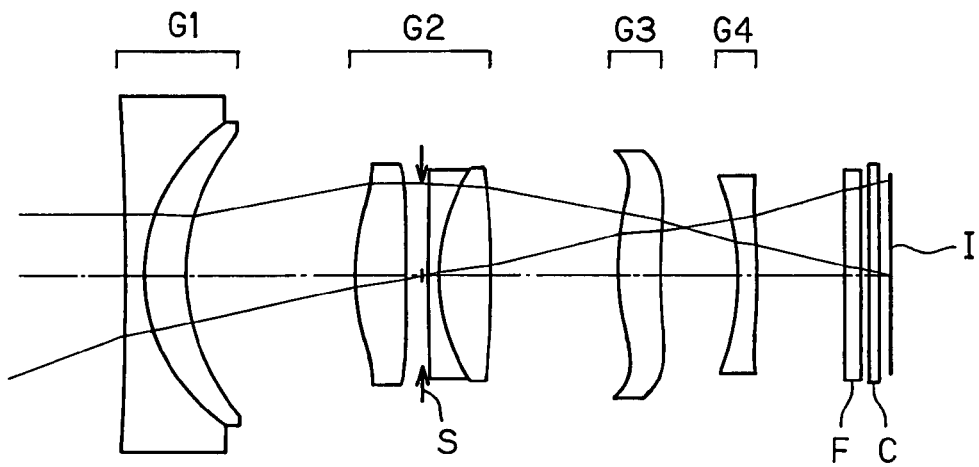
Figure 5C:
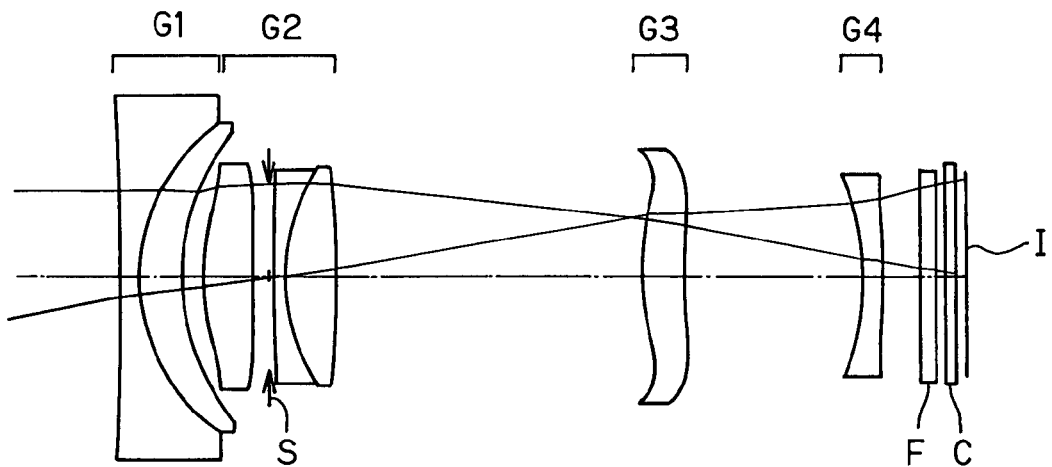

Example 5 is directed to a zoom lens made up of, in order from its object side, the first lens group G1 of negative refracting power, the second lens group G2 of positive refracting power, the third lens group G3 of positive refracting power and the fourth lens group G4 of negative refracting power, as shown in FIG. 5, with the aperture stop S located integrally in the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes slightly narrow from the wide-angle end to the intermediate state and then becomes wide from the intermediate state to the telephoto end. The fourth lens group G4 moves toward the object side in a convex orbit while the space between it and the third lens group G3 becomes wide, and is positioned nearer to the image side at the telephoto end than at the wide-angle end.

In order from the object side, the first lens group G1 is made up of a cemented lens consisting of a double-concave negative lens and a positive meniscus lens convex on the object side; the second lens group G2 is made up of a positive meniscus lens convex on the object side, the aperture stop S and a cemented lens consisting of a negative meniscus lens convex on the object side and a double-convex positive lens; the third lens group G3 is made up of one positive meniscus lens convex on the object side; and the fourth lens group G4 is made up of one negative meniscus lens convex on the image side.

Six aspheric surfaces are used: one at the surface nearest to the object side of the cemented lens in the first lens group G1, two at both surfaces of the single positive meniscus lens in the second lens group G2, two at both surfaces of the positive meniscus lens in the third lens group G3, and one at the image side surface of the negative meniscus lens in the fourth lens group G4.

Figure 6A:
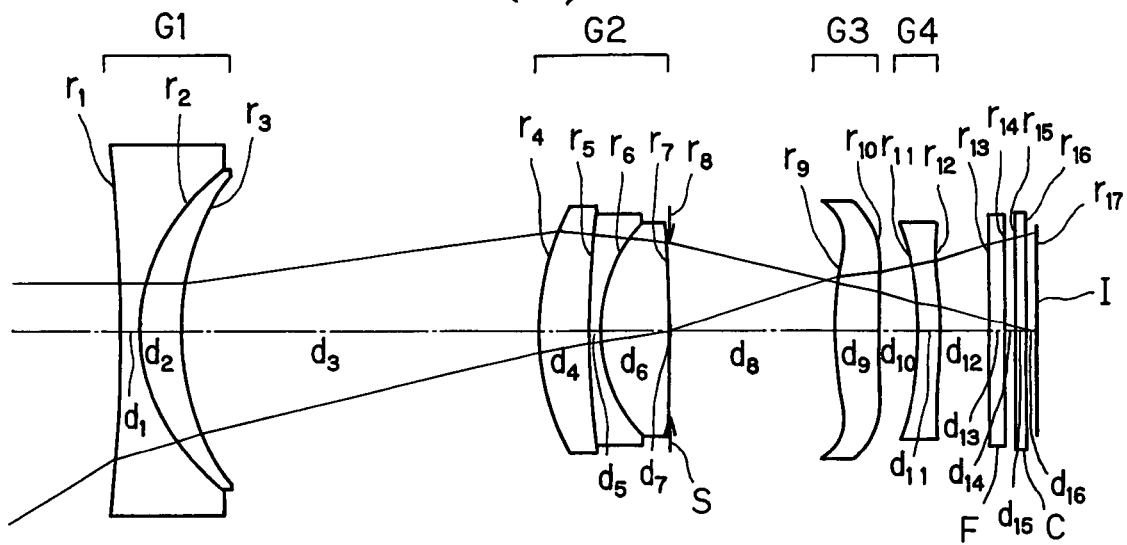
FIG. 6 is illustrative, as in FIG. 1, of Example 6 of the zoom lens according to the invention.
Figure 6B:
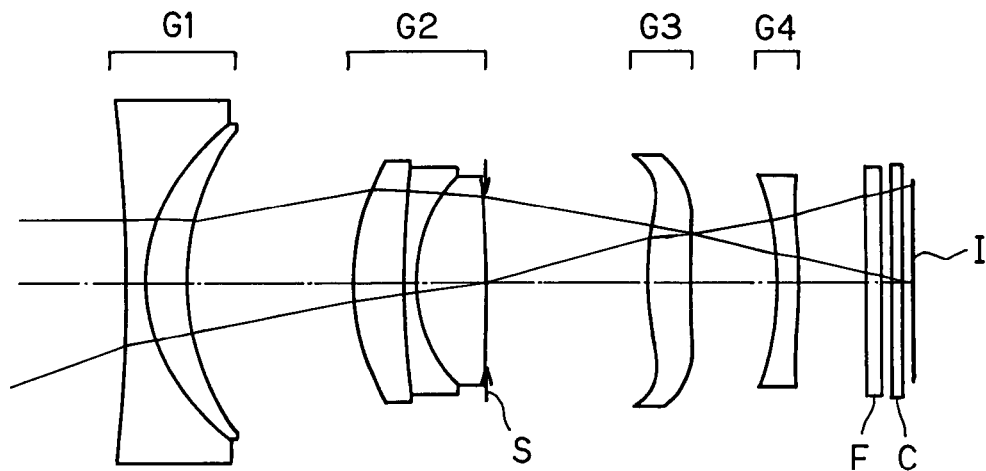
Figure 6C:
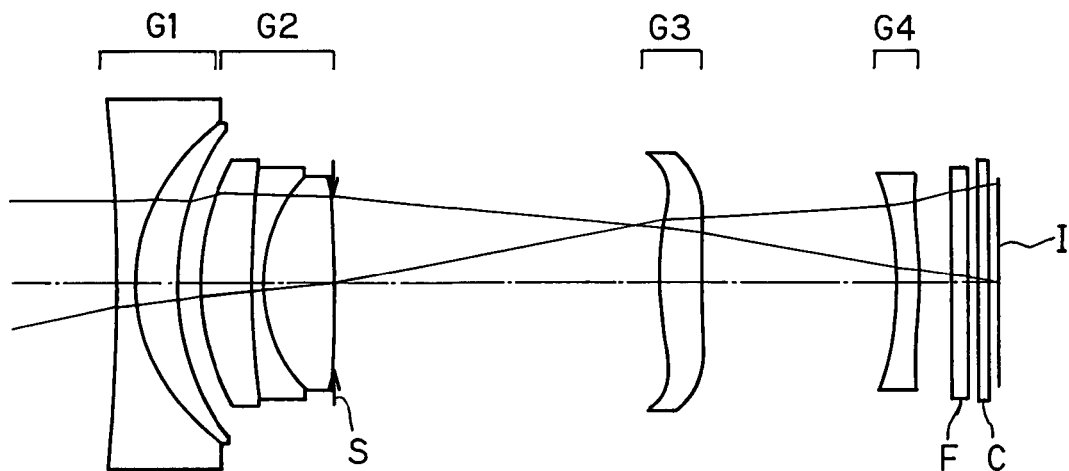

Example 6 is directed to a zoom lens made up of, in order from its object side, the first lens group G1 of negative refracting power, the second lens group G2 of positive refracting power, the third lens group G3 of positive refracting power and the fourth lens group G4 of negative refracting power, as shown in FIG. 6, with the aperture stop S located on the image side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes slightly narrow from the wide-angle end to the intermediate state and then becomes wide from the intermediate state to the telephoto end. The fourth lens group G4 moves toward the object side in a convex orbit while the space between it and the third lens group G3 becomes wide, and is positioned nearer to the image side at the telephoto end than at the wide-angle end.

In order from the object side, the first lens group G1 is made up of a cemented lens consisting of a double-concave negative lens and a positive meniscus lens convex on the object side; the second lens group G2 is made up of a triplet consisting of a positive meniscus lens convex on the object side, a negative meniscus lens convex on the object side and a double-convex positive lens; the third lens group G3 is made up of one positive meniscus lens convex on the object side; and the fourth lens group G4 is made up of one negative meniscus lens convex on the image side.

Five aspheric surfaces are used: one at the surface nearest to the object side of the cemented lens in the first lens group G1, one at the surface nearest to the object side of the triplet in the second lens group G2, two at both surfaces of the positive meniscus lens in the third lens group G3, and one at the image side surface of the negative meniscus lens in the fourth lens group G4.

Figure 7A:
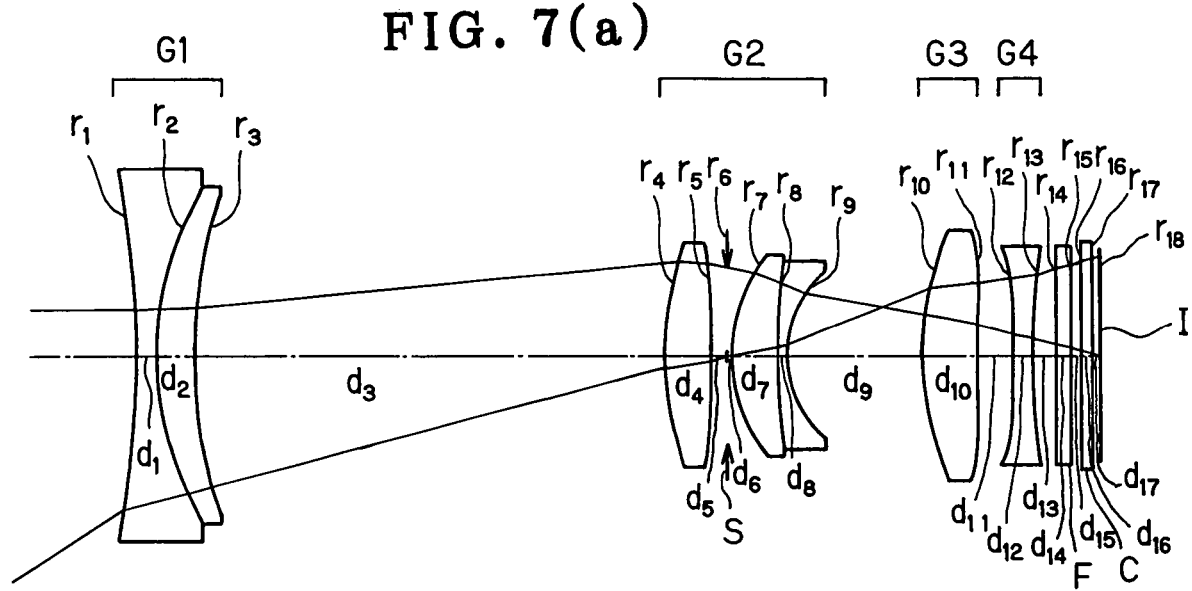
FIG. 7 is illustrative, as in FIG. 1, of Example 7 of the zoom lens according to the invention.
Figure 7B:
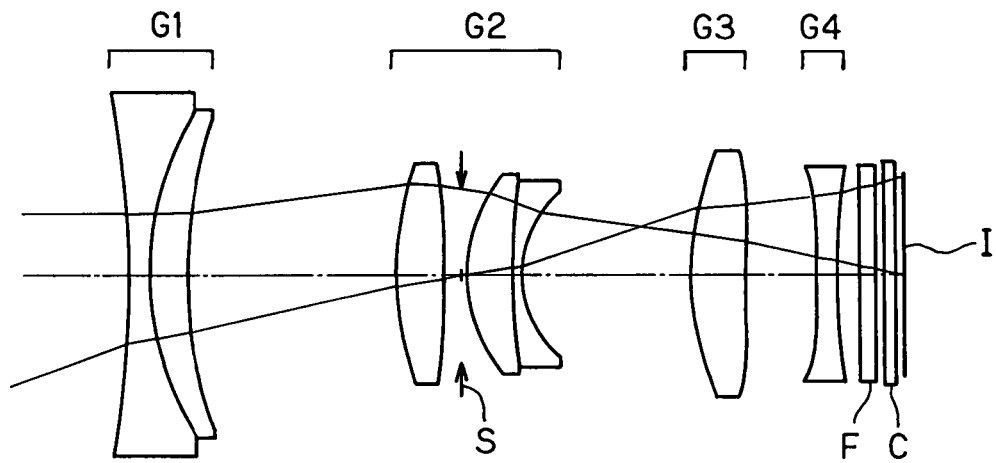
Figure 7C:
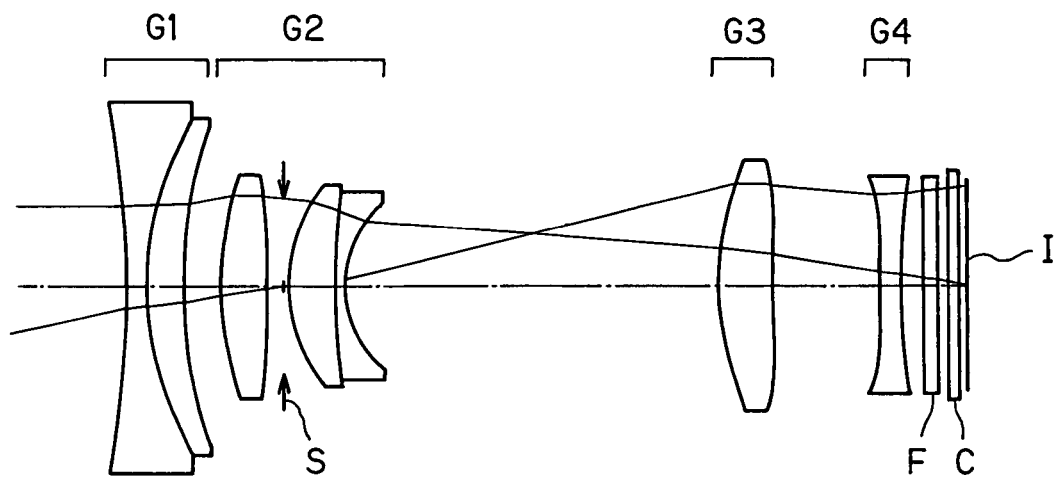

Example 7 is directed to a zoom lens made up of, in order from its object side, the first lens group G1 of negative refracting power, the second lens group G2 of positive refracting power, the third lens group G3 of positive refracting power and the fourth lens group G4 of negative refracting power, as shown in FIG. 7, with the aperture stop S located integrally in the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes wide. The fourth lens group G4 remains fixed.

In order from the object side, the first lens group G1 is made up of a cemented lens consisting of a double-concave negative lens and a positive meniscus lens convex on the object side; the second lens group G2 is made up of a double-convex positive lens, the aperture stop S and a cemented lens consisting of a positive meniscus lens convex on the object side and a negative meniscus lens convex on the object side; the third lens group G3 is made up of one positive meniscus lens convex on the object side; and the fourth lens group G4 is made up of one negative meniscus lens convex on the image side.

Seven aspheric surfaces are used: two at the surfaces nearest to the object and image sides of the cemented lens in the first lens group G1, two at both surfaces of the single double-convex positive lens in the second lens group G2, two at both surfaces of the positive meniscus lens in the third lens group G3, and one at the object side surface of the negative meniscus lens in the fourth lens group G4.

Figure 8A:
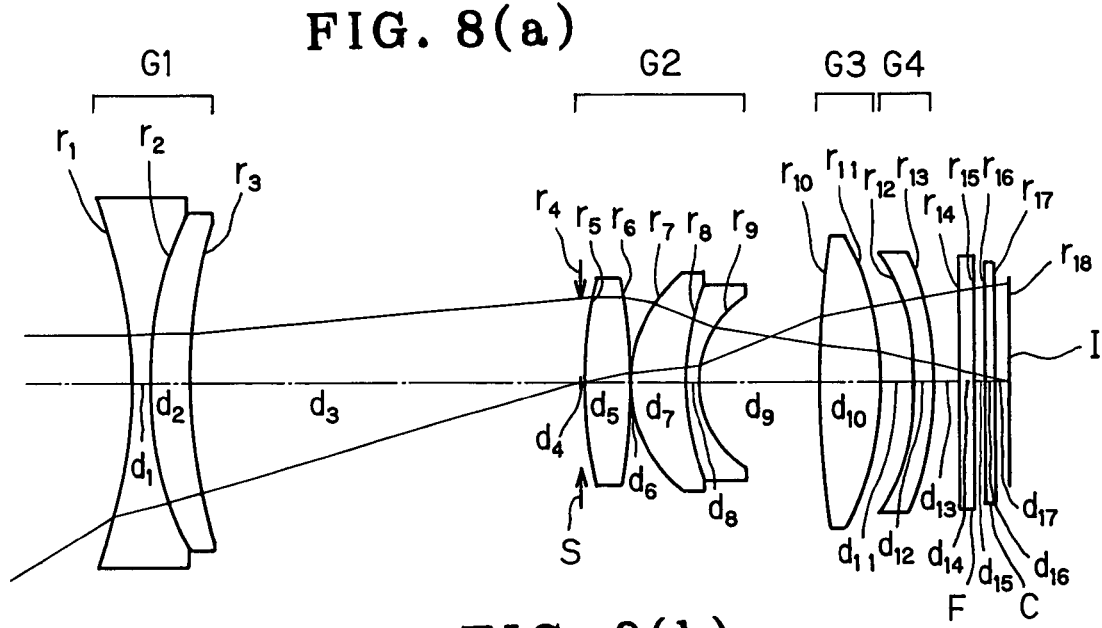
FIG. 8 is illustrative, as in FIG. 1, of Example 8 of the zoom lens according to the invention.
Figure 8B:
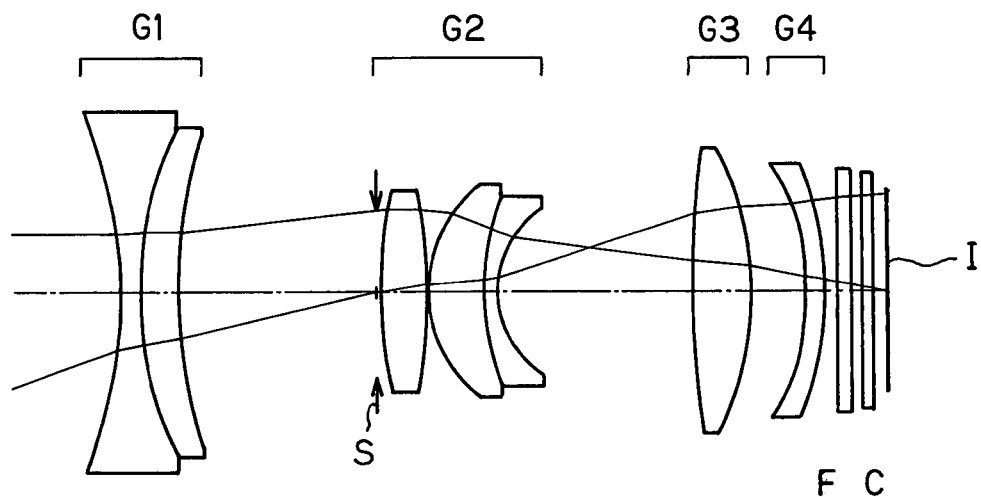
Figure 8C:
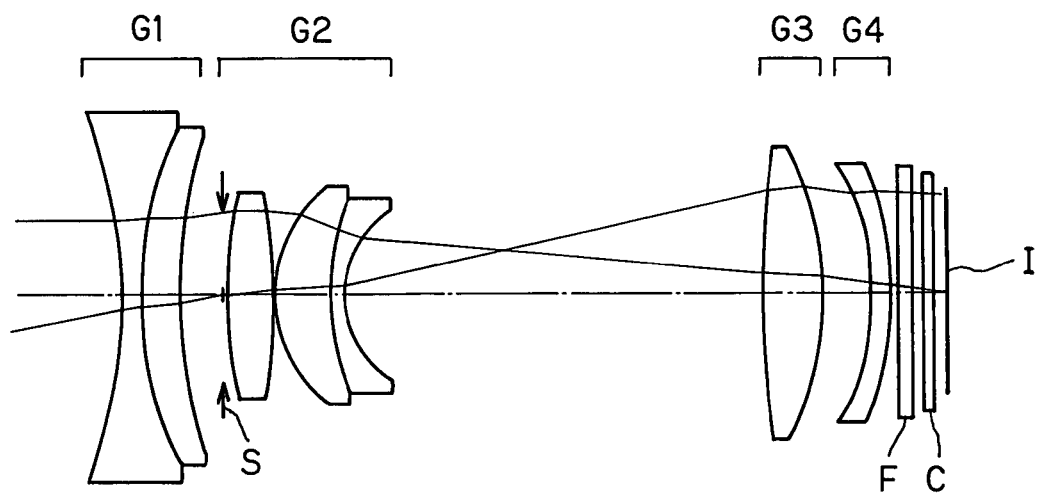

Example 8 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 8, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side in a convex orbit while the space between it and the second lens group G2 becomes wide, and is positioned nearer to the image side at the telephoto end than at the wide-angle end. The fourth lens group G4 moves toward the image side while the space between it and the third lens group G3 becomes wide from the wide-angle end to the intermediate state and then becomes slightly narrow from the intermediate state to the telephoto end.

In order from the object side, the first lens group G1 is made up of a cemented lens consisting of a double-concave negative lens and a positive meniscus lens convex on the object side; the second lens group G2 is made up of a double-convex positive lens and a cemented lens consisting of a positive meniscus lens convex on the object side and a negative meniscus lens convex on the object side; the third lens group G3 is made up of one double-convex positive lens; and the fourth lens group G4 is made up of one negative meniscus lens convex on the image side.

Six aspheric surfaces are used: two at the surfaces nearest to the object and image sides of the cemented lens in the first lens group G1, two at both surfaces of the single double-convex positive lens in the second lens group G2, one at the image side surface of the double-convex positive lens in the third lens group G3, and one at the object side surface of the positive meniscus lens in the fourth lens group G4.

Figure 9A:
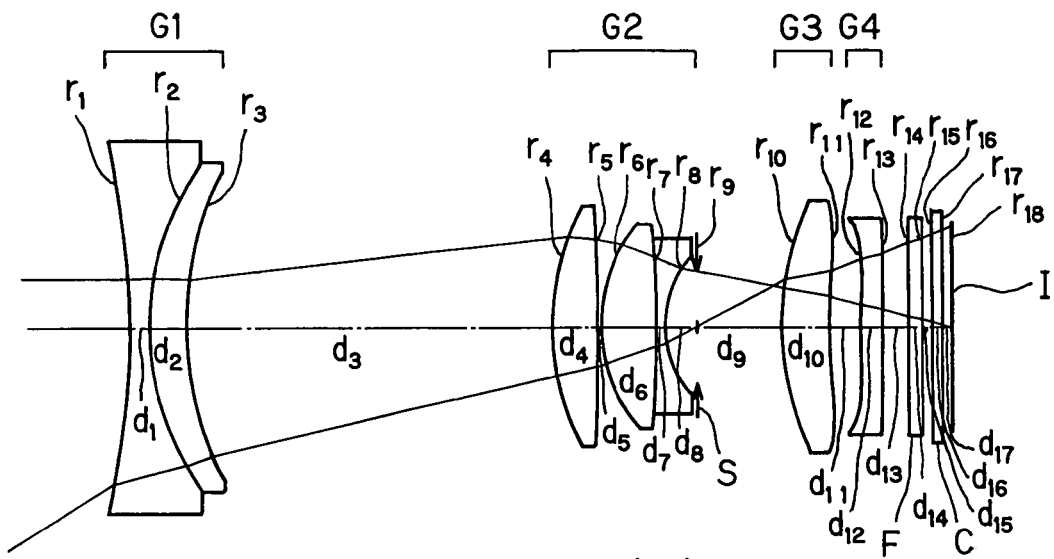
FIG. 9 is illustrative, as in FIG. 1, of Example 9 of the zoom lens according to the invention.
Figure 9B:
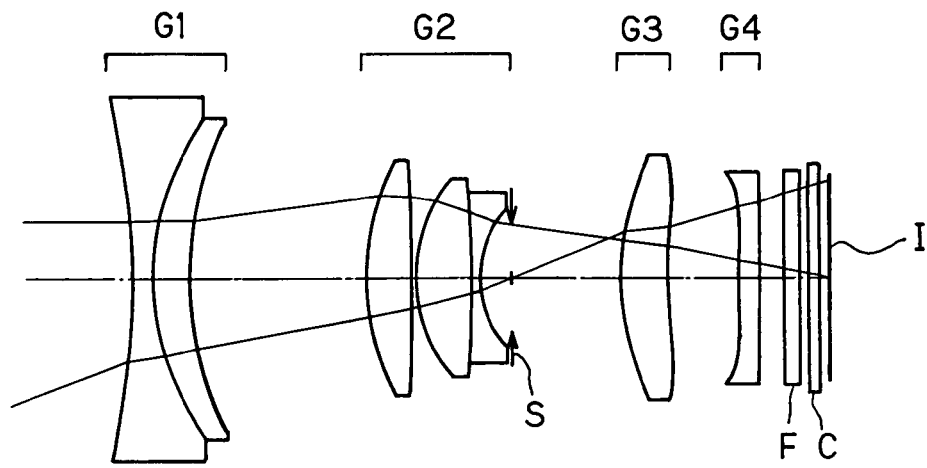
Figure 9C:
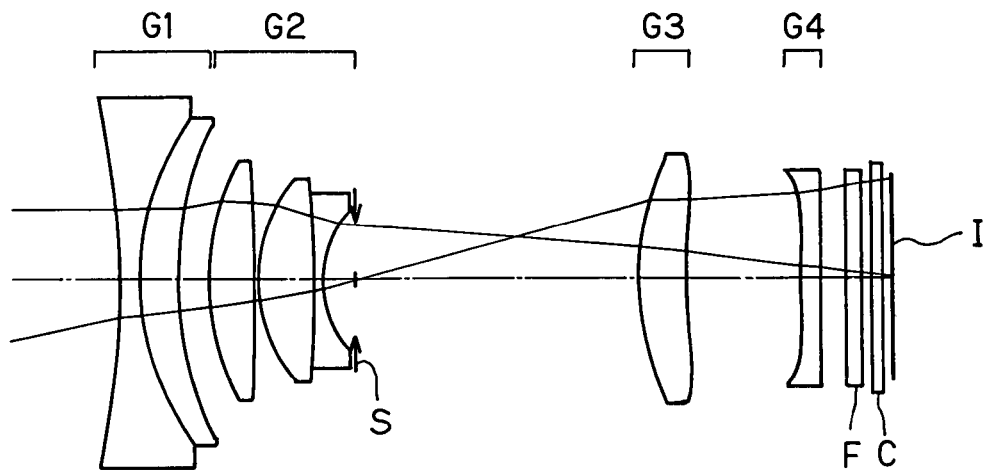

Example 9 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 9, with the aperture stop S located on the image side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes wide. The fourth lens group G4 remains fixed.

In order from the object side, the first lens group G1 is made up of a cemented lens consisting of a double-concave negative lens and a positive meniscus lens convex on the object side; the second lens group G2 is made up of a double-convex positive lens and a cemented lens consisting of a double-convex positive lens and a double-concave negative lens; the third lens group G3 is made up of one positive meniscus lens convex on the object side; and the fourth lens group G4 is made up of one double-convex positive lens.

Seven aspheric surfaces are used: two at the surfaces nearest to the object and image sides of the cemented lens in the first lens group G1, two at both surfaces of the single double-convex positive lens in the second lens group G2, two at both surfaces of the positive meniscus lens in the third lens group G3, and one at the object side surface of the double-convex positive lens in the fourth lens group G4.

Figure 10A:
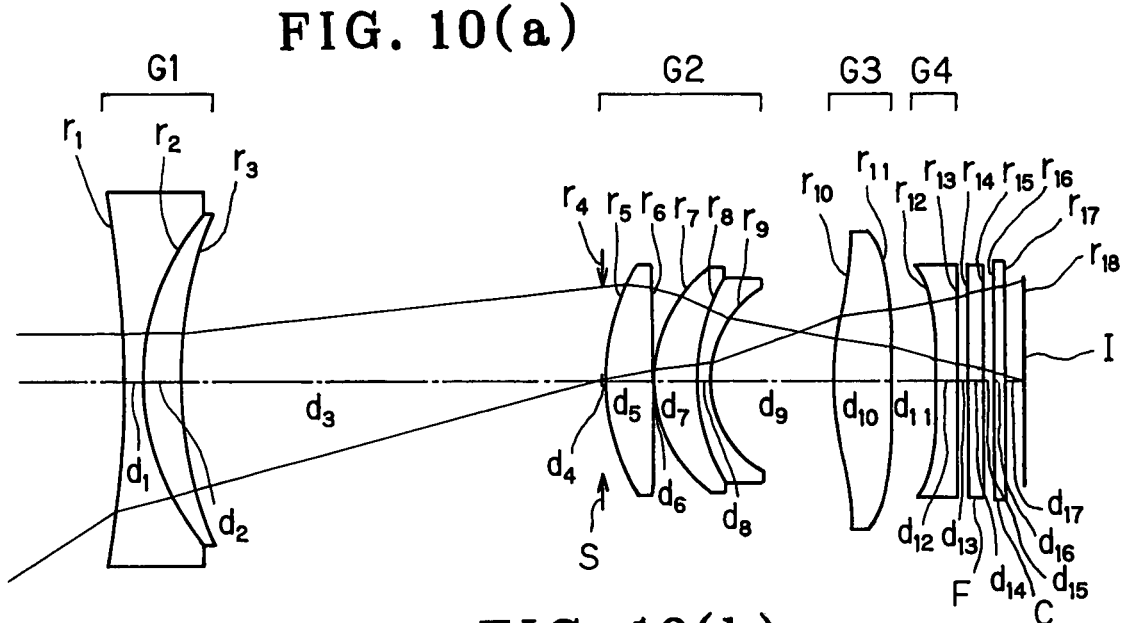
FIG. 10 is illustrative, as in FIG. 1, of Example 10 of the zoom lens according to the invention.
Figure 10B:
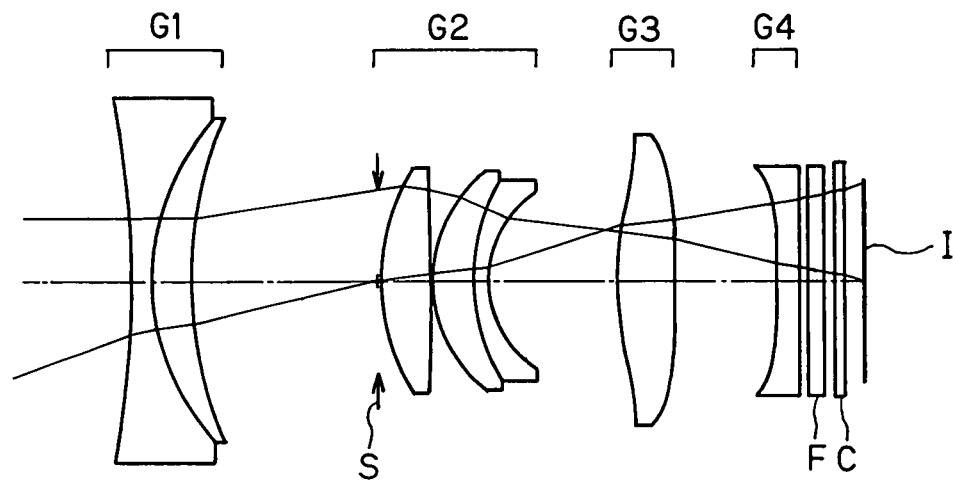
Figure 10C:
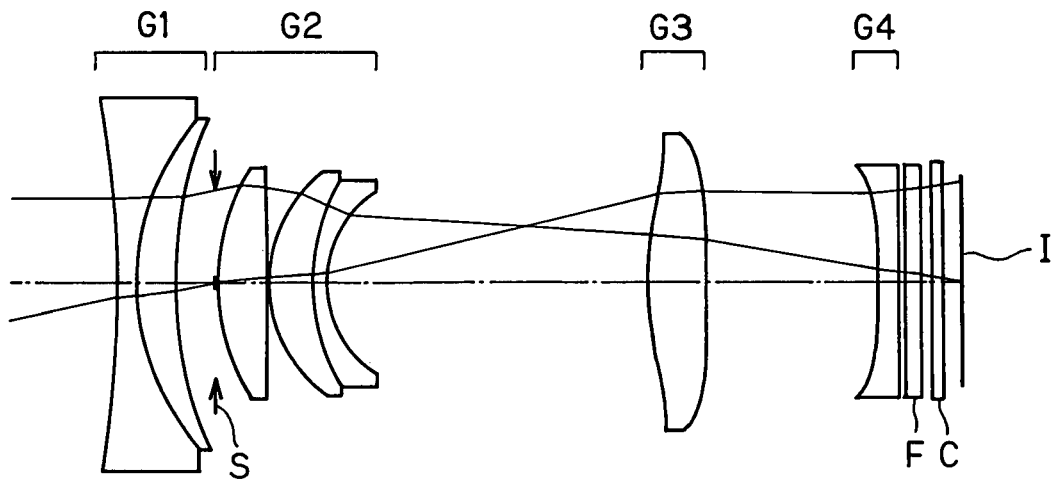

Example 10 is directed to a zoom lens made up of, in order from its object side, the first lens group G6 of negative refracting power, the second lens group G2 of positive refracting power, the third lens group G3 of positive refracting power and the fourth lens group G4 of negative refracting power, as shown in FIG. 10, with the aperture stop S located on the object side of, and integrally with, the second lens group G2. From zooming from the wide-angle end to the telephoto end, the first lens group G1 moves toward the image side in a convex orbit, and is positioned nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes wide. The fourth lens group G4 moves slightly toward the image side while the space between it and the third lens group G3 becomes wide.

In order from the object side, the first lens group G1 is made up of a cemented lens consisting of a double-concave negative lens and a positive meniscus lens convex on the object side; the second lens group G2 is made up of a double-convex positive lens and a cemented lens consisting of a positive meniscus lens convex on the object side and a negative meniscus lens convex on the object side; the third lens group G3 is made up of one positive meniscus lens convex on the object side; and the fourth lens group G4 is made up of one plano-convex positive lens.

Seven aspheric surfaces are used: two at the surfaces nearest to the object and image sides of the cemented lens in the first lens group G1, two at both surfaces of the single double-convex positive lens in the second lens group G2, two at both surfaces of the positive meniscus lens in the third lens group G3, and one at the object side surface of the double-convex positive lens in the fourth lens group G4.

Figure 11A:
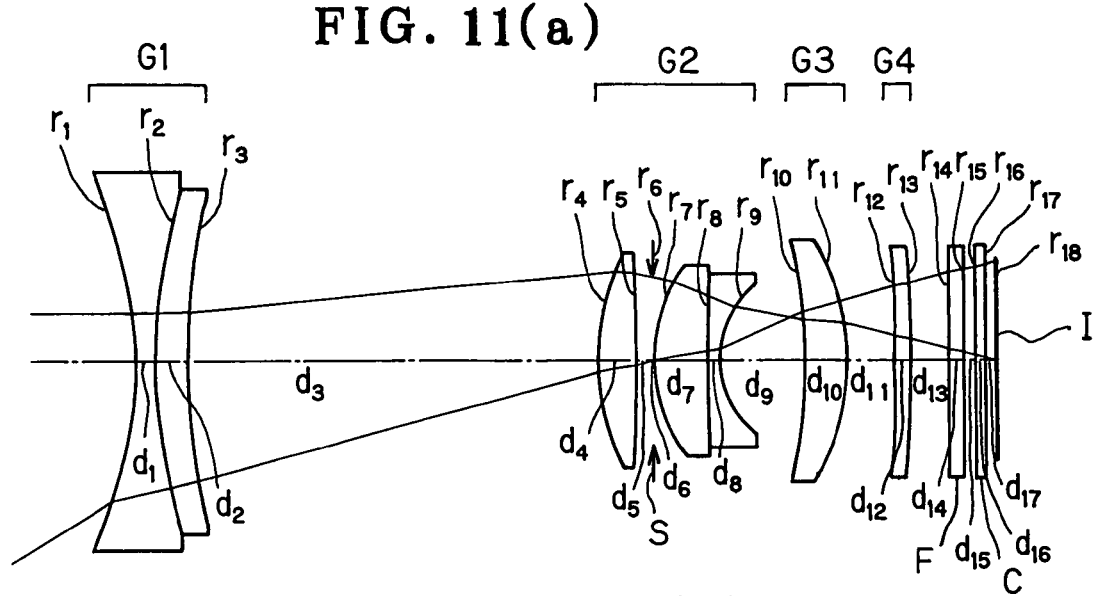
FIG. 11 is illustrative, as in FIG. 1, of Example 11 of the zoom lens according to the invention.
Figure 11B:
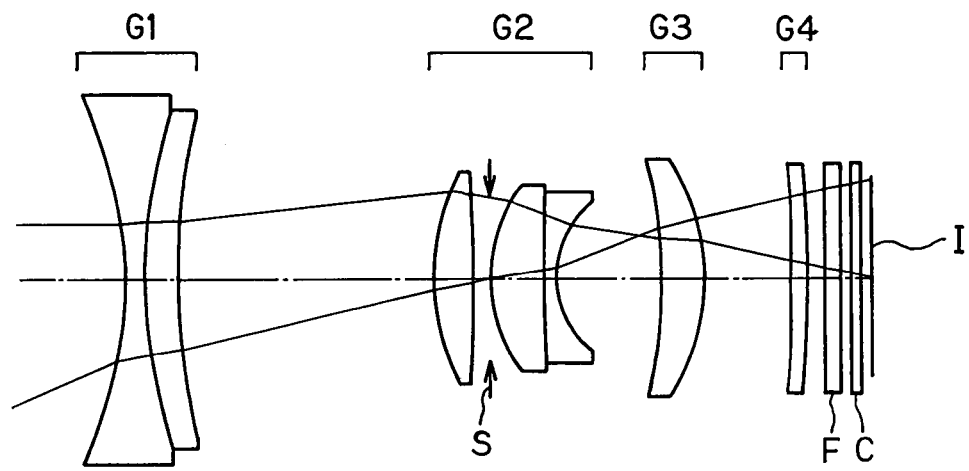
Figure 11C:
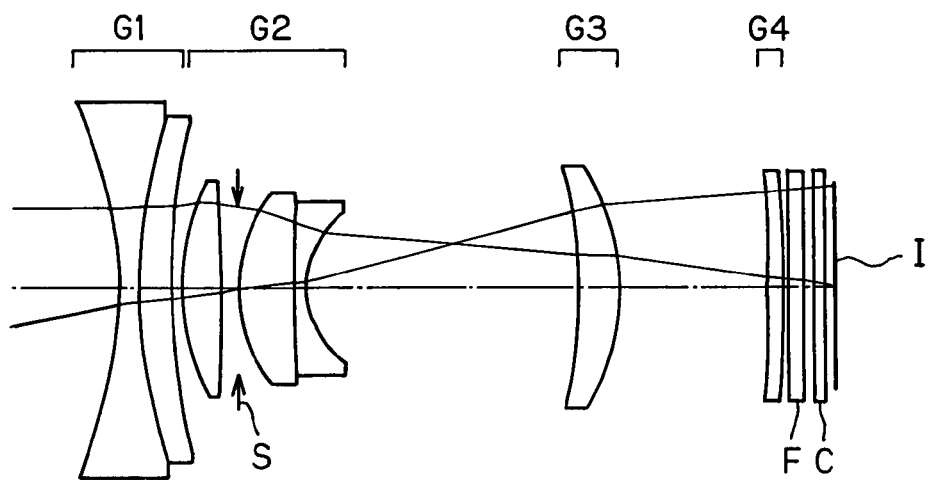

Example 11 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 11, with the aperture stop S located integrally in the second lens group G2. From zooming from the wide-angle end to the telephoto end, the first lens group G1 moves toward the image side. The second lens group G2 moves together with the aperture stop S monotonously toward the object side while the space between it and the first lens group G1 becomes narrow. The third lens group G3 moves toward the object side while the space between it and the second lens group G2 becomes wide. The fourth lens group G4 moves toward the image side.

In order from the object side, the first lens group G1 is made up of a cemented lens consisting of a double-concave negative lens and a positive meniscus lens convex on the object side; the second lens group G2 is made up of a double-convex positive lens, the aperture stop S and a cemented lens consisting of a positive meniscus lens convex on the object side and a negative meniscus lens convex on the object side; the third lens group G3 is made up of one positive meniscus lens convex on the object side; and the fourth lens group G4 is made up of one double-convex positive lens.

Eight aspheric surfaces are used: two at the surfaces nearest to the object and image sides of the cemented lens in the first lens group G1, two at both surfaces of the single double-convex positive lens in the second lens group G2, one at the surface nearest to the object side of the cemented lens in the second lens group G2, two at both surfaces of the positive meniscus lens in the third lens group G3, and one at the object side surface of the double-convex positive lens in the fourth lens group G4.

Figure 12A:
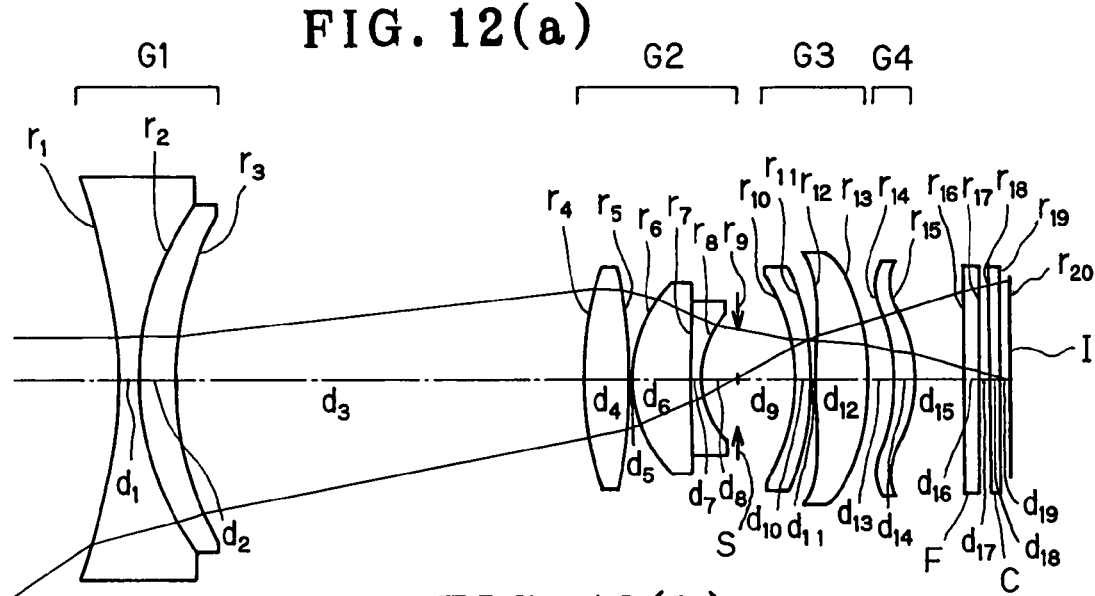
FIG. 12 is illustrative, as in FIG. 1, of Example 12 of the zoom lens according to the invention.
Figure 12B:
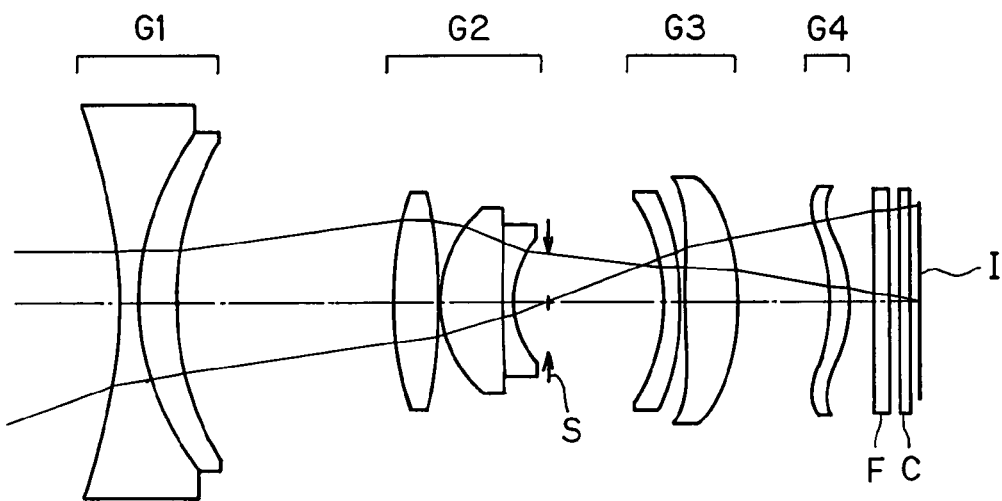
Figure 12C:
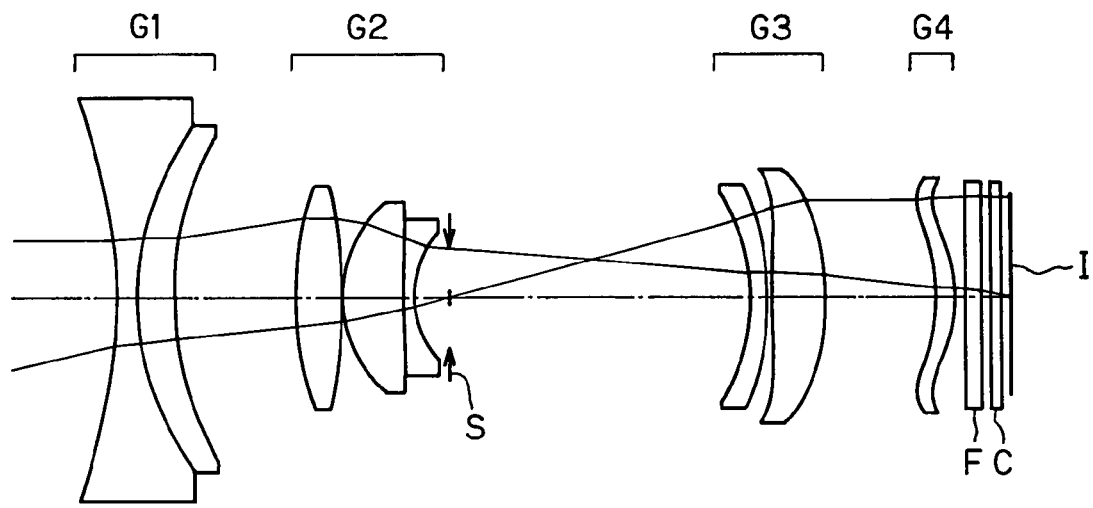

Example 12 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 12, with the aperture stop S located on the image side of, and integrally with, the second lens group G2. From zooming from the wide-angle end to the telephoto end, the first lens group G1 moves toward the image side in a convex orbit, and is positioned somewhat nearer to the object side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes wide. The fourth lens group G4 moves toward the image side.

In order from the object side, the first lens group G1 is made up of a cemented lens consisting of a double-concave negative lens and a positive meniscus lens convex on the object side; the second lens group G2 is made up of a double-convex positive lens and a cemented lens consisting of a positive meniscus lens convex on the object side and a negative meniscus lens convex on the object side; the third lens group G3 is made up of a negative meniscus lens convex on the image side and a double-convex positive lens; and the fourth lens group G4 is made up of one positive meniscus lens convex on the image side.

Nine aspheric surfaces are used: two at the surfaces nearest to the object and image sides of the cemented lens in the first lens group G1, two at both surfaces of the single double-convex positive lens in the second lens group G2, one at the surface nearest to the object side of the cemented lens, two at both surfaces of the double-convex positive lens in the third lens group G3, and two at both surface of the positive meniscus lens in the fourth lens group G4.

Figure 13A:
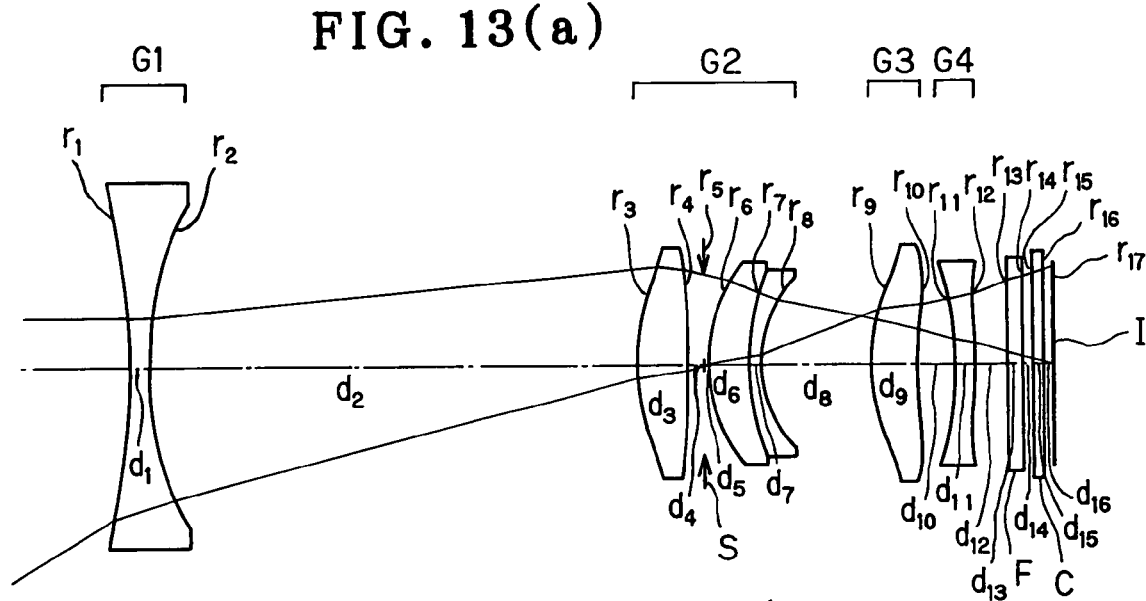
FIG. 13 is illustrative, as in FIG. 1, of Example 13 of the zoom lens according to the invention.
Figure 13B:
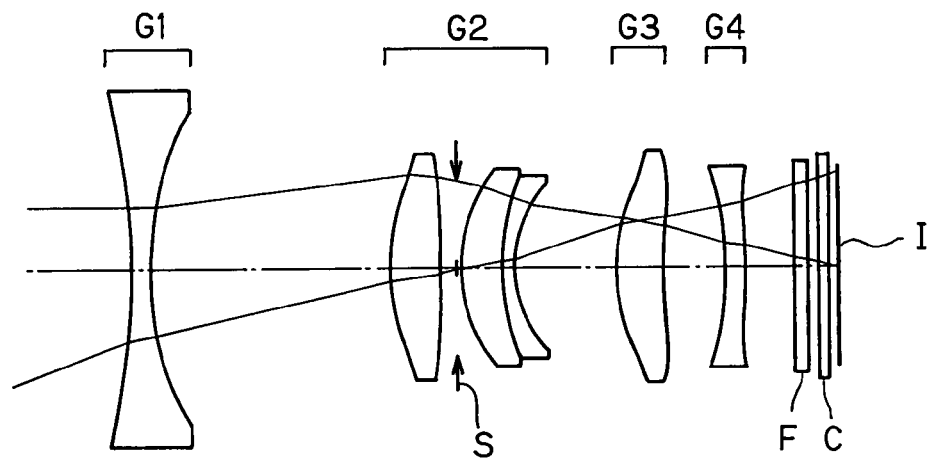
Figure 13C:
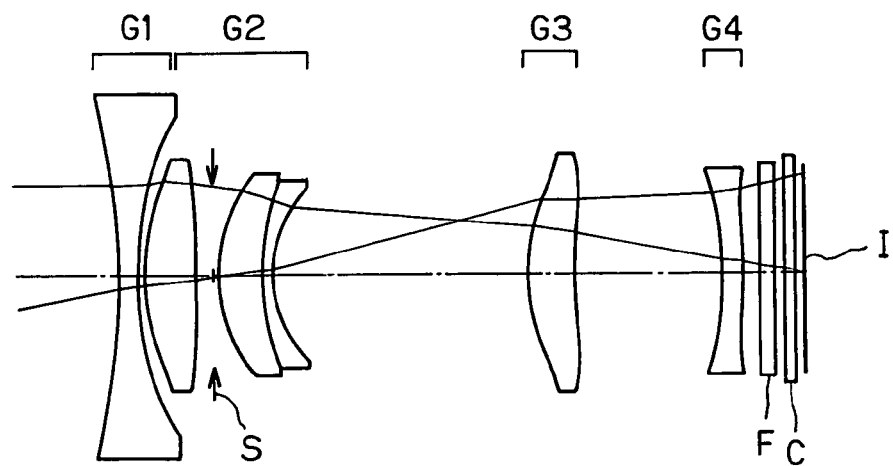

Example 13 is directed to a zoom lens made up of, in order from its object side, the first lens group G1 of negative refracting power, the second lens group G2 of positive refracting power, the third lens group G3 of positive refracting power and the fourth lens group G4 of negative refracting power, as shown in FIG. 13, with the aperture stop S located integrally in the second lens group G2. From zooming from the wide-angle end to the telephoto end, the first lens group G1 moves toward the image side. The second lens group G2 moves together with the aperture stop S monotonously toward the object side while the space between it and the first lens group G1 becomes narrow. The third lens group G3 moves toward the object side while the space between it and the second lens group G2 becomes somewhat narrow from the wide-angle end to the intermediate state and then becomes wide from the intermediate state to the telephoto end. The fourth lens group G4 moves in a convex orbit toward the image side while the space between it and the third lens group G3 becomes wide, and is positioned nearer to the image side at the telephoto end than at the wide-angle end.

In order from the object side, the first lens group G1 is made up of one double-concave negative lens; the second lens group G2 is made up of a double-convex positive lens, the aperture stop S and a cemented lens consisting of a positive meniscus lens convex on the object side and a negative meniscus lens convex on the object side; the third lens group G3 is made up of one positive meniscus lens convex on the object side; and the fourth lens group G4 is made up of one negative meniscus lens convex on the image side.

Seven aspheric surfaces are used: two at both surfaces of the double-concave negative lens in the first lens group G1, two at both surfaces of the single double-convex positive lens in the second lens group G2, two at both surfaces of the positive meniscus lens in the third lens group G3, and one at the image side surface of the negative meniscus lens in the fourth lens group G4.

Figure 14A:
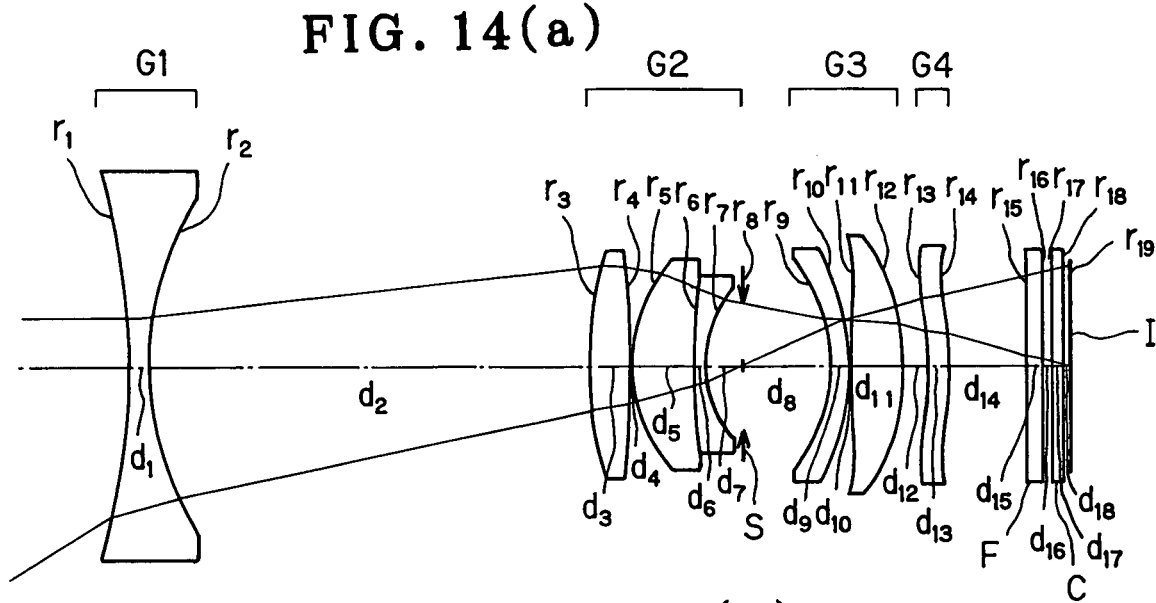
FIG. 14 is illustrative, as in FIG. 1, of Example 14 of the zoom lens according to the invention.
Figure 14B:
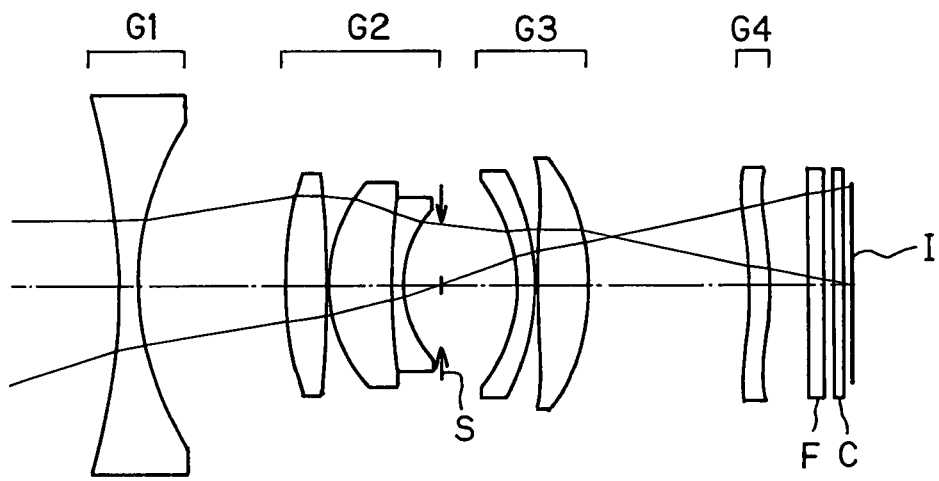
Figure 14C:
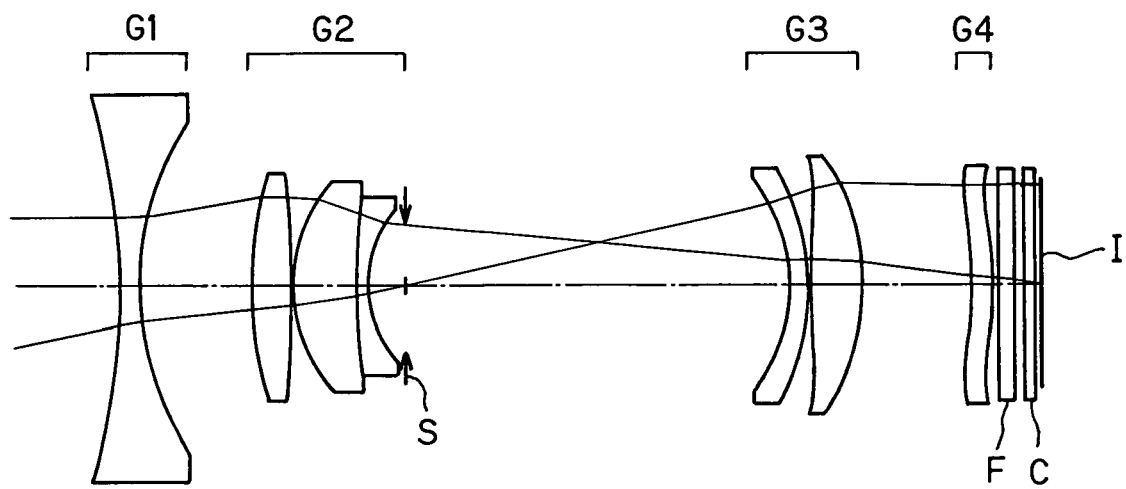

Example 14 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 14, with the aperture stop S located on the image side of, and integrally with, the second lens group G2. From zooming from the wide-angle end to the telephoto end, the first lens group G1 moves toward the image side in a convex orbit, and is positioned somewhat nearer to the image side at the telephoto end than at the wide-angle end. The second lens group G2 moves together with the aperture stop S monotonously toward the object side while the space between it and the first lens group G1 becomes narrow. The third lens group G3 moves toward the object side while the space between it and the second lens group G2 becomes slightly narrow from the wide-angle end to the intermediate state and then becomes wide from the intermediate state to the telephoto end. The fourth lens group G4 moves toward the image side.

In order from the object side, the first lens group G1 is made up of one double-concave negative lens; the second lens group G2 is made up of a positive meniscus lens convex on the object side and a cemented lens consisting of a positive meniscus lens convex on the object side and a negative meniscus lens convex on the object side; the third lens group G3 is made up of a negative meniscus lens convex on the image side and a double-convex positive lens; and the fourth lens group G4 is made up of one positive meniscus lens convex on the image side.

Nine aspheric surfaces are used: two at both surfaces of the double-concave negative lens in the first lens group G1, two at both surfaces of the single double-convex positive lens in the second lens group G2, one at the surface nearest to the image side of the cemented lens in the second lens group G2, two at both surfaces of the double-convex positive lens in the third lens group G3, and two at both surfaces of the positive meniscus lens in the fourth lens group G4.

Figure 15A:
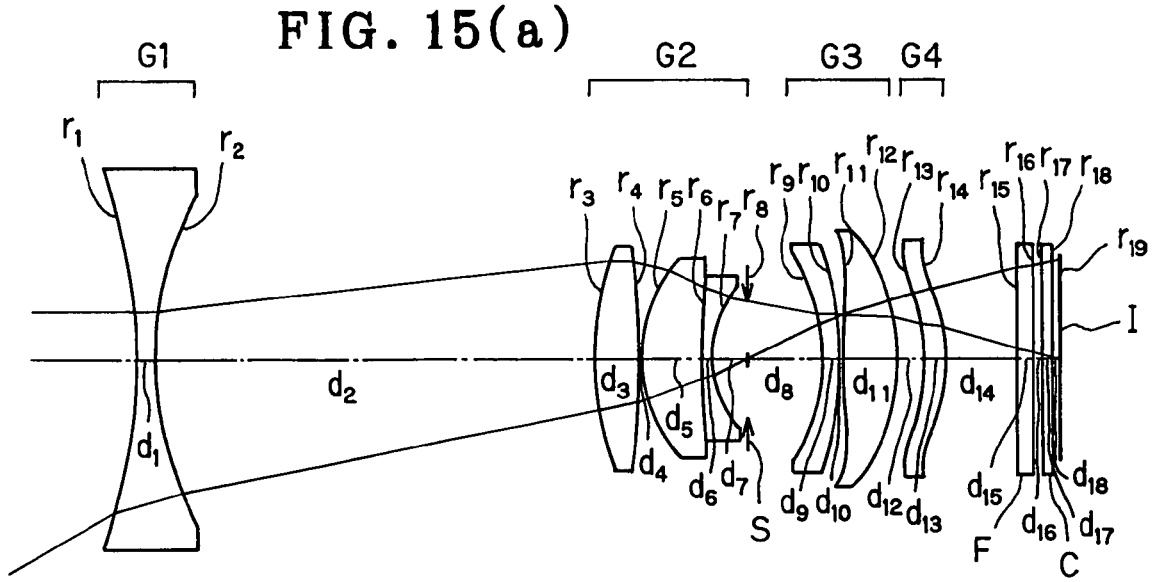
FIG. 15 is illustrative, as in FIG. 1, of Example 15 of the zoom lens according to the invention.
Figure 15B:
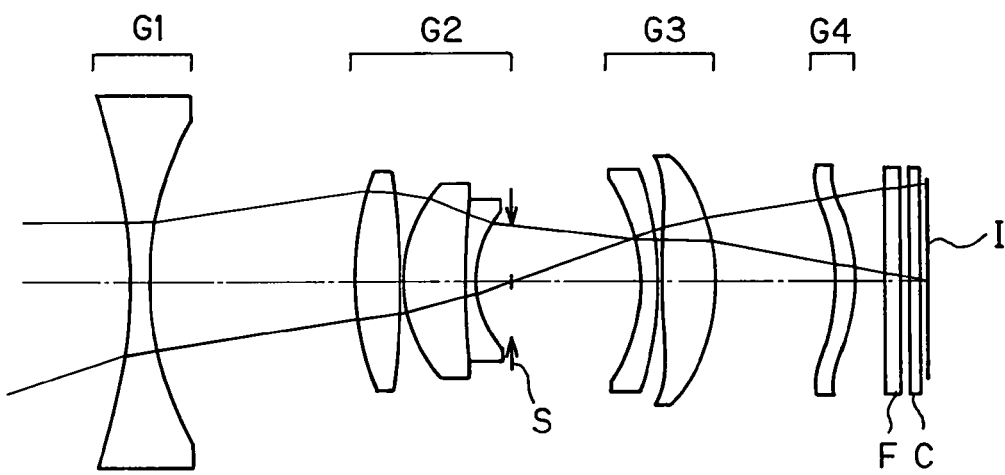
Figure 15C:
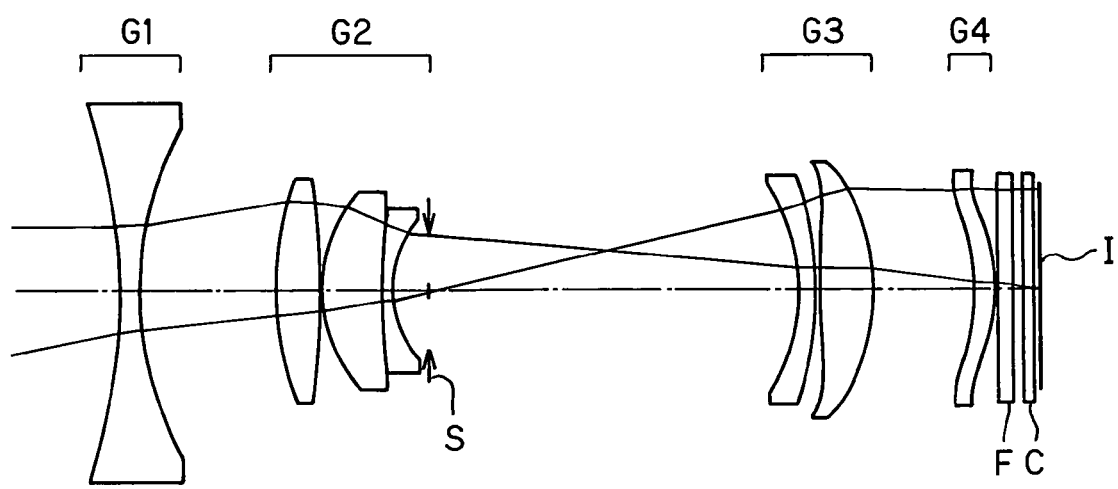
Figure 16A:
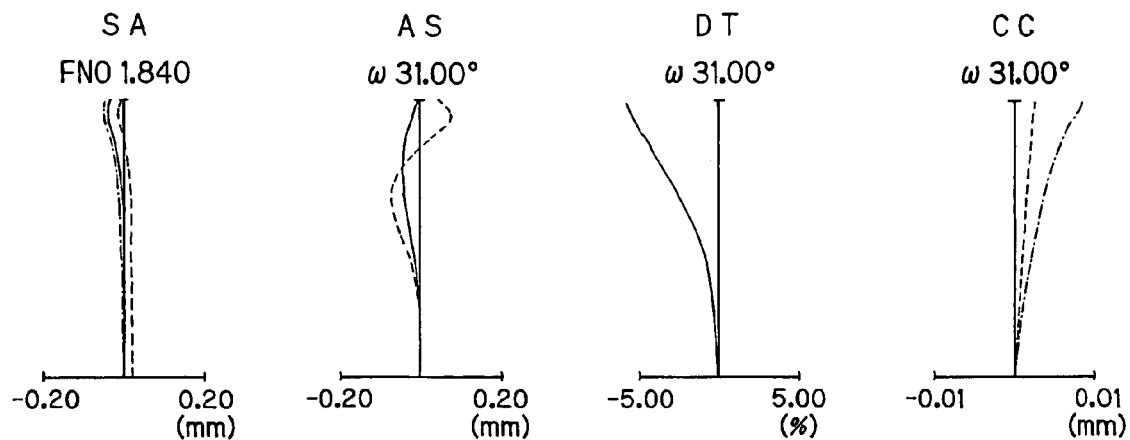
FIG. 16 is indicative of aberration diagrams for Example 1 upon focusing on an object point at infinity.
Figure 16B:
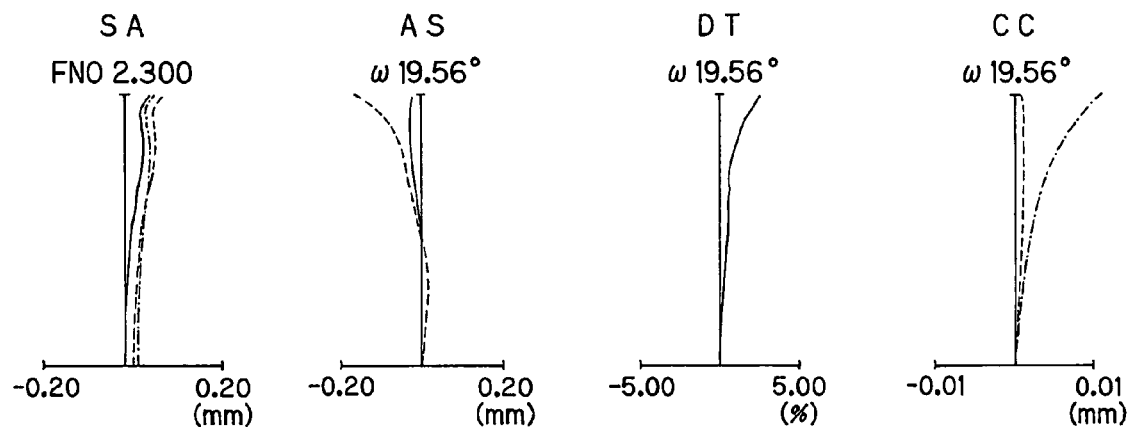
Figure 16C:
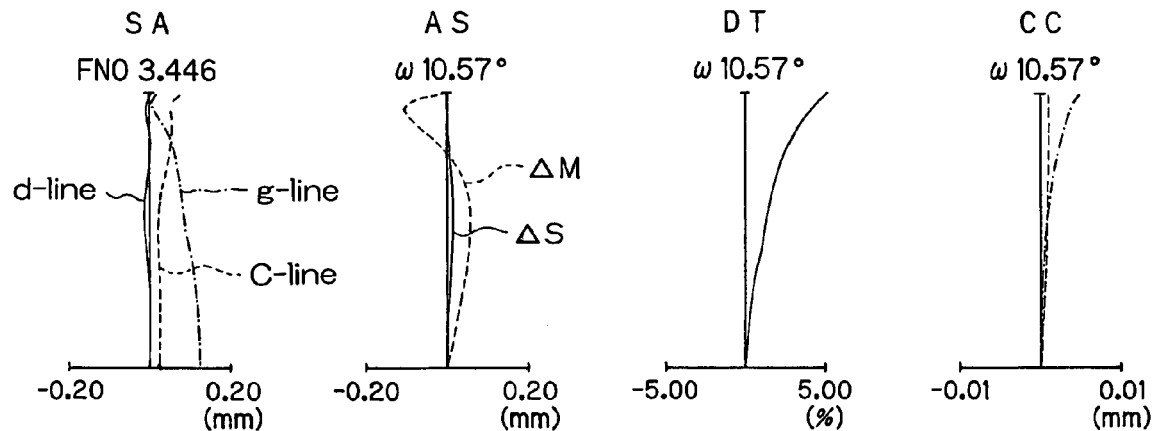
Figure 17A:
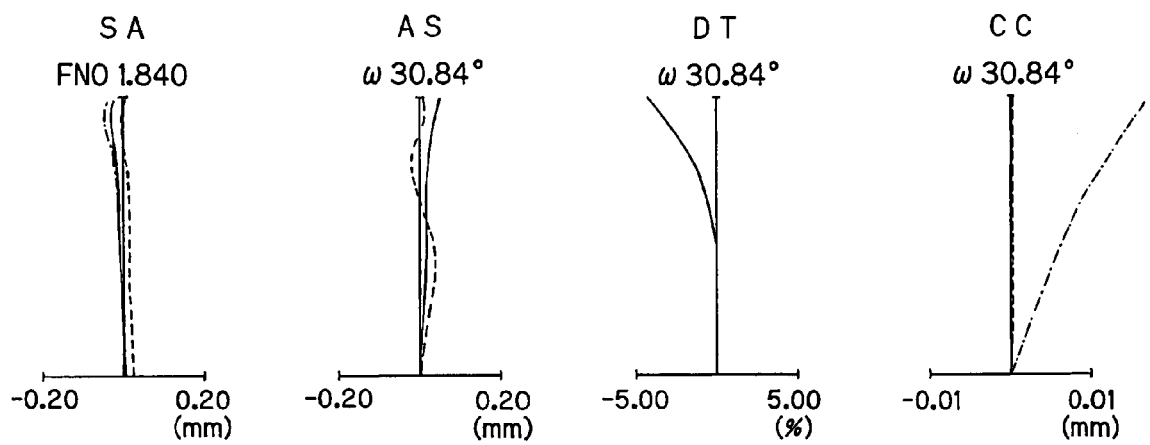
FIG. 17 is indicative of aberration diagrams for Example 2 upon focusing on an object point at infinity.
Figure 17B:
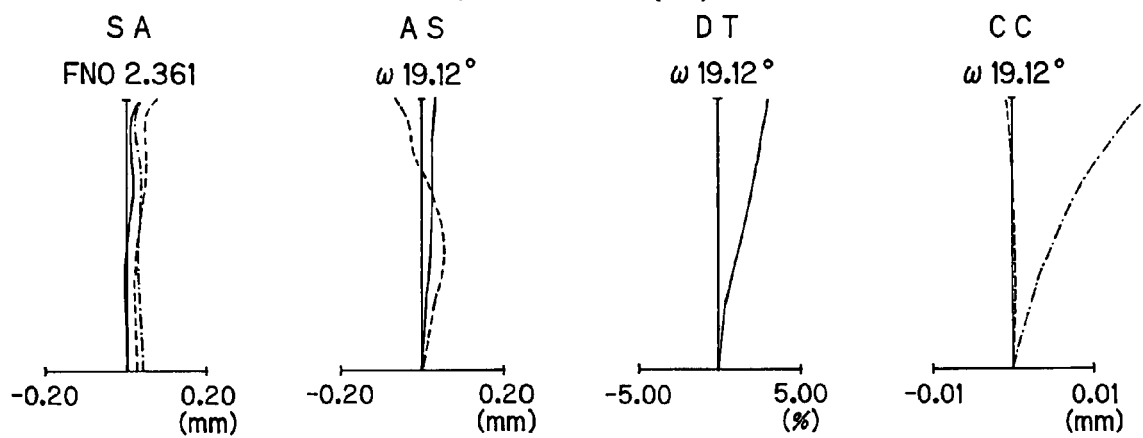
Figure 17C:
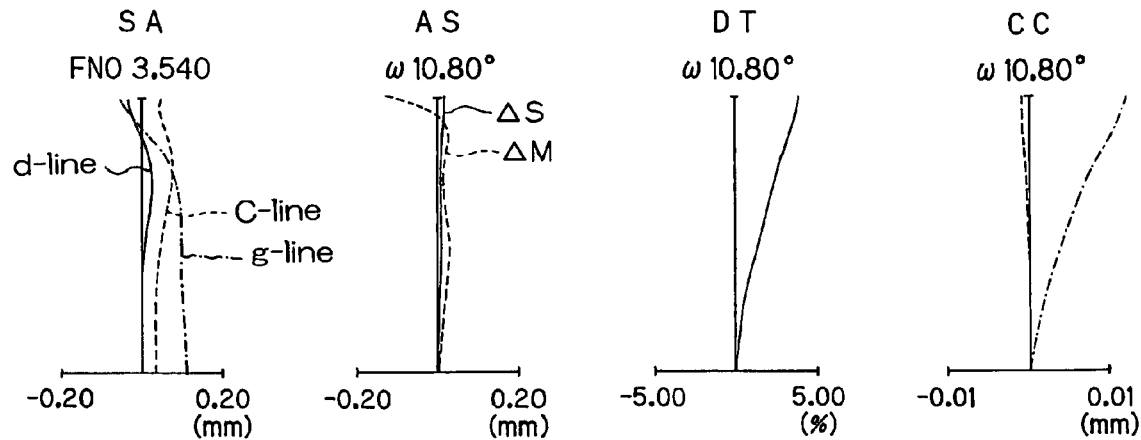
Figure 18A:
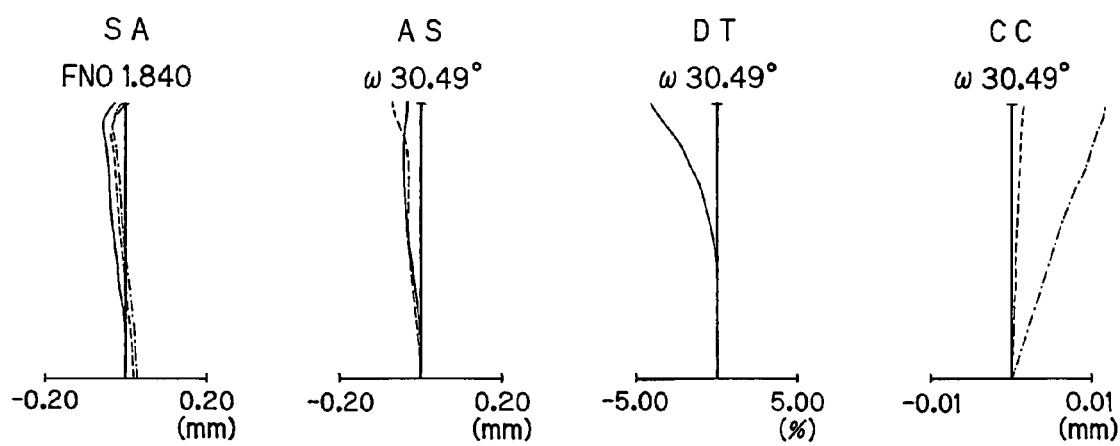
FIG. 18 is indicative of aberration diagrams for Example 3 upon focusing on an object point at infinity.
Figure 18B:
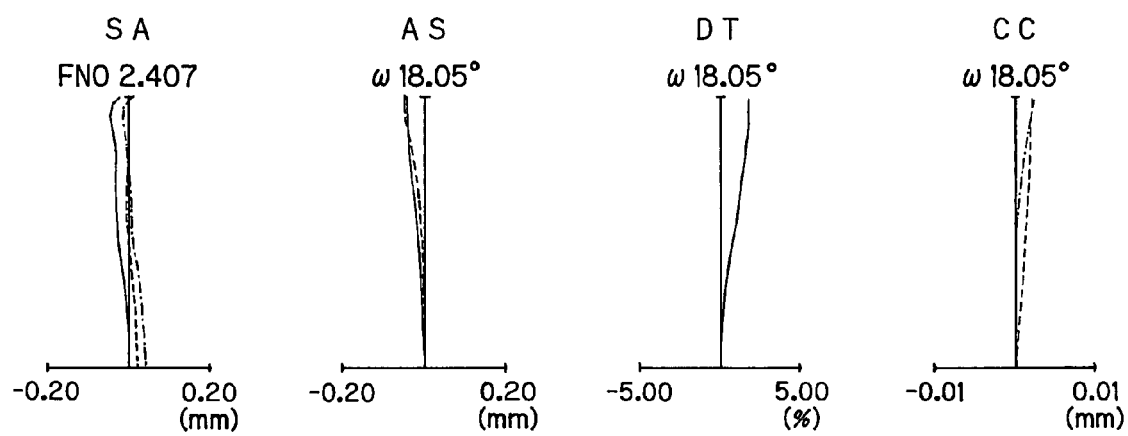
Figure 18C:
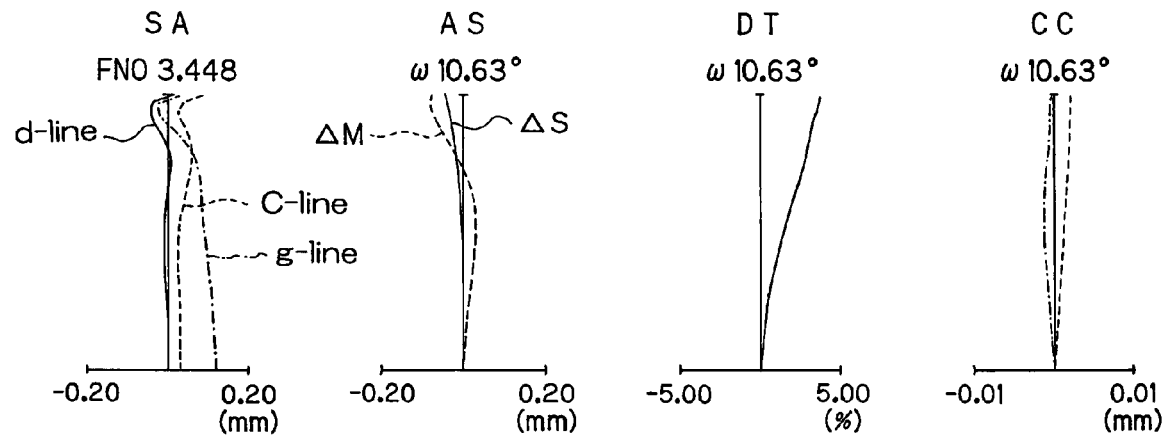
Figure 19A:
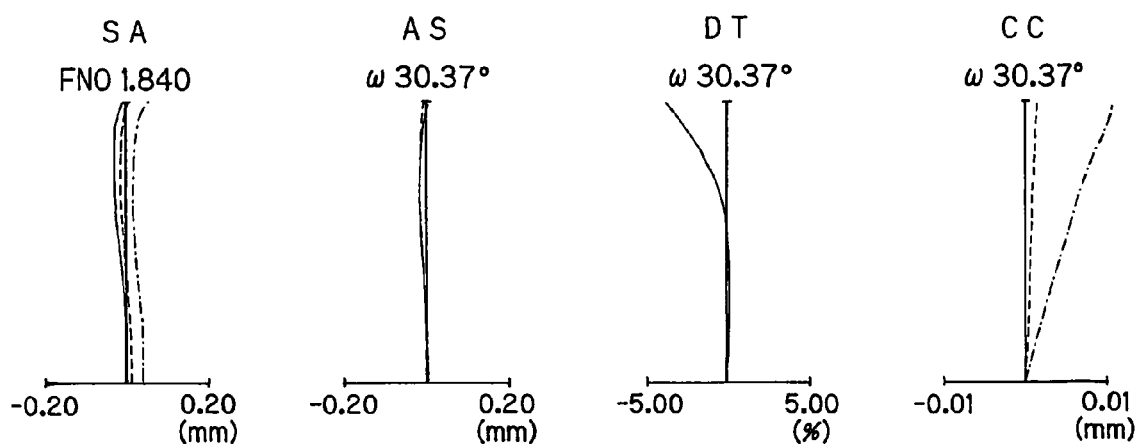
FIG. 19 is indicative of aberration diagrams for Example 4 upon focusing on an object point at infinity.
Figure 19B:
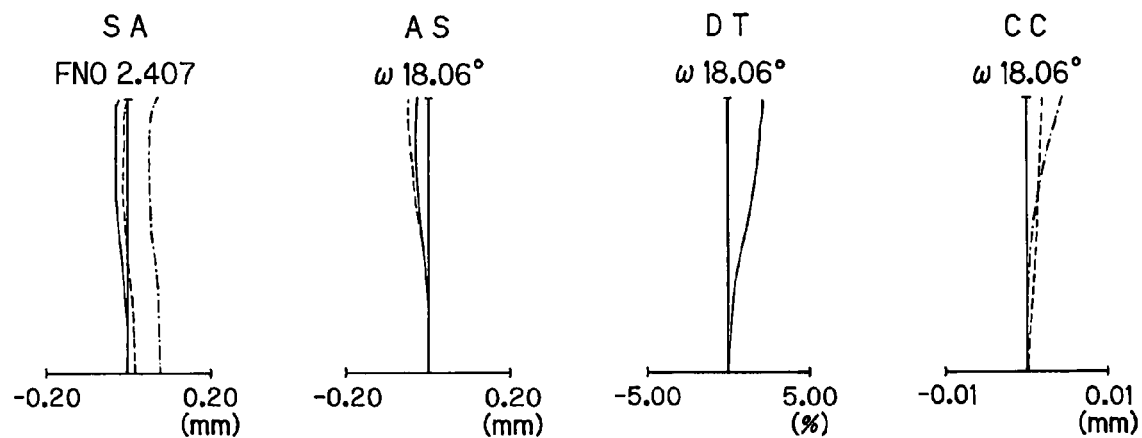
Figure 19C:
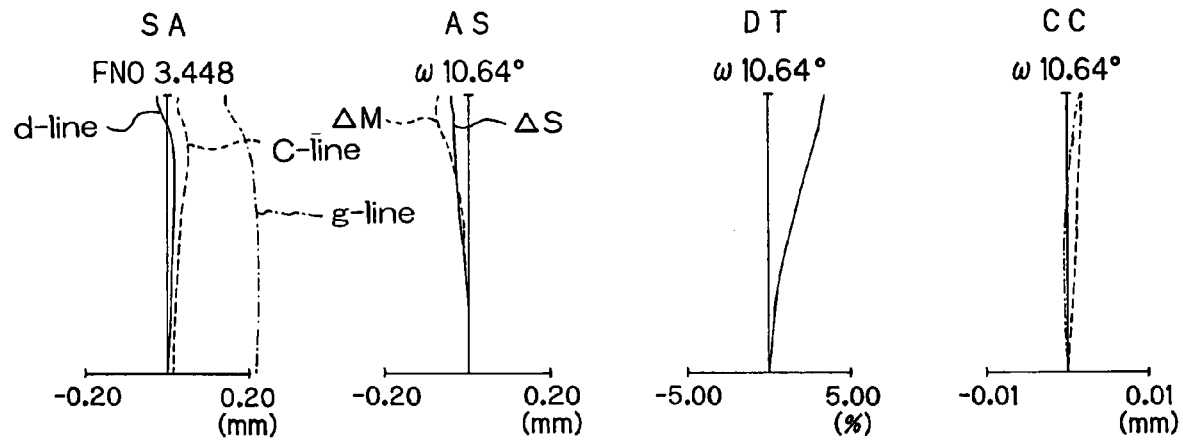
Figure 20A:
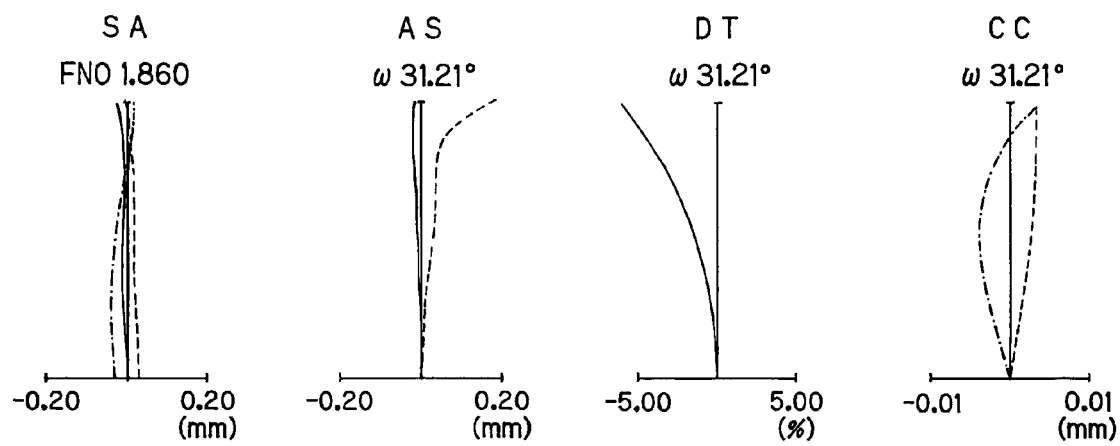
FIG. 20 is indicative of aberration diagrams for Example 5 upon focusing on an object point at infinity.
Figure 20B:
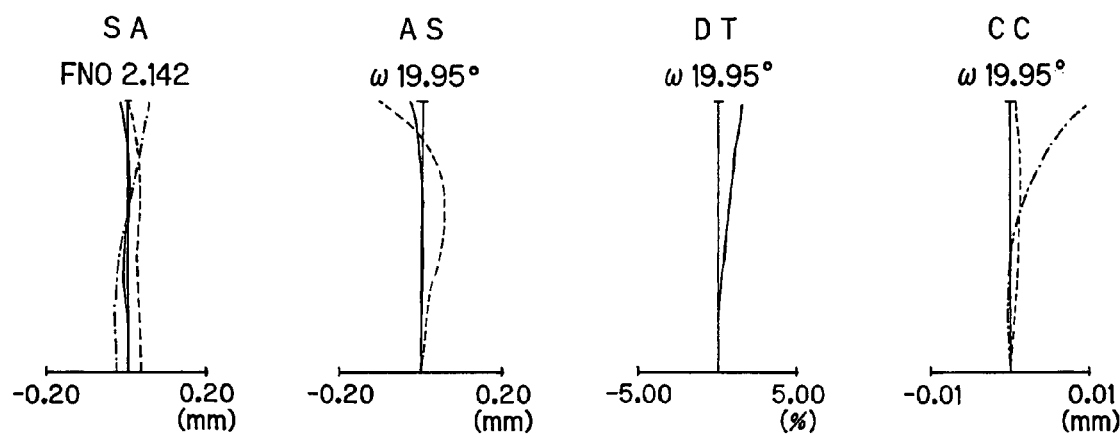
Figure 20C:
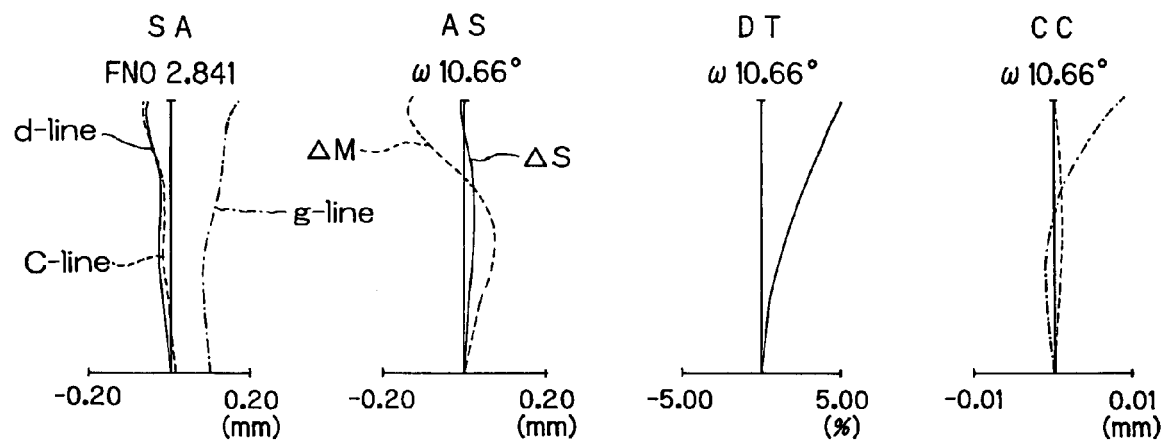
Figure 21A:
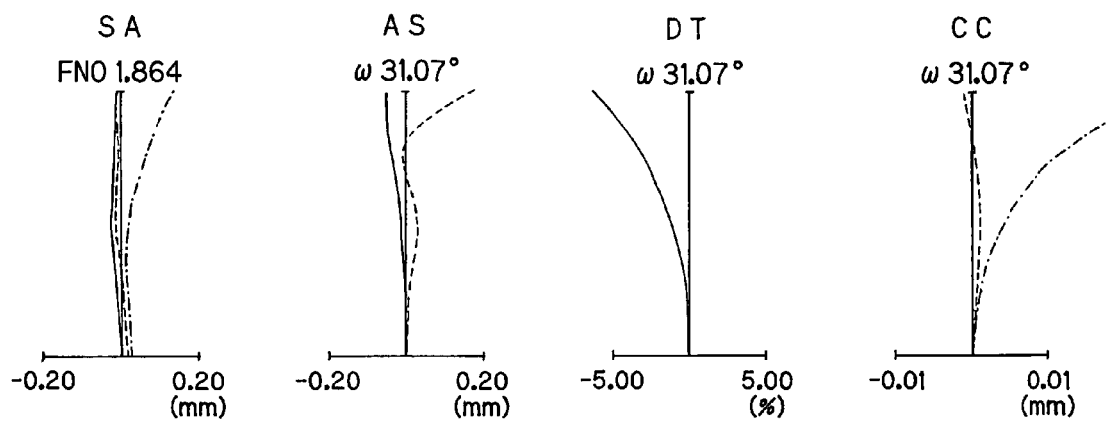
FIG. 21 is indicative of aberration diagrams for Example 6 upon focusing on an object point at infinity.
Figure 21B:
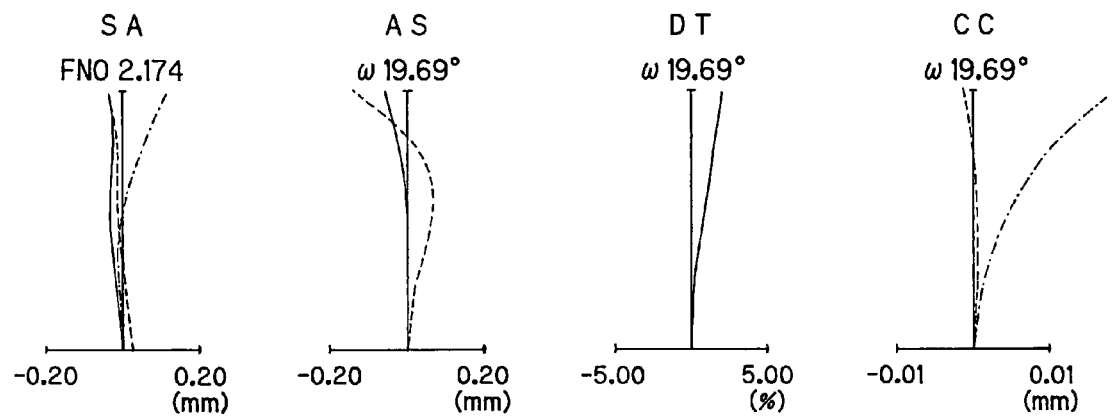
Figure 21C:
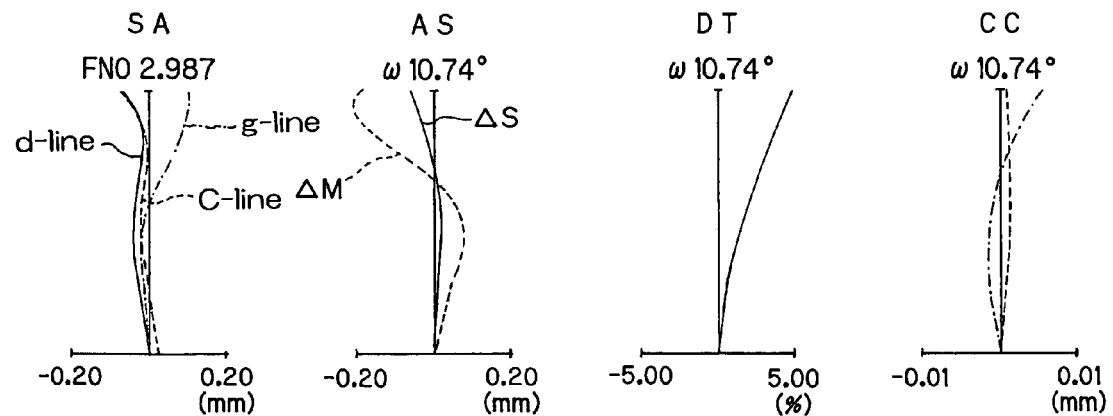
Figure 22A:
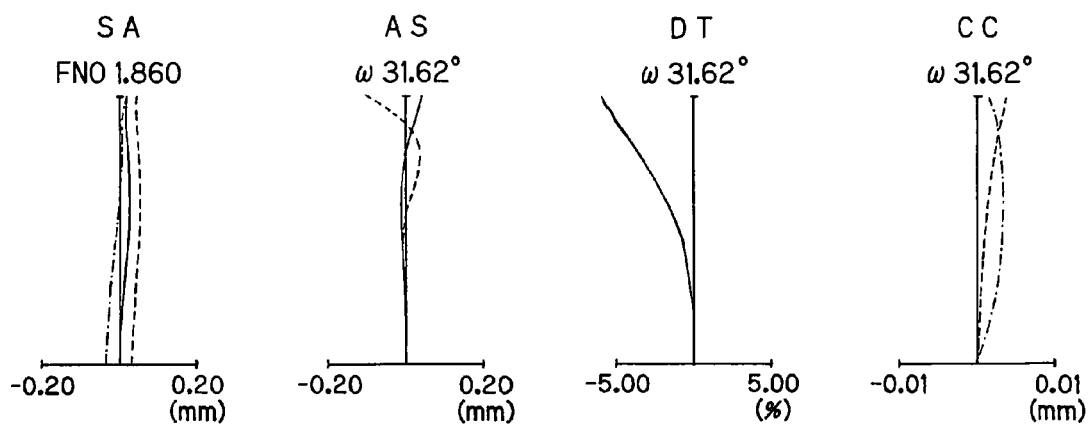
FIG. 22 is indicative of aberration diagrams for Example 7 upon focusing on an object point at infinity.
Figure 22B:
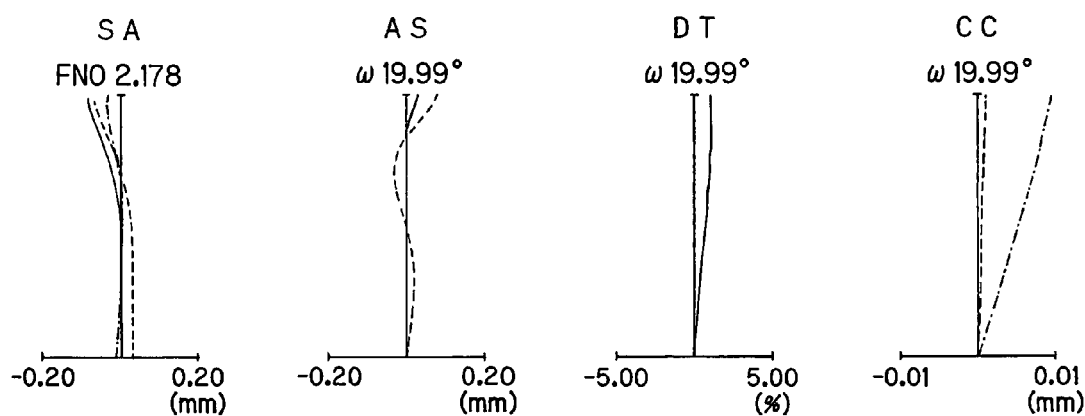
Figure 22C:
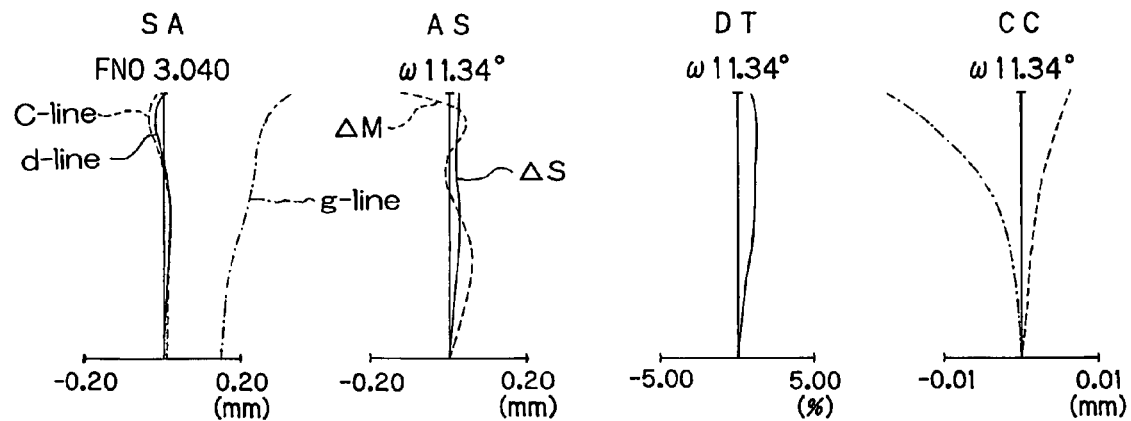
Figure 23A:
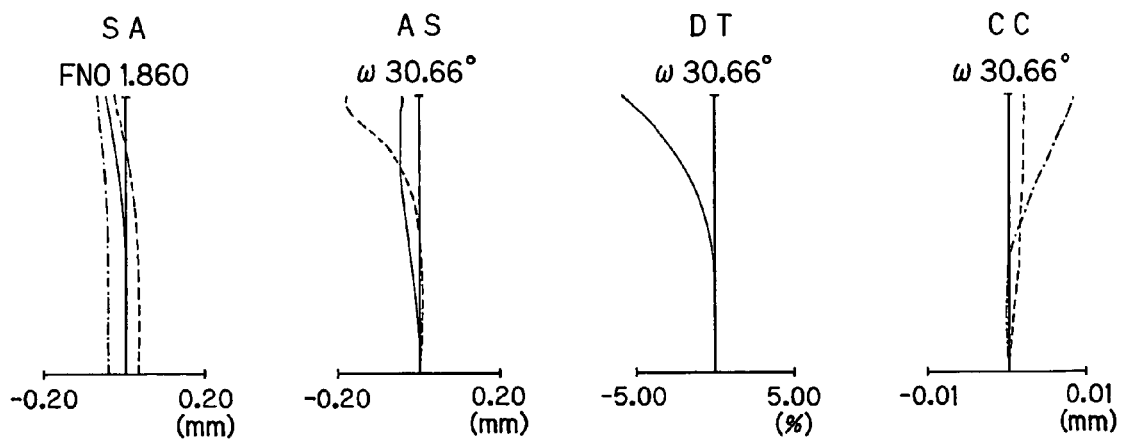
FIG. 23 is indicative of aberration diagrams for Example 8 upon focusing on an object point at infinity.
Figure 23B:
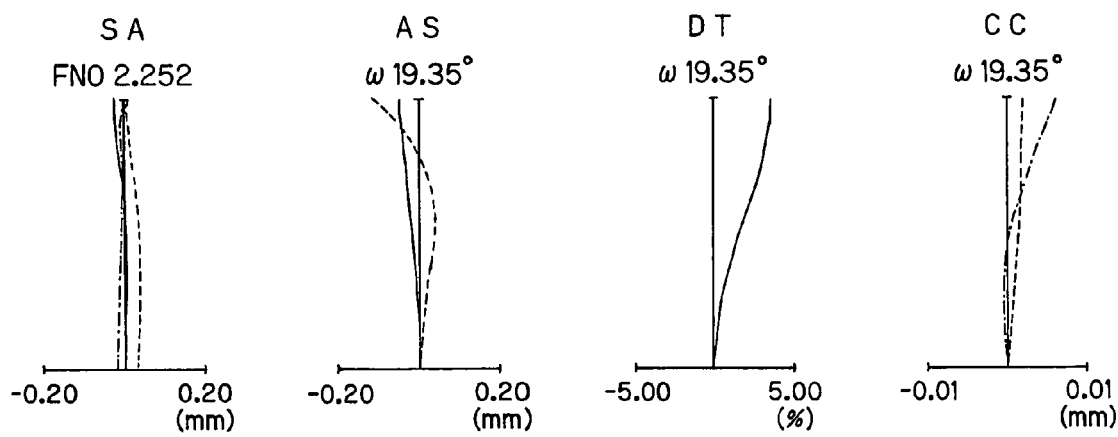
Figure 23C:
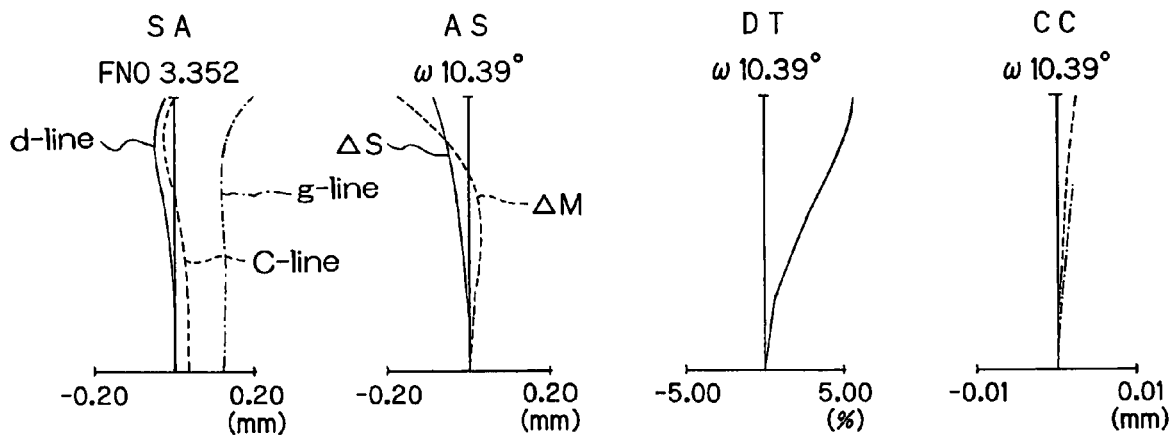
Figure 24A:
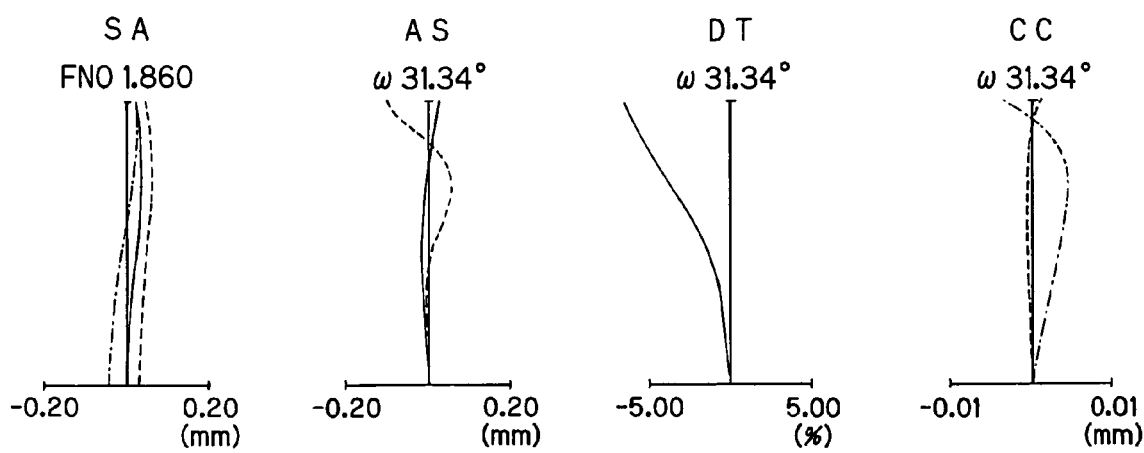
FIG. 24 is indicative of aberration diagrams for Example 9 upon focusing on an object point at infinity.
Figure 24B:
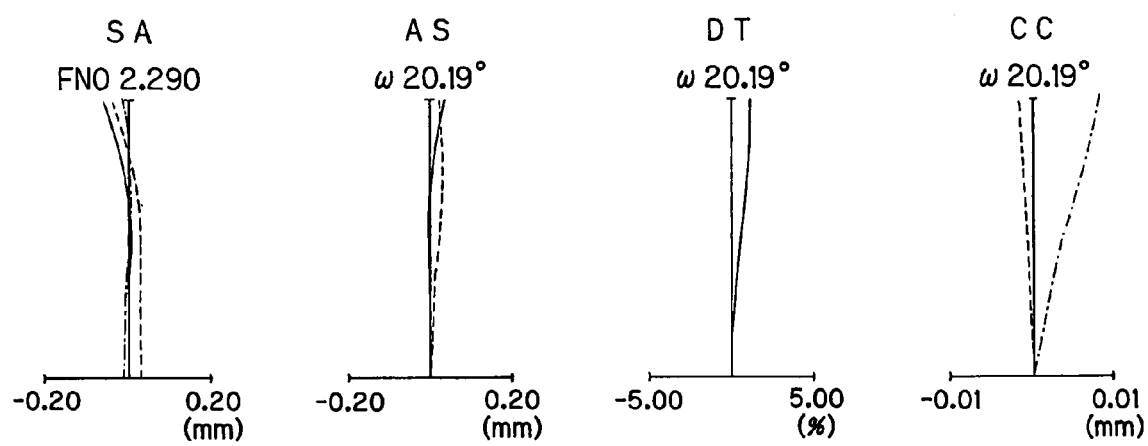
Figure 24C:
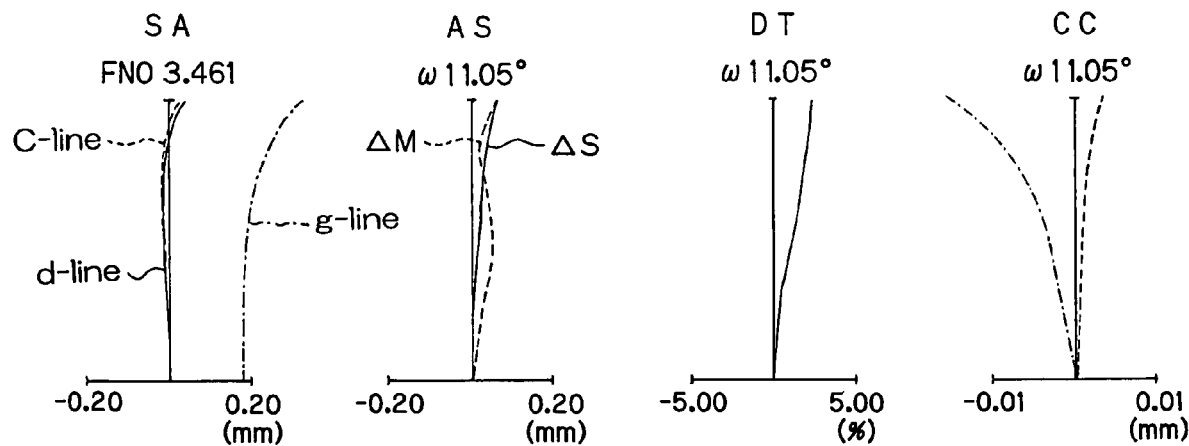
Figure 25A:
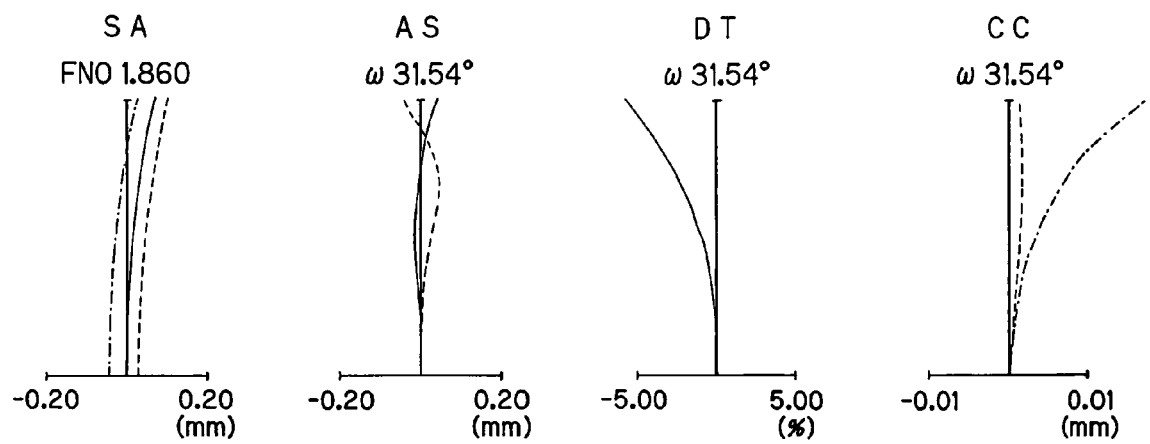
FIG. 25 is indicative of aberration diagrams for Example 10 upon focusing on an object point at infinity.
Figure 25B:
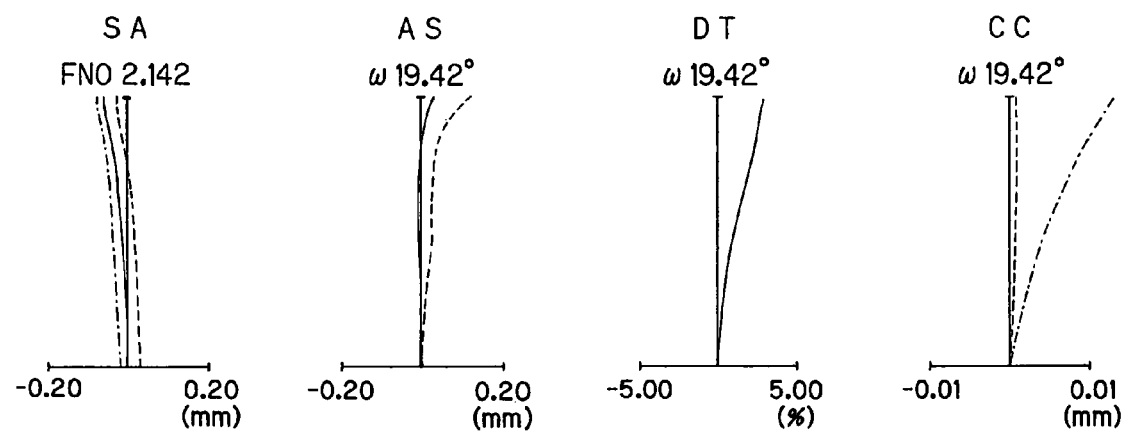
Figure 25C:
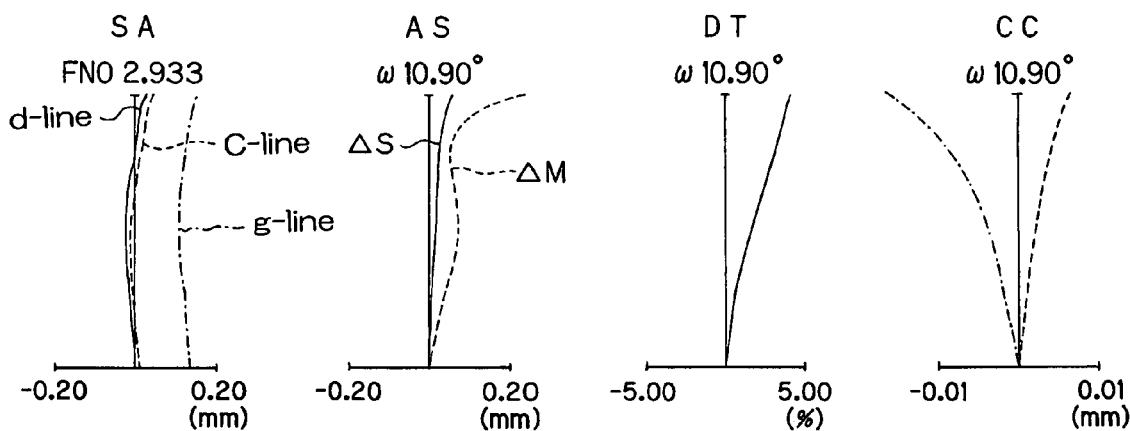
Figure 26A:
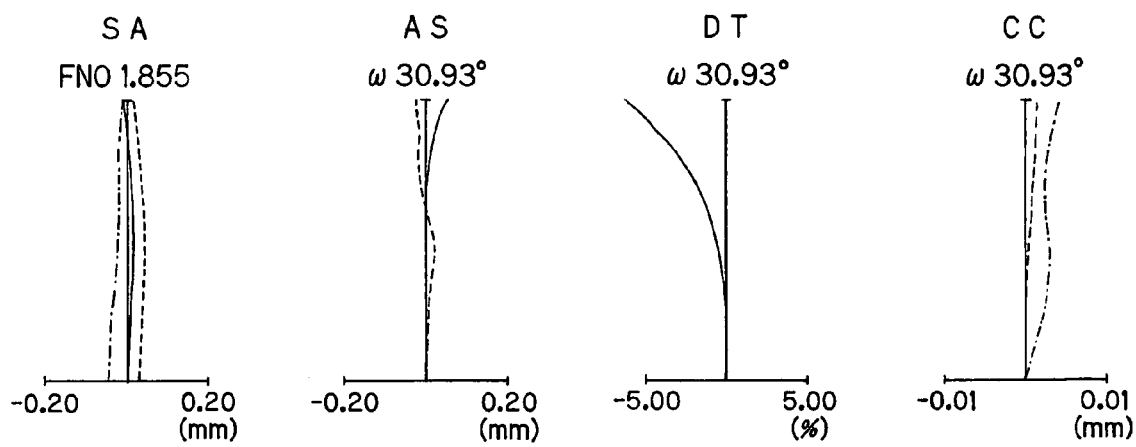
FIG. 26 is indicative of aberration diagrams for Example 11 upon focusing on an object point at infinity.
Figure 26B:
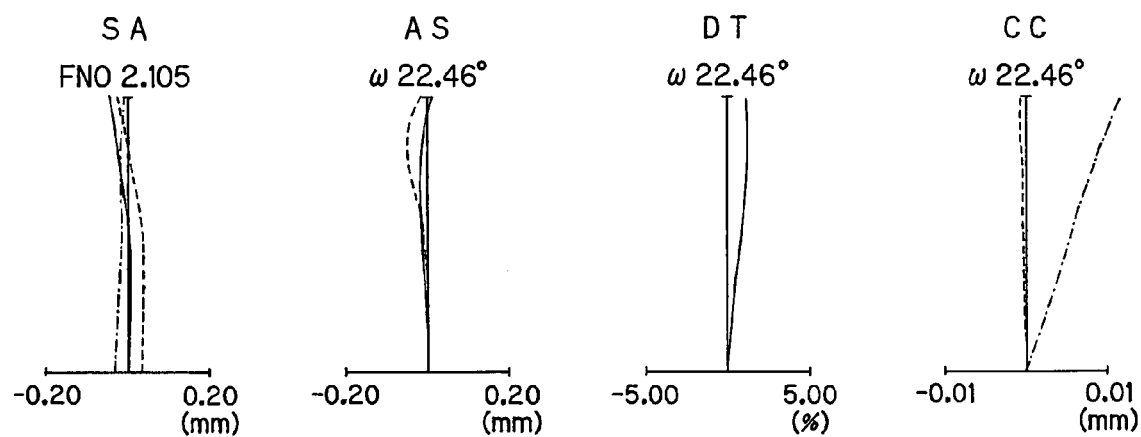
Figure 26C:
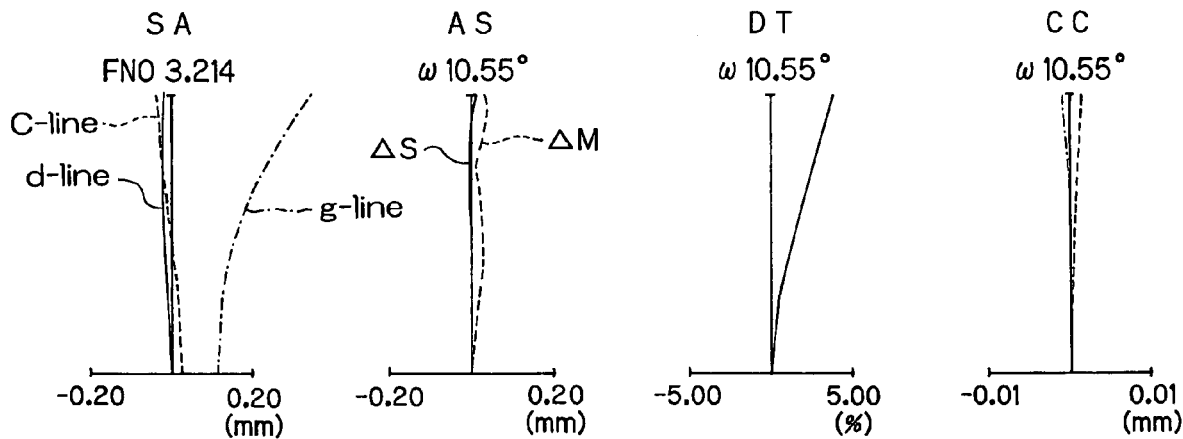
Figure 27A:
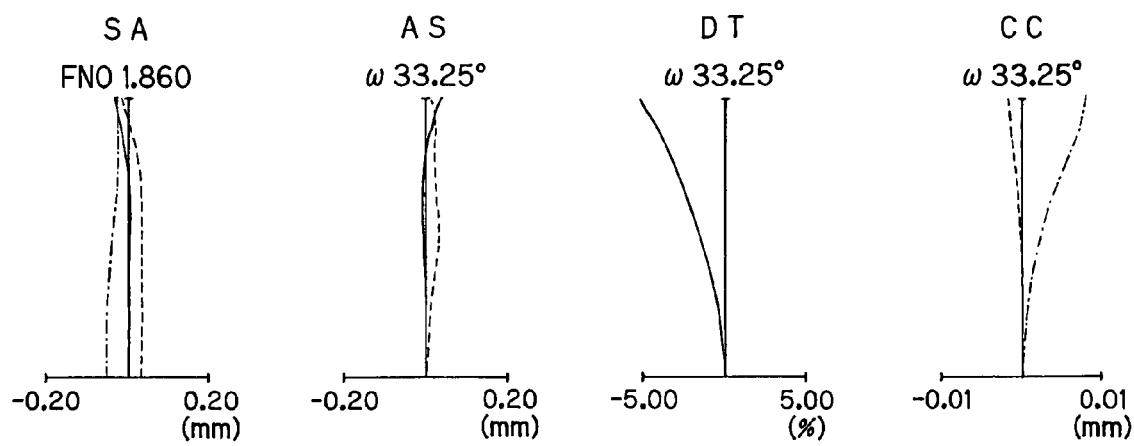
FIG. 27 is indicative of aberration diagrams for Example 12 upon focusing on an object point at infinity.
Figure 27B:
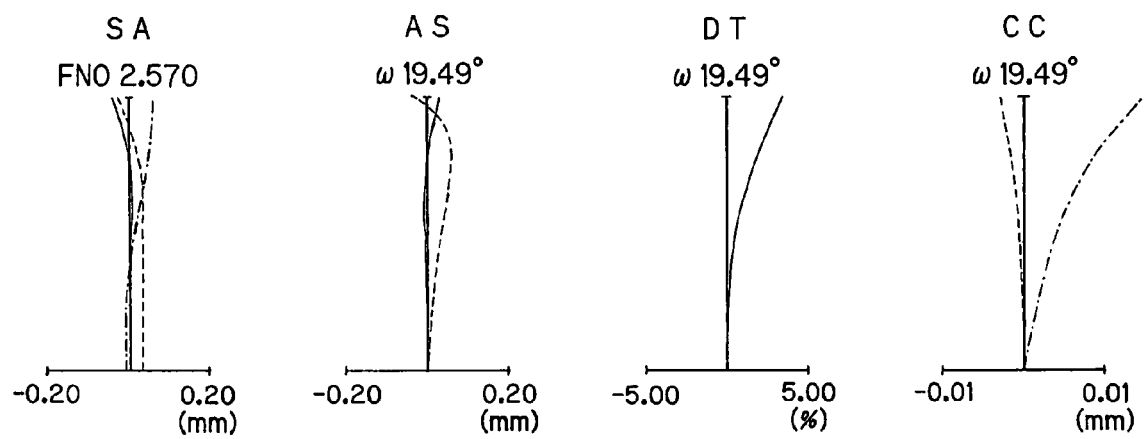
Figure 27C:
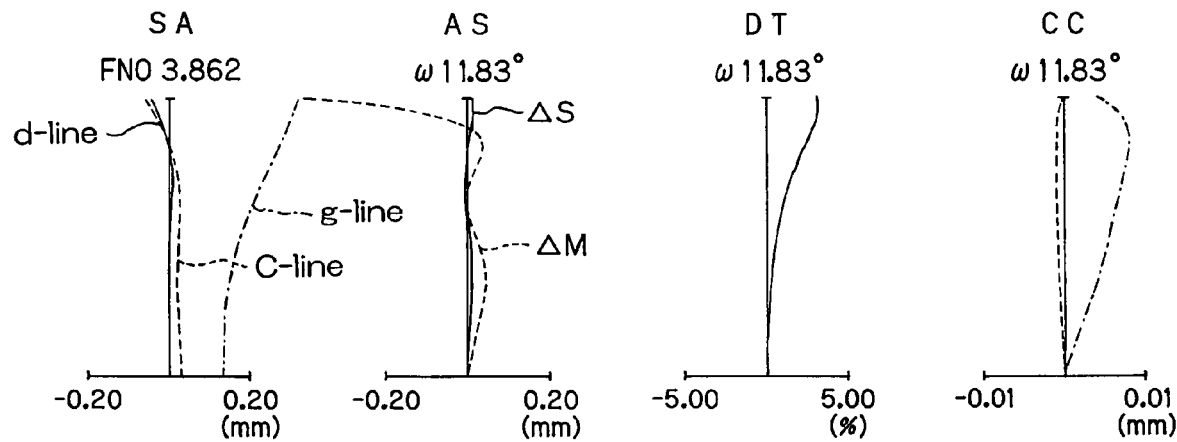
Figure 28A:
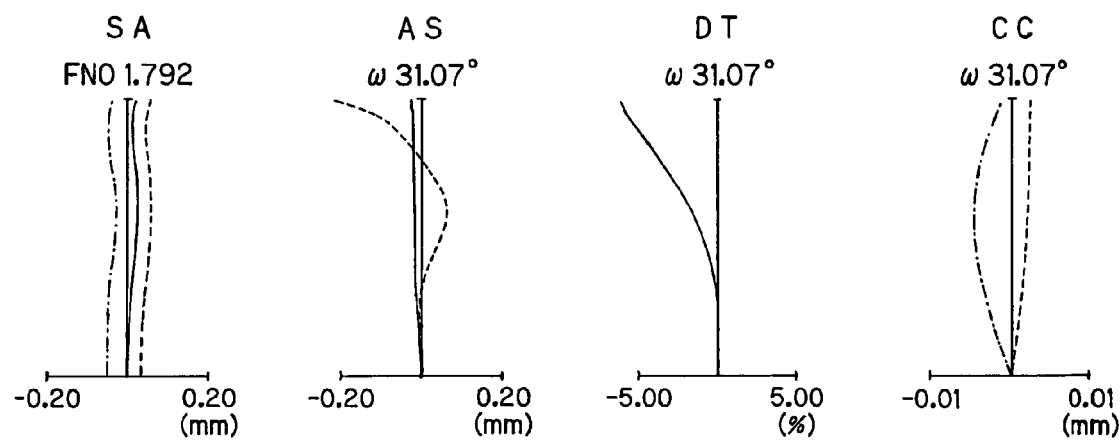
FIG. 28 is indicative of aberration diagrams for Example 13 upon focusing on an object point at infinity.
Figure 28B:
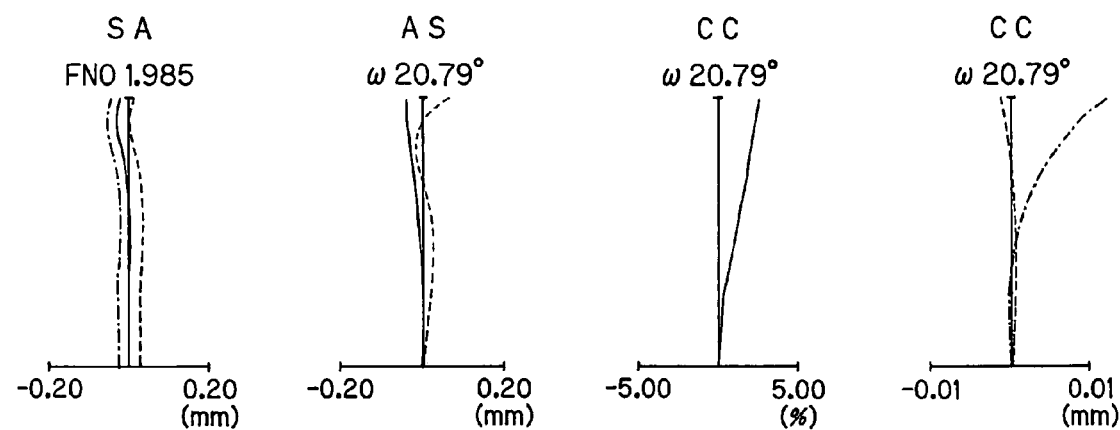
Figure 28C:
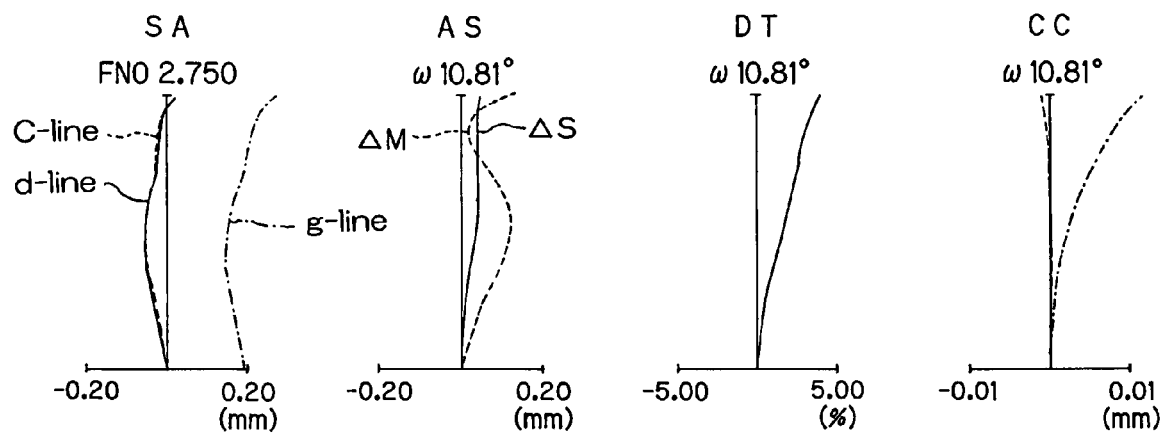
Figure 29A:
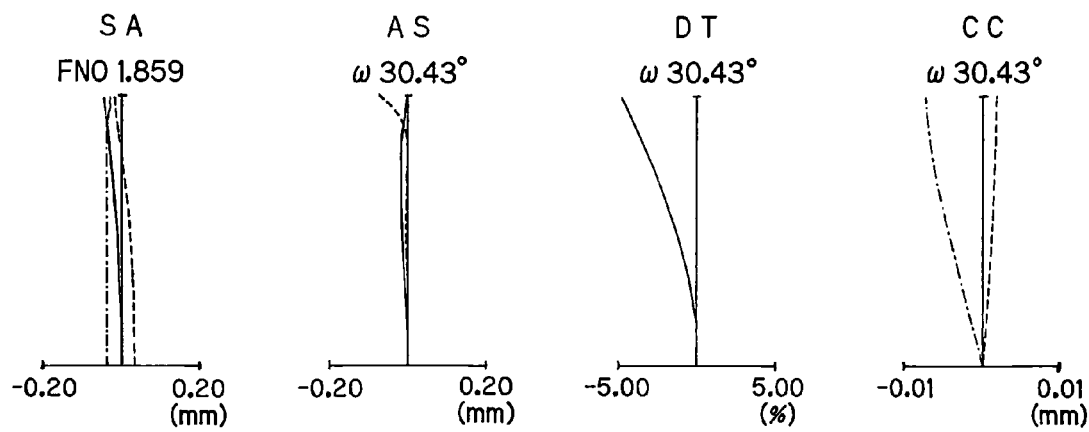
FIG. 29 is indicative of aberration diagrams for Example 14 upon focusing on an object point at infinity.
Figure 29B:
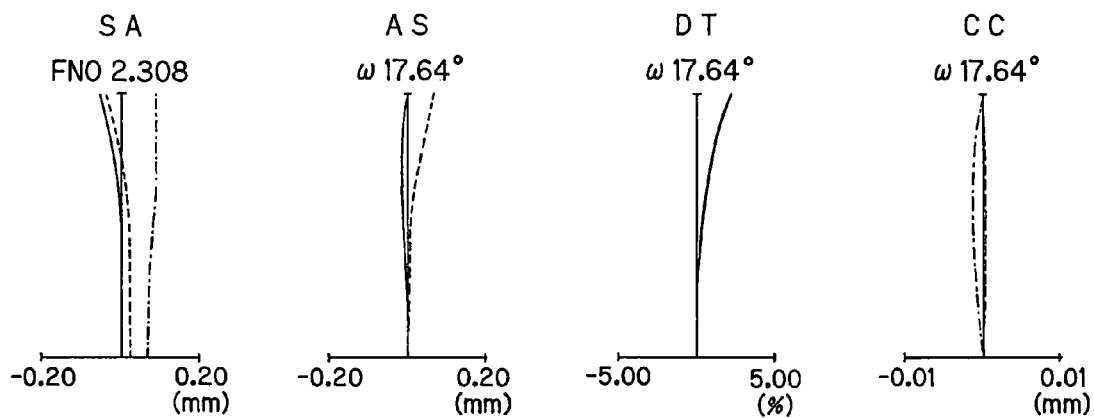
Figure 29C:
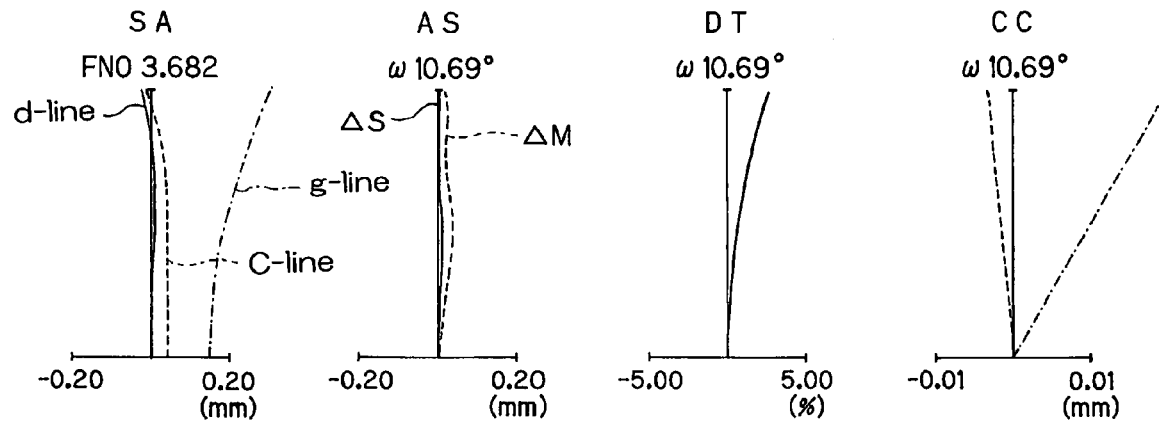
Figure 30A:
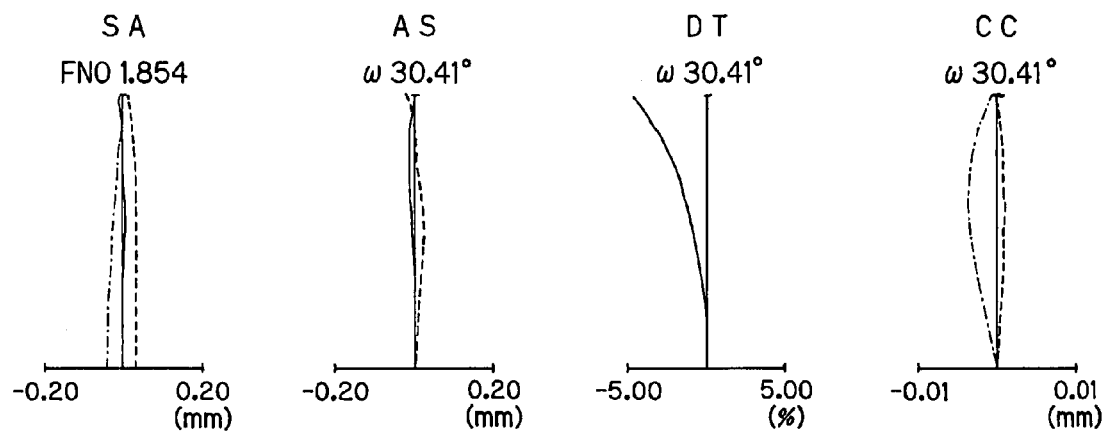
FIG. 30 is indicative of aberration diagrams for Example 15 upon focusing on an object point at infinity.
Figure 30B:
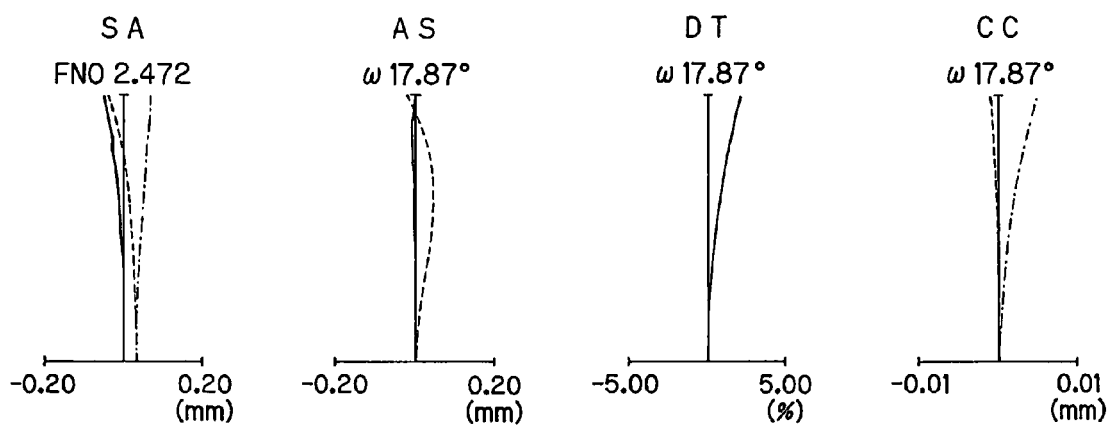
Figure 30C:
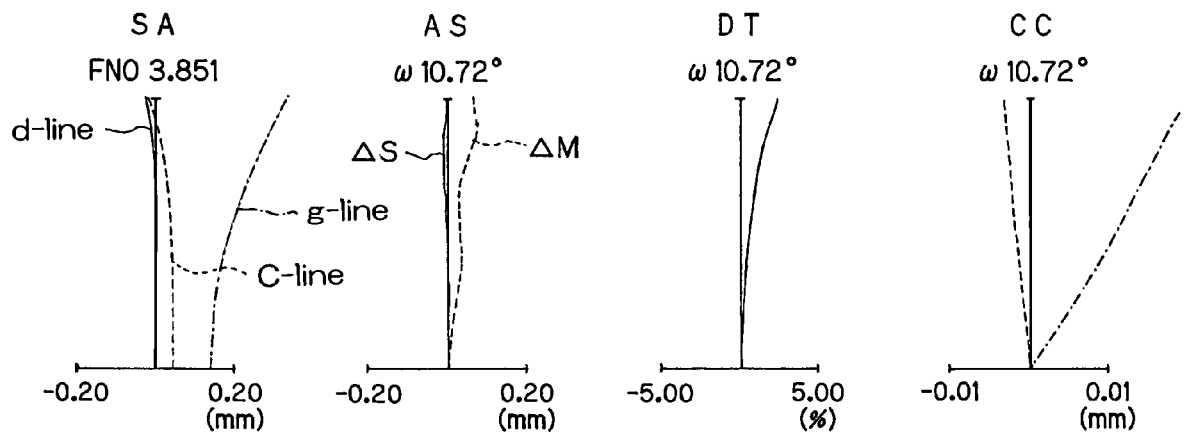

Example 15 is directed to a zoom lens made up of, in order from its object side, the first lens group G1 of negative refracting power, the second lens group G2 of positive refracting power, the third lens group G3 of positive refracting power and the fourth lens group G4 of positive refracting power, as shown in FIG. 15, with the aperture stop S located on the image side of, and integrally with, the second lens group G2. From zooming from the wide-angle end to the telephoto end, the first lens group G1 moves toward the image side in a convex orbit, and is positioned somewhat nearer to the image side at the telephoto end than at the wide-angle end. The second lens group G2 moves together with the aperture stop S monotonously toward the object side while the space between it and the first lens group G1 becomes narrow. The third lens group G3 moves toward the object side in a convex orbit while the space between it and the second lens group G2 becomes wide, and is positioned nearer to the object side at the telephoto end than at the wide-angle end. The fourth lens group G4 moves toward the image side while the space between it and the third lens group G3 becomes wide from the wide-angle end to the telephoto end and then becomes somewhat narrow from the intermediate state to the telephoto end.

In order from the object side, the first lens group G1 is made up of one double-concave negative lens; the second lens group G2 is made up of a double-convex positive lens and a cemented lens consisting of a positive meniscus lens convex on the object side and a negative meniscus lens convex on the object side; the third lens group G3 is made up of a negative meniscus lens convex on the image side and a double-convex positive lens; and the fourth lens group G4 is made up of one positive meniscus lens convex on the image side.

Nine aspheric surfaces are used: two at both surfaces of the double-concave negative lens in the first lens group G1, two at both surfaces of the single double-convex positive lens in the second lens group G2, one at the surface nearest to the object side of the cemented lens in the second lens group G2, two at both surfaces of the double-convex positive lens in the third lens group G3, and two at both surfaces of the positive meniscus lens in the fourth lens group G4.

The numerical data on each of the aforesaid examples are set out below. The symbols used hereinafter but not hereinbefore have the following meanings: f is the focal length of the whole zoom lens system, $F_{NO}$ is an F-number, $2\omega$ is an angle of view, WE is the wide-angle end, ST is the intermediate state, TE is the telephoto end, $r_1$, r2, ... is the radius of curvature of each lens surface, $d_1$, $d_2$, ... is the spacing between lens surfaces, $n_{d1}$, $n_{d2}$, ... is the d-line refractive index of each lens, and $\nu_{d1}$, $\nu_{d2}$, ... is the Abbe number of each lens. Here let x be an optical axis provided that the direction of travel of light is positive and y be a direction orthogonal to the optical axis. Then, aspheric surface shape is given by $$x=(y^2/r)/[1+\{1-(K+1)(y/r)^2\}^{1/2}]+A_4 y^4 + A_6 y^6 + A_8 y^8 + A_{10} y^{10} + A_{12} y^{12} + A_{14} y^{14}$$

Here r is a paraxial radius of curvature, K is a conical coefficient, and $A_4$, $A_6$, $A_8$, $A_{10}$, $A_{12}$ and $A_{14}$ are the $4^{th}$, $6^{th}$, $8^{th}$, $10^{th}$, $12^{th}$ and $14^{th}$-order aspheric coefficients, respectively.

EXAMPLE 1

| | | | |
|---|---|---|---|
| $r_1 = -20.591$ (Aspheric) | $d_1 = 0.85$ | $n_{d1} = 1.74320$ | $\nu_{d1} = 49.34$ |
| $r_2 = 11.203$ (Aspheric) | $d_2 = 1.99$ | | |
| $r_3 = 22.665$ | $d_3 = 2.40$ | $n_{d2} = 2.00330$ | $\nu_{d2} = 28.27$ |
| $r_4 = -1878.730$ | $d_4 =$ (Variable) | | |
| $r_5 = \infty$ (Stop) | $d_5 = 0.00$ | | |
| $r_6 = 8.370$ (Aspheric) | $d_6 = 2.80$ | $n_{d3} = 1.59201$ | $\nu_{d3} = 67.02$ |
| $r_7 = -38.980$ (Aspheric) | $d_7 = 0.10$ | | |
| $r_8 = 9.076$ | $d_8 = 2.40$ | $n_{d4} = 1.88300$ | $\nu_{d4} = 40.76$ |
| $r_9 = 159.652$ | $d_9 = 0.50$ | $n_{d5} = 1.76182$ | $\nu_{d5} = 26.52$ |
| $r_{10} = 4.770$ | $d_{10} =$ (Variable) | | |
| $r_{11} = 163.107$ | $d_{11} = 2.30$ | $n_{d6} = 1.52542$ | $\nu_{d6} = 55.78$ |
| $r_{12} = -13.302$ (Aspheric) | $d_{12} =$ (Variable) | | |
| $r_{13} = 47.335$ (Aspheric) | $d_{13} = 0.80$ | $n_{d7} = 1.52542$ | $\nu_{d7} = 55.78$ |
| $r_{14} = 157.532$ | $d_{14} = 0.50$ | | |
| $r_{15} = \infty$ | $d_{15} = 0.74$ | $n_{d8} = 1.54771$ | $\nu_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 1.00$ | | |
| $r_{19} = \infty$ (Imaging plane) | | | |

Aspherical Coefficients

1st surface

K = −4.857
$A_4 = 1.91170 \times 10^{-5}$
$A_6 = -7.93990 \times 10^{-7}$
$A_8 = 1.25291 \times 10^{-8}$
$A_{10} = 0$ 2nd surface K = −0.331
$A_4 = -4.83010 \times 10^{-5}$
$A_6 = -1.87391 \times 10^{-6}$
$A_8 = 9.14916 \times 10^{-8}$
$A_{10} = -2.06253 \times 10^{-9}$
$A_{12} = 1.96883 \times 10^{-11}$ 6th surface K = −0.325
$A_4 = -1.08286 \times 10^{-4}$
$A_6 = 5.17066 \times 10^{-7}$
$A_8 = -7.59167 \times 10^{-8}$
$A_{10} = 3.18869 \times 10^{-9}$ 7th surface K = −18.058
$A_4 = 7.08103 \times 10^{-5}$
$A_6 = 5.33584 \times 10^{-7}$
$A_8 = -6.05038 \times 10^{-8}$
$A_{10} = 3.22384 \times 10^{-9}$ 12th surface K = 0.000
$A_4 = 2.25205 \times 10^{-4}$
$A_6 = 1.09111 \times 10^{-5}$
$A_8 = -1.45088 \times 10^{-6}$
$A_{10} = 2.99941 \times 10^{-8}$ 13th surface K = 0.000
$A_4 = -3.95988 \times 10^{-4}$
$A_6 = 5.73474 \times 10^{-5}$
$A_8 = -4.14057 \times 10^{-6}$
$A_{10} = 6.74351 \times 10^{-8}$

Zooming Data ($\infty$)

| | WE | ST | TE |
|---|---|---|---|
| f (mm) | 7.98 | 12.38 | 22.98 |
| $F_{NO}$ | 1.84 | 2.30 | 3.45 |
| $2\omega$ (°) | 62.01 | 39.12 | 21.14 |
| $d_4$ | 17.81 | 9.15 | 1.30 |
| $d_{10}$ | 6.49 | 11.36 | 21.21 |
| $d_{12}$ | 2.51 | 1.87 | 1.55 |

EXAMPLE 2

| | | | |
|---|---|---|---|
| $r_1 = -24.369$ (Aspheric) | $d_1 = 0.85$ | $n_{d1} = 1.74320$ | $\nu_{d1} = 49.34$ |
| $r_2 = 9.860$ (Aspheric) | $d_2 = 2.17$ | | |
| $r_3 = 23.496$ | $d_3 = 2.40$ | $n_{d2} = 2.00330$ | $\nu_{d2} = 28.27$ |
| $r_4 = -235.853$ | $d_4 =$ (Variable) | | |
| $r_5 = \infty$ (Stop) | $d_5 = 0.00$ | | |
| $r_6 = 7.700$ (Aspheric) | $d_6 = 2.80$ | $n_{d3} = 1.59201$ | $\nu_{d3} = 67.02$ |
| $r_7 = -37.265$ (Aspheric) | $d_7 = 0.10$ | | |
| $r_8 = 9.047$ | $d_8 = 2.40$ | $n_{d4} = 1.88300$ | $\nu_{d4} = 40.76$ |
| $r_9 = 52.604$ | $d_9 = 0.50$ | $n_{d5} = 1.78472$ | $\nu_{d5} = 25.68$ |
| $r_{10} = 4.574$ | $d_{10} =$ (Variable) | | |
| $r_{11} = 171.626$ | $d_{11} = 2.30$ | $n_{d6} = 1.52542$ | $\nu_{d6} = 55.78$ |
| $r_{12} = -11.651$ (Aspheric) | $d_{12} =$ (Variable) | | |
| $r_{13} = \infty$ | $d_{13} = 0.74$ | $n_{d7} = 1.54771$ | $\nu_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 1.00$ | | |
| $r_{17} = \infty$ (Imaging plane) | | | |

Aspherical Coefficients

1st surface

K = −1.139
$A_4 = 2.02421 \times 10^{-5}$
$A_6 = -9.60379 \times 10^{-7}$
$A_8 = 1.58142 \times 10^{-8}$
$A_{10} = 0$ 2nd surface K = −0.491
$A_4 = -1.25226 \times 10^{-4}$
$A_6 = -2.13739 \times 10^{-6}$
$A_8 = 7.45918 \times 10^{-8}$
$A_{10} = -1.10786 \times 10^{-9}$
$A_{12} = 9.55589 \times 10^{-12}$ 6th surface K = −0.367
$A_4 = -1.10084 \times 10^{-4}$
$A_6 = -2.26216 \times 10^{-6}$
$A_8 = 7.28014 \times 10^{-8}$
$A_{10} = -4.77178 \times 10^{-10}$ 7th surface K = −9.634
$A_4 = 9.98274 \times 10^{-5}$
$A_6 = -2.11753 \times 10^{-6}$
$A_8 = 9.22826 \times 10^{-8}$
$A_{10} = -7.79379 \times 10^{-10}$ -continued 12th surface K = −1.098
$A_4 = 6.82670 \times 10^{-4}$
$A_6 = -3.32068 \times 10^{-5}$
$A_8 = 1.32590 \times 10^{-6}$
$A_{10} = -2.29769 \times 10^{-8}$ Zooming Data (∞)

|  | WE | ST | TE |
|---|---|---|---|
| f (mm) | 7.89 | 12.63 | 22.74 |
| $F_{NO}$ | 1.84 | 2.36 | 3.54 |
| 2ω (°) | 61.68 | 38.23 | 21.61 |
| $d_4$ | 17.52 | 8.34 | 1.30 |
| $d_{10}$ | 6.12 | 11.18 | 20.44 |
| $d_{12}$ | 3.22 | 2.52 | 1.44 |

EXAMPLE 3

| | | | |
|---|---|---|---|
| $r_1 = -32.805$ (Aspheric) | $d_1 = 0.85$ | $n_{d1} = 1.74320$ | $\nu_{d1} = 49.34$ |
| $r_2 = 8.821$ (Aspheric) | $d_2 = 2.37$ | | |
| $r_3 = 21.367$ | $d_3 = 2.40$ | $n_{d2} = 2.00330$ | $\nu_{d2} = 28.27$ |
| $r_4 = -990.027$ | $d_4 =$ (Variable) | | |
| $r_5 = \infty$ (Stop) | $d_5 = 0.00$ | | |
| $r_6 = 8.138$ (Aspheric) | $d_6 = 2.80$ | $n_{d3} = 1.59201$ | $\nu_{d3} = 67.02$ |
| $r_7 = -49.623$ (Aspheric) | $d_7 = 0.10$ | | |
| $r_8 = 9.644$ | $d_8 = 2.40$ | $n_{d4} = 1.88300$ | $\nu_{d4} = 40.76$ |
| $r_9 = -398.189$ | $d_9 = 0.50$ | $n_{d5} = 1.76182$ | $\nu_{d5} = 26.52$ |
| $r_{10} = 4.845$ | $d_{10} =$ (Variable) | | |
| $r_{11} = 23.104$ | $d_{11} = 2.30$ | $n_{d6} = 1.52542$ | $\nu_{d6} = 55.78$ |
| $r_{12} = -25.555$ (Aspheric) | $d_{12} =$ (Variable) | | |
| $r_{13} = 37.552$ (Aspheric) | $d_{13} = 0.80$ | $n_{d7} = 1.52542$ | $\nu_{d7} = 55.78$ |
| $r_{14} = \infty$ | $d_{14} = 0.50$ | | |
| $r_{15} = \infty$ | $d_{15} = 0.74$ | $n_{d8} = 1.54771$ | $\nu_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.93$ | | |
| $r_{19} = \infty$ (Imaging plane) | | | |

Aspherical Coefficients

1st surface

K = 0.000
$A_4 = -7.23340 \times 10^{-5}$
$A_6 = 7.82522 \times 10^{-7}$
$A_8 = 1.74057 \times 10^{-8}$
$A_{10} = -2.80490 \times 10^{-10}$ 2nd surface K = −0.680
$A_4 = -2.17245 \times 10^{-4}$
$A_6 = 9.78691 \times 10^{-7}$
$A_8 = 2.15020 \times 10^{-8}$
$A_{10} = -7.54735 \times 10^{-12}$
$A_{12} = -6.96482 \times 10^{-12}$ 6th surface K = −0.211
$A_4 = -1.08462 \times 10^{-4}$
$A_6 = -6.11103 \times 10^{-7}$
$A_8 = -4.74554 \times 10^{-8}$
$A_{10} = 2.70946 \times 10^{-9}$ 7th surface K = 0.000
$A_4 = 1.17441 \times 10^{-4}$
$A_6 = -1.80136 \times 10^{-7}$
$A_8 = -2.26721 \times 10^{-8}$
$A_{10} = 2.61135 \times 10^{-9}$ 12th surface K = 0.000
$A_4 = -4.78766 \times 10^{-5}$
$A_6 = 3.82653 \times 10^{-6}$
$A_8 = -1.68282 \times 10^{-7}$
$A_{10} = 2.74886 \times 10^{-9}$ 13th surface K = 0.000
$A_4 = -5.40034 \times 10^{-4}$
$A_6 = 1.23392 \times 10^{-5}$
$A_8 = -2.71717 \times 10^{-7}$
$A_{10} = 3.52095 \times 10^{-9}$ Zooming Data (∞)

|  | WE | ST | TE |
|---|---|---|---|
| f (mm) | 8.01 | 13.61 | 23.18 |
| $F_{NO}$ | 1.84 | 2.41 | 3.45 |
| 2ω (°) | 60.98 | 36.09 | 21.26 |
| $d_4$ | 18.24 | 6.57 | 1.23 |
| $d_{10}$ | 7.26 | 12.17 | 23.55 |
| $d_{12}$ | 2.58 | 3.38 | 1.71 |

EXAMPLE 4

| | | | |
|---|---|---|---|
| $r_1 = -32.705$ (Aspheric) | $d_1 = 0.85$ | $n_{d1} = 1.74320$ | $\nu_{d1} = 49.34$ |
| $r_2 = 8.879$ (Aspheric) | $d_2 = 2.38$ | | |
| $r_3 = 21.569$ | $d_3 = 2.30$ | $n_{d2} = 2.00330$ | $\nu_{d2} = 28.27$ |
| $r_4 = 202364.298$ | $d_4 =$ (Variable) | | |
| $r_5 = \infty$ (Stop) | $d_5 = 0.00$ | | |
| $r_6 = 8.220$ (Aspheric) | $d_6 = 2.80$ | $n_{d3} = 1.59201$ | $\nu_{d3} = 67.02$ |
| $r_7 = -47.063$ (Aspheric) | $d_7 = 0.10$ | | |
| $r_8 = 9.799$ | $d_8 = 2.40$ | $n_{d4} = 1.88300$ | $\nu_{d4} = 40.76$ |
| $r_9 = -111.185$ | $d_9 = 0.53$ | $n_{d5} = 1.76182$ | $\nu_{d5} = 26.52$ |
| $r_{10} = 4.926$ | $d_{10} =$ (Variable) | | |
| $r_{11} = 25.699$ | $d_{11} = 2.30$ | $n_{d6} = 1.52542$ | $\nu_{d6} = 55.78$ |
| $r_{12} = -22.867$ (Aspheric) | $d_{12} =$ (Variable) | | |
| $r_{13} = -34.483$ (Aspheric) | $d_{13} = 0.80$ | $n_{d7} = 1.52542$ | $\nu_{d7} = 55.78$ |
| $r_{14} = -21.613$ | $d_{14} =$ (Variable) | | |
| $r_{15} = \infty$ | $d_{15} = 0.74$ | $n_{d8} = 1.54771$ | $\nu_{d8} = 62.84$ |
| $r_{16} = \infty$ | $d_{16} = 0.20$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 1.00$ | | |
| $r_{19} = \infty$ (Imaging plane) | | | |

Aspherical Coefficients

1st surface

K = 0.000
$A_4 = -3.37307 \times 10^{-5}$
$A_6 = -9.72817 \times 10^{-7}$
$A_8 = 4.31496 \times 10^{-8}$
$A_{10} = -4.11460 \times 10^{-10}$ 2nd surface K = −0.674
$A_4 = -1.76528 \times 10^{-4}$
$A_6 = -1.06503 \times 10^{-6}$
$A_8 = 4.02343 \times 10^{-8}$
$A_{10} = 2.29184 \times 10^{-10}$
$A_{12} = -1.01966 \times 10^{-11}$ -continued 6th surface K = −0.210
$A_4 = -1.21130 \times 10^{-4}$
$A_6 = -8.55663 \times 10^{-7}$
$A_8 = -3.16534 \times 10^{-8}$
$A_{10} = 1.27827 \times 10^{-9}$ 7th surface K = 0.000
$A_4 = 1.09439 \times 10^{-4}$
$A_6 = -8.89418 \times 10^{-7}$
$A_8 = 7.17937 \times 10^{-9}$
$A_{10} = 8.91942 \times 10^{-10}$ 12th surface K = 0.000
$A_4 = -8.69778 \times 10^{-5}$
$A_6 = 8.22798 \times 10^{-6}$
$A_8 = -3.15609 \times 10^{-7}$
$A_{10} = 4.70020 \times 10^{-9}$ 13th surface K = 0.000
$A_4 = -7.46044 \times 10^{-4}$
$A_6 = 2.71091 \times 10^{-5}$
$A_8 = -7.30692 \times 10^{-7}$
$A_{10} = 9.34974 \times 10^{-9}$ Zooming Data (∞)

|  | WE | ST | TE |
|---|---|---|---|
| f (mm) | 8.01 | 13.55 | 23.21 |
| $F_{NO}$ | 1.84 | 2.41 | 3.45 |
| 2ω (°) | 60.75 | 36.12 | 21.27 |
| $d_4$ | 18.51 | 7.09 | 1.60 |
| $d_{10}$ | 7.22 | 12.00 | 23.05 |
| $d_{12}$ | 1.35 | 3.07 | 2.29 |
| $d_{14}$ | 2.03 | 1.09 | 0.52 |

EXAMPLE 5

| $r_1$ = −145.383 (Aspheric) | $d_1$ = 0.90 | $n_{d1}$ = 1.69350 | $v_{d1}$ = 53.21 |
| $r_2$ = 8.650 | $d_2$ = 2.00 | $n_{d2}$ = 2.00069 | $v_{d2}$ = 25.46 |
| $r_3$ = 10.651 | $d_3$ = (Variable) | | |
| $r_4$ = 12.185 (Aspheric) | $d_4$ = 2.26 | $n_{d3}$ = 1.74320 | $v_{d3}$ = 49.34 |
| $r_5$ = 81.448 (Aspheric) | $d_5$ = 0.80 | | |
| $r_6$ = ∞ (Stop) | $d_6$ = 0.20 | | |
| $r_7$ = 111.218 | $d_7$ = 0.55 | $n_{d4}$ = 1.84666 | $v_{d4}$ = 23.78 |
| $r_8$ = 8.992 | $d_8$ = 2.50 | $n_{d5}$ = 1.88300 | $v_{d5}$ = 40.76 |
| $r_9$ = −45.340 | $d_9$ = (Variable) | | |
| $r_{10}$ = 11.124 (Aspheric) | $d_{10}$ = 2.00 | $n_{d6}$ = 1.69350 | $v_{d6}$ = 53.21 |
| $r_{11}$ = 21.087 (Aspheric) | $d_{11}$ = (Variable) | | |
| $r_{12}$ = −13.435 | $d_{12}$ = 1.00 | $n_{d7}$ = 1.68893 | $v_{d7}$ = 31.07 |
| $r_{13}$ = −21.718 (Aspheric) | $d_{13}$ = (Variable) | | |
| $r_{14}$ = ∞ | $d_{14}$ = 0.74 | $n_{d8}$ = 1.54771 | $v_{d8}$ = 62.84 |
| $r_{15}$ = ∞ | $d_{15}$ = 0.50 | | |
| $r_{16}$ = ∞ | $d_{16}$ = 0.50 | $n_{d9}$ = 1.51633 | $v_{d9}$ = 64.14 |
| $r_{17}$ = ∞ | $d_{17}$ = 0.50 | | |
| $r_{18}$ = ∞ (Imaging plane) | | | |

Aspherical Coefficients

1st surface

K = 0.000
$A_4 = 1.25228 \times 10^{-5}$
$A_6 = -1.68857 \times 10^{-7}$

-continued $A_8 = 5.23426 \times 10^{-9}$
$A_{10} = -1.91214 \times 10^{-11}$
$A_{12} = -2.14972 \times 10^{-12}$
$A_{14} = 2.50471 \times 10^{-14}$ 4th surface K = −2.274
$A_4 = -1.31273 \times 10^{-4}$
$A_6 = -6.67025 \times 10^{-6}$
$A_8 = 3.40034 \times 10^{-8}$
$A_{10} = -7.37366 \times 10^{-9}$ 5th surface K = 0.000
$A_4 = -2.71343 \times 10^{-4}$
$A_6 = -3.88226 \times 10^{-6}$
$A_8 = -1.41496 \times 10^{-7}$
$A_{10} = -1.80000 \times 10^{-9}$ 10th surface K = −2.888
$A_4 = -3.04589 \times 10^{-4}$
$A_6 = -1.11767 \times 10^{-5}$
$A_8 = -5.04355 \times 10^{-7}$
$A_{10} = 0$ 11th surface K = 0.000
$A_4 = -7.15384 \times 10^{-4}$
$A_6 = -1.94625 \times 10^{-5}$
$A_8 = 0$
$A_{10} = 0$ 13th surface K = 0.000
$A_4 = 8.96159 \times 10^{-4}$
$A_6 = 5.87184 \times 10^{-6}$
$A_8 = -2.49866 \times 10^{-7}$
$A_{10} = 0$ Zooming Data (∞)

|  | WE | ST | TE |
|---|---|---|---|
| f (mm) | 7.99 | 12.35 | 22.99 |
| $F_{NO}$ | 1.86 | 2.14 | 2.84 |
| 2ω (°) | 62.43 | 39.90 | 21.32 |
| $d_3$ | 16.93 | 8.07 | 1.10 |
| $d_9$ | 6.36 | 6.18 | 14.52 |
| $d_{11}$ | 1.95 | 3.61 | 8.43 |
| $d_{13}$ | 2.95 | 4.14 | 1.79 |

EXAMPLE 6

| $r_1$ = −78.142 (Aspheric) | $d_1$ = 0.90 | $n_{d1}$ = 1.74320 | $v_{d1}$ = 49.34 |
| $r_2$ = 8.767 | $d_2$ = 2.00 | $n_{d2}$ = 2.00170 | $v_{d2}$ = 20.64 |
| $r_3$ = 12.214 | $d_3$ = (Variable) | | |
| $r_4$ = 11.533 (Aspheric) | $d_{4\ =\ 2.27}$ | $n_{d3}$ = 1.74320 | $v_{d3}$ = 49.34 |
| $r_5$ = 40.855 | $d_5$ = 0.55 | $n_{d4}$ = 1.84666 | $v_{d4}$ = 23.78 |
| $r_6$ = 7.068 | $d_6$ = 3.30 | $n_{d5}$ = 1.88300 | $v_{d5}$ = 40.76 |
| $r_7$ = −115.072 | $d_7$ = 0.00 | | |
| $r_8$ = ∞ (Stop) | $d_8$ = (Variable) | | |
| $r_9$ = 12.459 (Aspheric) | $d_9$ = 2.00 | $n_{d6}$ = 1.69350 | $v_{d6}$ = 53.21 |
| $r_{10}$ = 30.922 (Aspheric) | $d_{10}$ = (Variable) | | |
| $r_{11}$ = −14.299 | $d_{11}$ = 1.00 | $n_{d7}$ = 1.68893 | $v_{d7}$ = 31.07 |
| $r_{12}$ = −18.793 (Aspheric) | $d_{12}$ = (Variable) | | |
| $r_{13}$ = ∞ | $d_{13}$ = 0.74 | $n_{d8}$ = 1.54771 | $v_{d8}$ = 62.84 |
| $r_{14}$ = ∞ | $d_{14}$ = 0.50 | | |
| $r_{15}$ = ∞ | $d_{15}$ = 0.50 | $n_{d9}$ = 1.51633 | $v_{d9}$ = 64.14 |

-continued

| | |
|---|---|
| $r_{16} = \infty$ | $d_{16} = 0.50$ |
| $r_{17} = \infty$ (Imaging plane) | |

Aspherical Coefficients

1st surface

K = 0.000
$A_4 = 1.56906 \times 10^{-5}$
$A_6 = -1.29413 \times 10^{-6}$
$A_8 = 8.45917 \times 10^{-8}$
$A_{10} = -2.66460 \times 10^{-9}$
$A_{12} = 3.93437 \times 10^{-11}$
$A_{14} = -2.22233 \times 10^{-13}$ 4th surface K = 1.054
$A_4 = -1.58746 \times 10^{-4}$
$A_6 = -3.45221 \times 10^{-6}$
$A_8 = 8.56173 \times 10^{-8}$
$A_{10} = -1.87648 \times 10^{-9}$ 9th surface K = −1.904
$A_4 = -4.66723 \times 10^{-4}$
$A_6 = -1.21485 \times 10^{-5}$
$A_8 = -5.97308 \times 10^{-7}$
$A_{10} = 0$ 10th surface K = 0.000
$A_4 = -7.04701 \times 10^{-4}$
$A_6 = -2.17479 \times 10^{-5}$
$A_8 = 0$
$A_{10} = 0$ 12th surface K = 0.000
$A_4 = 9.63721 \times 10^{-4}$
$A_6 = -3.46884 \times 10^{-6}$
$A_8 = 2.58483 \times 10^{-8}$
$A_{10} = 0$ Zooming Data (∞)

| | WE | ST | TE |
|---|---|---|---|
| f (mm) | 8.06 | 12.46 | 22.88 |
| $F_{NO}$ | 1.86 | 2.17 | 2.99 |
| 2ω (°) | 62.14 | 39.39 | 21.48 |
| $d_3$ | 16.66 | 7.71 | 1.10 |
| $d_8$ | 7.78 | 7.73 | 15.29 |
| $d_{10}$ | 1.87 | 4.02 | 9.10 |
| $d_{12}$ | 2.27 | 3.11 | 1.55 |

EXAMPLE 7

| | | | |
|---|---|---|---|
| $r_1 = -29.732$ (Aspheric) | $d_1 = 0.90$ | $n_{d1} = 1.69350$ | $\nu_{d1} = 53.21$ |
| $r_2 = 14.601$ | $d_2 = 1.80$ | $n_{d2} = 1.83918$ | $\nu_{d2} = 23.85$ |
| $r_3 = 27.894$ (Aspheric) | $d_3$ = (Variable) | | |
| $r_4 = 12.843$ (Aspheric) | $d_4 = 2.20$ | $n_{d3} = 1.74320$ | $\nu_{d3} = 49.34$ |
| $r_5 = -99.138$ (Aspheric) | $d_5 = 0.80$ | | |
| $r_6 = \infty$ (Stop) | $d_6 = 0.20$ | | |
| $r_7 = 7.183$ | $d_7 = 2.15$ | $n_{d4} = 1.88300$ | $\nu_{d4} = 40.76$ |
| $r_8 = 29.767$ | $d_8 = 0.50$ | $n_{d5} = 1.80810$ | $\nu_{d5} = 22.76$ |
| $r_9 = 5.037$ | $d_9$ = (Variable) | | |
| $r_{10} = 10.779$ (Aspheric) | $d_{10} = 2.57$ | $n_{d6} = 1.69350$ | $\nu_{d6} = 53.21$ |
| $r_{11} = 42.476$ (Aspheric) | $d_{11}$ = (Variable) | | |
| $r_{12} = 40.000$ (Aspheric) | $d_{12} = 1.00$ | $n_{d7} = 1.52542$ | $\nu_{d7} = 55.78$ |
| $r_{13} = 30.242$ | $d_{13} = 1.00$ | | |

-continued

| | | | |
|---|---|---|---|
| $r_{14} = \infty$ | $d_{14} = 0.74$ | $n_{d8} = 1.54771$ | $\nu_{d8} = 62.84$ |
| $r_{15} = \infty$ | $d_{15} = 0.50$ | | |
| $r_{16} = \infty$ | $d_{16} = 0.50$ | $n_{d9} = 1.51633$ | $\nu_{d9} = 64.14$ |
| $r_{17} = \infty$ | $d_{17} = 0.41$ | | |
| $r_{18} = \infty$ (Imaging plane) | | | |

Aspherical Coefficients

1st surface

K = 0.000
$A_4 = 1.70392 \times 10^{-4}$
$A_6 = -2.36418 \times 10^{-6}$
$A_8 = 1.14962 \times 10^{-8}$
$A_{10} = 3.13033 \times 10^{-10}$
$A_{12} = -5.19506 \times 10^{-12}$
$A_{14} = 2.48049 \times 10^{-14}$ 3rd surface K = 0.000
$A_4 = 1.33513 \times 10^{-4}$
$A_6 = -1.87741 \times 10^{-6}$
$A_8 = -1.49663 \times 10^{-8}$
$A_{10} = 3.63709 \times 10^{-11}$ 4th surface K = 0.597
$A_4 = -1.74298 \times 10^{-4}$
$A_6 = -1.34175 \times 10^{-6}$
$A_8 = -8.12069 \times 10^{-8}$
$A_{10} = -2.96234 \times 10^{-9}$ 5th surface K = 0.000
$A_4 = -7.76740 \times 10^{-5}$
$A_6 = -8.18520 \times 10^{-7}$
$A_8 = -1.51793 \times 10^{-7}$
$A_{10} = -4.25649 \times 10^{-10}$ 10th surface K = 0.000
$A_4 = -3.34112 \times 10^{-4}$
$A_6 = 1.72489 \times 10^{-6}$
$A_8 = -1.12625 \times 10^{-7}$
$A_{10} = 0$ 11th surface K = 0.000
$A_4 = -6.82941 \times 10^{-4}$
$A_6 = 3.40824 \times 10^{-6}$
$A_8 = -5.60943 \times 10^{-8}$
$A_{10} = 0$ 12th surface K = 0.000
$A_4 = -1.84764 \times 10^{-3}$
$A_6 = 5.24923 \times 10^{-5}$
$A_8 = -3.73324 \times 10^{-6}$
$A_{10} = 1.00779 \times 10^{-7}$ Zooming Data (∞)

| | WE | ST | TE |
|---|---|---|---|
| f (mm) | 7.86 | 12.38 | 22.52 |
| $F_{NO}$ | 1.86 | 2.18 | 3.04 |
| 2ω (°) | 63.24 | 39.99 | 22.67 |
| $d_3$ | 21.80 | 9.68 | 1.69 |
| $d_9$ | 6.30 | 7.92 | 17.36 |
| $d_{11}$ | 1.64 | 3.31 | 4.99 |

EXAMPLE 8

| | | | |
|---|---|---|---|
| $r_1 = -20.204$ (Aspheric) | $d_1 = 0.90$ | $n_{d1} = 1.49700$ | $\nu_{d1} = 81.54$ |
| $r_2 = 17.545$ | $d_2 = 1.80$ | $n_{d2} = 1.84666$ | $\nu_{d2} = 23.78$ |
| $r_3 = 23.794$ (Aspheric) | $d_3 = $ (Variable) | | |
| $r_4 = \infty$ (Stop) | $d_4 = 0.10$ | | |
| $r_5 = 18.034$ (Aspheric) | $d_5 = 2.20$ | $n_{d3} = 1.69350$ | $\nu_{d3} = 53.21$ |
| $r_6 = -27.012$ (Aspheric) | $d_6 = 0.10$ | | |
| $r_7 = 6.333$ | $d_7 = 2.60$ | $n_{d4} = 1.88300$ | $\nu_{d4} = 40.76$ |
| $r_8 = 12.298$ | $d_8 = 0.60$ | $n_{d5} = 1.92286$ | $\nu_{d5} = 20.88$ |
| $r_9 = 4.561$ | $d_9 = $ (Variable) | | |
| $r_{10} = 53.796$ | $d_{10} = 2.80$ | $n_{d6} = 1.74320$ | $\nu_{d6} = 49.34$ |
| $r_{11} = -14.000$ (Aspheric) | $d_{11} = $ (Variable) | | |
| $r_{12} = -24.948$ (Aspheric) | $d_{12} = 1.00$ | $n_{d7} = 1.52542$ | $\nu_{d7} = 55.78$ |
| $r_{13} = -14.904$ | $d_{13} = $ (Variable) | | |
| $r_{14} = \infty$ | $d_{14} = 0.74$ | $n_{d8} = 1.54771$ | $\nu_{d8} = 62.84$ |
| $r_{15} = \infty$ | $d_{15} = 0.50$ | | |
| $r_{16} = \infty$ | $d_{16} = 0.50$ | $n_{d9} = 1.51633$ | $\nu_{d9} = 64.14$ |
| $r_{17} = \infty$ | $d_{17} = 0.63$ | | |
| $r_{18} = \infty$ (Imaging plane) | | | |

Aspherical Coefficients

1st surface $K = 0.000$
$A_4 = 4.98101 \times 10^{-5}$
$A_6 = 2.62991 \times 10^{-7}$
$A_8 = -1.54568 \times 10^{-8}$
$A_{10} = 5.46523 \times 10^{-10}$
$A_{12} = -8.17649 \times 10^{-12}$
$A_{14} = 3.64148 \times 10^{-14}$ 3rd surface $K = 0.000$
$A_4 = -1.34508 \times 10^{-5}$
$A_6 = 8.32834 \times 10^{-8}$
$A_8 = 2.05078 \times 10^{-8}$
$A_{10} = -3.59245 \times 10^{-10}$ 5th surface $K = -2.484$
$A_4 = -4.56019 \times 10^{-5}$
$A_6 = 1.56225 \times 10^{-7}$
$A_8 = -5.92118 \times 10^{-8}$
$A_{10} = -5.94787 \times 10^{-11}$ 6th surface $K = -1.006$
$A_4 = -7.09011 \times 10^{-7}$
$A_6 = -5.19547 \times 10^{-7}$
$A_8 = -3.21483 \times 10^{-8}$
$A_{10} = -3.47781 \times 10^{-10}$ 11th surface $K = -3.068$
$A_4 = -1.15031 \times 10^{-4}$
$A_6 = -1.41621 \times 10^{-6}$
$A_8 = 2.96767 \times 10^{-8}$
$A_{10} = 0$ 12th surface $K = 0.000$
$A_4 = -1.17795 \times 10^{-3}$
$A_6 = 1.48055 \times 10^{-5}$
$A_8 = -1.81960 \times 10^{-8}$
$A_{10} = 0$

Zooming Data (∞)

| | WE | ST | TE |
|---|---|---|---|
| $f$ (mm) | 8.17 | 12.51 | 23.49 |
| $F_{NO}$ | 1.86 | 2.25 | 3.35 |
| $2\omega$ (°) | 61.31 | 38.70 | 20.79 |
| $d_3$ | 18.23 | 9.18 | 2.05 |
| $d_9$ | 5.72 | 9.27 | 19.64 |
| $d_{11}$ | 1.47 | 2.41 | 2.19 |
| $d_{13}$ | 1.20 | 0.54 | 0.30 |

EXAMPLE 9

| | | | |
|---|---|---|---|
| $r_1 = -28.866$ (Aspheric) | $d_1 = 0.90$ | $n_{d1} = 1.58313$ | $\nu_{d1} = 59.38$ |
| $r_2 = 12.613$ | $d_2 = 1.80$ | $n_{d2} = 1.83918$ | $\nu_{d2} = 23.85$ |
| $r_3 = 17.351$ (Aspheric) | $d_3 = $ (Variable) | | |
| $r_4 = 10.328$ (Aspheric) | $d_4 = 2.14$ | $n_{d3} = 1.69350$ | $\nu_{d3} = 53.21$ |
| $r_5 = -125.640$ (Aspheric) | $d_5 = 0.20$ | | |
| $r_6 = 7.249$ | $d_6 = 2.60$ | $n_{d4} = 1.88300$ | $\nu_{d4} = 40.76$ |
| $r_7 = -63.997$ | $d_7 = 0.40$ | $n_{d5} = 1.78472$ | $\nu_{d5} = 25.68$ |
| $r_8 = 4.607$ | $d_8 = 1.50$ | | |
| $r_9 = \infty$ (Stop) | $d_9 = $ (Variable) | | |
| $r_{10} = 10.095$ (Aspheric) | $d_{10} = 2.20$ | $n_{d6} = 1.74320$ | $\nu_{d6} = 49.34$ |
| $r_{11} = 18.794$ (Aspheric) | $d_{11} = $ (Variable) | | |
| $r_{12} = 33.259$ (Aspheric) | $d_{12} = 1.00$ | $n_{d7} = 1.52542$ | $\nu_{d7} = 55.78$ |
| $r_{13} = -645.512$ | $d_{13} = 1.14$ | | |
| $r_{14} = \infty$ | $d_{14} = 0.74$ | $n_{d8} = 1.54771$ | $\nu_{d8} = 62.84$ |
| $r_{15} = \infty$ | $d_{15} = 0.50$ | | |
| $r_{16} = \infty$ | $d_{16} = 0.50$ | $n_{d9} = 1.51633$ | $\nu_{d9} = 64.14$ |
| $r_{17} = \infty$ | $d_{17} = 0.46$ | | |
| $r_{18} = \infty$ (Imaging plane) | | | |

Aspherical Coefficients

1st surface $K = 0.000$
$A_4 = 6.38764 \times 10^{-5}$
$A_6 = -1.09687 \times 10^{-6}$
$A_8 = 2.22426 \times 10^{-8}$
$A_{10} = 1.99264 \times 10^{-11}$
$A_{12} = -2.98978 \times 10^{-12}$
$A_{14} = -1.81600 \times 10^{-14}$ 3rd surface $K = 0.000$
$A_4 = 2.14506 \times 10^{-5}$
$A_6 = -4.03380 \times 10^{-7}$
$A_8 = 2.18349 \times 10^{-8}$
$A_{10} = -5.77518 \times 10^{-12}$ 4th surface $K = -0.161$
$A_4 = -1.43882 \times 10^{-4}$
$A_6 = -1.09831 \times 10^{-7}$
$A_8 = -8.65978 \times 10^{-9}$
$A_{10} = -3.29195 \times 10^{-10}$ 5th surface $K = 0.000$
$A_4 = -2.18434 \times 10^{-5}$
$A_6 = 2.23702 \times 10^{-7}$
$A_8 = -9.89591 \times 10^{-9}$
$A_{10} = -1.54656 \times 10^{-10}$ 10th surface $K = 0.000$
$A_4 = -5.79354 \times 10^{-4}$
$A_6 = 1.20789 \times 10^{-5}$
$A_8 = -2.73123 \times 10^{-7}$
$A_{10} = 0$ 11th surface $K = 0.000$
$A_4 = -1.07181 \times 10^{-3}$ -continued $A_6 = 2.06212 \times 10^{-5}$
$A_8 = -3.85314 \times 10^{-7}$
$A_{10} = 0$ 12th surface $K = 0.000$
$A_4 = -1.57377 \times 10^{-3}$
$A_6 = 0$
$A_8 = 0$
$A_{10} = 0$ Zooming Data (∞)

|  | WE | ST | TE |
|---|---|---|---|
| f (mm) | 7.99 | 12.24 | 22.75 |
| $F_{NO}$ | 1.86 | 2.29 | 3.46 |
| 2ω (°) | 62.67 | 40.39 | 22.11 |
| $d_3$ | 17.00 | 8.17 | 1.43 |
| $d_9$ | 3.90 | 5.09 | 13.29 |
| $d_{11}$ | 1.51 | 3.27 | 5.31 |

EXAMPLE 10

| | | | |
|---|---|---|---|
| $r_1 = -45.206$ (Aspheric) | $d_1 = 0.90$ | $n_{d1} = 1.69350$ | $v_{d1} = 53.21$ |
| $r_2 = 11.291$ | $d_2 = 1.80$ | $n_{d2} = 1.84666$ | $v_{d2} = 23.78$ |
| $r_3 = 17.553$ (Aspheric) | $d_3 = $ (Variable) | | |
| $r_4 = \infty$ (Stop) | $d_4 = 0.10$ | | |
| $r_5 = 9.783$ (Aspheric) | $d_5 = 2.26$ | $n_{d3} = 1.74320$ | $v_{d3} = 49.34$ |
| $r_6 = -107.620$ (Aspheric) | $d_6 = 0.10$ | | |
| $r_7 = 6.333$ | $d_7 = 2.00$ | $n_{d4} = 1.72916$ | $v_{d4} = 54.68$ |
| $r_8 = 9.228$ | $d_8 = 0.60$ | $n_{d5} = 2.00170$ | $v_{d5} = 20.64$ |
| $r_9 = 4.744$ | $d_9 = $ (Variable) | | |
| $r_{10} = 14.018$ (Aspheric) | $d_{10} = 2.72$ | $n_{d6} = 1.69350$ | $v_{d6} = 53.21$ |
| $r_{11} = 260.132$ (Aspheric) | $d_{11} = $ (Variable) | | |
| $r_{12} = 130.344$ (Aspheric) | $d_{12} = 1.00$ | $n_{d7} = 1.52542$ | $v_{d7} = 55.78$ |
| $r_{13} = \infty$ | $d_{13} = $ (Variable) | | |
| $r_{14} = \infty$ | $d_{14} = 0.74$ | $n_{d8} = 1.54771$ | $v_{d8} = 62.84$ |
| $r_{15} = \infty$ | $d_{15} = 0.50$ | | |
| $r_{16} = \infty$ | $d_{16} = 0.50$ | $n_{d9} = 1.51633$ | $v_{d9} = 64.14$ |
| $r_{17} = \infty$ | $d_{17} = 0.90$ | | |
| $r_{18} = \infty$ (Imaging plane) | | | |

Aspherical Coefficients

1st surface $K = 0.000$
$A_4 = 1.90374 \times 10^{-6}$
$A_6 = -3.84263 \times 10^{-7}$
$A_8 = 8.63693 \times 10^{-9}$
$A_{10} = 6.67354 \times 10^{-12}$
$A_{12} = -1.53332 \times 10^{-12}$
$A_{14} = 1.13376 \times 10^{-14}$ 3rd surface $K = 0.000$
$A_4 = -2.63248 \times 10^{-5}$
$A_6 = 2.90936 \times 10^{-7}$
$A_8 = -1.20811 \times 10^{-8}$
$A_{10} = 1.85370 \times 10^{-10}$ 5th surface $K = -0.263$
$A_4 = -5.86359 \times 10^{-5}$
$A_6 = 2.39004 \times 10^{-7}$
$A_8 = 2.34845 \times 10^{-8}$
$A_{10} = 5.34915 \times 10^{-10}$ -continued 6th surface $K = -234.189$
$A_4 = 2.88968 \times 10^{-5}$
$A_6 = 1.01712 \times 10^{-6}$
$A_8 = 9.63087 \times 10^{-9}$
$A_{10} = 7.64550 \times 10^{-10}$ 10th surface $K = -6.835$
$A_4 = 1.00639 \times 10^{-6}$
$A_6 = -4.88584 \times 10^{-6}$
$A_8 = 0$
$A_{10} = 0$ 11th surface $K = 0.000$
$A_4 = -4.99152 \times 10^{-4}$
$A_6 = -9.09044 \times 10^{-7}$
$A_8 = 0$
$A_{10} = 0$ 12th surface $K = 0.000$
$A_4 = -1.55873 \times 10^{-3}$
$A_6 = 5.84821 \times 10^{-6}$
$A_8 = 0$
$A_{10} = 0$ Zooming Data (∞)

|  | WE | ST | TE |
|---|---|---|---|
| f (mm) | 7.87 | 12.54 | 22.67 |
| $F_{NO}$ | 1.86 | 2.14 | 2.93 |
| 2ω (°) | 63.07 | 38.84 | 21.80 |
| $d_3$ | 19.50 | 8.63 | 1.90 |
| $d_9$ | 5.74 | 6.07 | 14.93 |
| $d_{11}$ | 2.05 | 4.80 | 8.03 |
| $d_{13}$ | 0.48 | 0.41 | 0.29 |

EXAMPLE 11

| | | | |
|---|---|---|---|
| $r_1 = -13.852$ (Aspheric) | $d_1 = 0.90$ | $n_{d1} = 1.49700$ | $v_{d1} = 81.54$ |
| $r_2 = 24.684$ | $d_2 = 1.59$ | $n_{d2} = 1.83918$ | $v_{d2} = 23.85$ |
| $r_3 = 43.897$ (Aspheric) | $d_3 = $ (Variable) | | |
| $r_4 = 10.521$ (Aspheric) | $d_4 = 1.82$ | $n_{d3} = 1.69350$ | $v_{d3} = 53.21$ |
| $r_5 = -77.251$ (Aspheric) | $d_5 = 0.80$ | | |
| $r_6 = \infty$ (Stop) | $d_6 = 0.00$ | | |
| $r_7 = 6.907$ | $d_7 = 2.53$ | $n_{d4} = 1.88300$ | $v_{d4} = 40.76$ |
| $r_8 = 87.359$ | $d_8 = 0.59$ | $n_{d5} = 1.83918$ | $v_{d5} = 23.85$ |
| $r_9 = 4.354$ (Aspheric) | $d_9 = $ (Variable) | | |
| $r_{10} = -30.574$ (Aspheric) | $d_{10} = 1.99$ | $n_{d6} = 1.80610$ | $v_{d6} = 40.92$ |
| $r_{11} = -12.104$ (Aspheric) | $d_{11} = $ (Variable) | | |
| $r_{12} = 40.000$ (Aspheric) | $d_{12} = 0.80$ | $n_{d7} = 1.52542$ | $v_{d7} = 55.78$ |
| $r_{13} = -73.398$ | $d_{13} = $ (Variable) | | |
| $r_{14} = \infty$ | $d_{14} = 0.74$ | $n_{d8} = 1.54771$ | $v_{d8} = 62.84$ |
| $r_{15} = \infty$ | $d_{15} = 0.50$ | | |
| $r_{16} = \infty$ | $d_{16} = 0.50$ | $n_{d9} = 1.51633$ | $v_{d9} = 64.14$ |
| $r_{17} = \infty$ | $d_{17} = 0.51$ | | |
| $r_{18} = \infty$ (Imaging plane) | | | |

Aspherical Coefficients

1st surface $K = 0.000$
$A_4 = 4.06059 \times 10^{-4}$
$A_6 = -6.07979 \times 10^{-6}$
$A_8 = 5.43296 \times 10^{-8}$
$A_{10} = 3.25528 \times 10^{-11}$ -continued $A_{12} = -2.48489 \times 10^{-12}$
$A_{14} = -2.01707 \times 10^{-15}$
3rd surface $K = 0.000$
$A_4 = 1.68867 \times 10^{-4}$
$A_6 = -1.12760 \times 10^{-6}$
$A_8 = -1.24654 \times 10^{-7}$
$A_{10} = 4.77759 \times 10^{-9}$
$A_{12} = -6.82004 \times 10^{-11}$
$A_{14} = 3.36755 \times 10^{-13}$
4th surface $K = 0.172$
$A_4 = -1.43531 \times 10^{-4}$
$A_6 = 2.42963 \times 10^{-7}$
$A_8 = -8.81758 \times 10^{-8}$
$A_{10} = 2.81587 \times 10^{-9}$
5th surface $K = 0.000$
$A_4 = -2.60495 \times 10^{-5}$
$A_6 = 7.62112 \times 10^{-7}$
$A_8 = -2.59097 \times 10^{-9}$
$A_{10} = 1.04283 \times 10^{-9}$
9th surface $K = 0.000$
$A_4 = 2.21869 \times 10^{-4}$
$A_6 = -5.83726 \times 10^{-6}$
$A_8 = 2.76274 \times 10^{-7}$
$A_{10} = -1.82983 \times 10^{-8}$
10th surface $K = 0.000$
$A_4 = -5.33927 \times 10^{-4}$
$A_6 = 1.39916 \times 10^{-5}$
$A_8 = -1.37267 \times 10^{-7}$
$A_{10} = 4.11809 \times 10^{-9}$
11th surface $K = 0.000$
$A_4 = -5.20824 \times 10^{-4}$
$A_6 = 1.11823 \times 10^{-5}$
$A_8 = -1.36807 \times 10^{-7}$
$A_{10} = 3.68016 \times 10^{-9}$
12th surface $K = 0.000$
$A_4 = -1.22480 \times 10^{-3}$
$A_6 = 4.02065 \times 10^{-5}$
$A_8 = -1.24733 \times 10^{-6}$
$A_{10} = 1.99247 \times 10^{-8}$ Zooming Data ($\infty$)

|  | WE | ST | TE |
|---|---|---|---|
| f (mm) | 8.10 | 10.89 | 23.55 |
| $F_{NO}$ | 1.86 | 2.11 | 3.21 |
| 2ω (°) | 61.86 | 44.92 | 21.09 |
| $d_3$ | 19.16 | 11.95 | 0.50 |
| $d_9$ | 3.97 | 4.97 | 12.74 |
| $d_{11}$ | 2.16 | 4.03 | 6.90 |
| $d_{13}$ | 1.80 | 0.81 | 0.19 |

EXAMPLE 12

$r_1 = -18.164$ (Aspheric)   $d_1 = 0.90$   $n_{d1} = 1.51633$   $\nu_{d1} = 64.14$
$r_2 = 13.285$   $d_2 = 1.80$   $n_{d2} = 1.83918$   $\nu_{d2} = 23.85$
$r_3 = 17.066$ (Aspheric)   $d_3 = $ (Variable)
$r_4 = 13.962$ (Aspheric)   $d_4 = 2.20$   $n_{d3} = 1.74320$   $\nu_{d3} = 49.34$
$r_5 = -25.345$ (Aspheric)   $d_5 = 0.10$ -continued $r_6 = 6.022$ (Aspheric)   $d_6 = 2.90$   $n_{d4} = 1.80610$   $\nu_{d4} = 40.92$
$r_7 = 119.085$   $d_7 = 0.50$   $n_{d5} = 2.00069$   $\nu_{d5} = 25.46$
$r_8 = 4.353$   $d_8 = 1.72$
$r_9 = \infty$ (Stop)   $d_9 = $ (Variable)
$r_{10} = -8.900$   $d_{10} = 2.20$   $n_{d6} = 1.92286$   $\nu_{d6} = 18.90$
$r_{11} = -12.685$   $d_{11} = 2.20$
$r_{12} = 64.569$ (Aspheric)   $d_{12} = 2.20$   $n_{d7} = 1.80610$   $\nu_{d7} = 40.92$
$r_{13} = -13.461$ (Aspheric)   $d_{13} = $ (Variable)
$r_{14} = -11.384$ (Aspheric)   $d_{14} = 1.00$   $n_{d8} = 1.52542$   $\nu_{d8} = 55.78$
$r_{15} = -6.418$ (Aspheric)   $d_{15} = $ (Variable)
$r_{16} = \infty$   $d_{16} = 0.74$   $n_{d9} = 1.54771$   $\nu_{d9} = 62.84$
$r_{17} = \infty$   $d_{17} = 0.50$
$r_{18} = \infty$   $d_{18} = 0.50$   $n_{d10} = 1.51633$   $\nu_{d10} = 64.14$
$r_{19} = \infty$   $d_{19} = 0.46$
$r_{20} = \infty$ (Imaging plane)

Aspherical Coefficients

1st surface $K = -0.690$
$A_4 = 1.00171 \times 10^{-4}$
$A_6 = -1.63342 \times 10^{-7}$
$A_8 = 0.000$
$A_{10} = 2.47553 \times 10^{-12}$
3rd surface $K = -2.051$
$A_4 = 8.63337 \times 10^{-5}$
$A_6 = -3.14892 \times 10^{-8}$
$A_8 = 7.47008 \times 10^{-9}$
$A_{10} = 0.000$
4th surface $K = -0.478$
$A_4 = -1.21096 \times 10^{-4}$
$A_6 = 2.15656 \times 10^{-6}$
$A_8 = -1.23897 \times 10^{-7}$
$A_{10} = 1.80977 \times 10^{-9}$
5th surface $K = -8.737$
$A_4 = -3.31436 \times 10^{-5}$
$A_6 = -1.24138 \times 10^{-6}$
$A_8 = -6.21293 \times 10^{-9}$
$A_{10} = 5.65326 \times 10^{-10}$
6th surface $K = 0.224$
$A_4 = -2.71845 \times 10^{-5}$
$A_6 = -6.16672 \times 10^{-6}$
$A_8 = 1.14404 \times 10^{-7}$
$A_{10} = -6.55772 \times 10^{-9}$
12th surface $K = -511.997$
$A_4 = -1.35640 \times 10^{-4}$
$A_6 = -9.45635 \times 10^{-6}$
$A_8 = -1.55393 \times 10^{-7}$
$A_{10} = 0$
13th surface $K = 0.910$
$A_4 = -1.71590 \times 10^{-4}$
$A_6 = -7.55572 \times 10^{-6}$
$A_8 = -1.11729 \times 10^{-8}$
$A_{10} = -1.29134 \times 10^{-9}$
14th surface $K = -0.773$
$A_4 = -1.36202 \times 10^{-3}$
$A_6 = 7.62379 \times 10^{-5}$
$A_8 = 0$
$A_{10} = 0$ -continued 15th surface K = 0.000
$A_4 = 0.000$
$A_6 = 7.95903 \times 10^{-5}$
$A_8 = 1.49209 \times 10^{-7}$
$A_{10} = 0$ Zooming Data (∞)

|  | WE | ST | TE |
|---|---|---|---|
| f (mm) | 7.33 | 12.42 | 21.06 |
| $F_{NO}$ | 1.86 | 2.57 | 3.86 |
| 2ω (°) | 66.51 | 38.99 | 23.65 |
| $d_3$ | 19.41 | 10.28 | 5.74 |
| $d_9$ | 2.74 | 5.59 | 14.38 |
| $d_{13}$ | 1.12 | 4.30 | 5.22 |
| $d_{15}$ | 2.44 | 1.20 | 0.49 |

EXAMPLE 13

| $r_1 = -24.536$ (Aspheric) | $d_1 = 0.90$ | $n_{d1} = 1.43875$ | $\nu_{d1} = 94.93$ |
|---|---|---|---|
| $r_2 = 19.004$ (Aspheric) | $d_2$ = (Variable) | | |
| $r_3 = 10.959$ (Aspheric) | $d_3 = 2.40$ | $n_{d2} = 1.69350$ | $\nu_{d2} = 53.21$ |
| $r_4 = -86.829$ (Aspheric) | $d_4 = 0.80$ | | |
| $r_5 = \infty$ (Stop) | $d_5 = 0.20$ | | |
| $r_6 = 7.563$ | $d_6 = 2.00$ | $n_{d3} = 1.81600$ | $\nu_{d3} = 46.62$ |
| $r_7 = 11.746$ | $d_7 = 0.55$ | $n_{d4} = 1.92286$ | $\nu_{d4} = 20.88$ |
| $r_8 = 5.783$ | $d_8$ = (Variable) | | |
| $r_9 = 8.932$ (Aspheric) | $d_9 = 2.20$ | $n_{d5} = 1.59201$ | $\nu_{d5} = 67.02$ |
| $r_{10} = 28.850$ (Aspheric) | $d_{10}$ = (Variable) | | |
| $r_{11} = -16.006$ | $d_{11} = 1.00$ | $n_{d6} = 1.68893$ | $\nu_{d6} = 31.07$ |
| $r_{12} = -19.735$ (Aspheric) | $d_{12}$ = (Variable) | | |
| $r_{13} = \infty$ | $d_{13} = 0.74$ | $n_{d7} = 1.54771$ | $\nu_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.50$ | | |
| $r_{17} = \infty$ (Imaging plane) | | | |

Aspherical Coefficients

1st surface

K = 0.000
$A_4 = 3.31292 \times 10^{-4}$
$A_6 = -1.13962 \times 10^{-5}$
$A_8 = 2.47541 \times 10^{-7}$
$A_{10} = -3.22394 \times 10^{-9}$
$A_{12} = 2.47078 \times 10^{-11}$
$A_{14} = -8.24959 \times 10^{-14}$ 2nd surface K = 0.936
$A_4 = 2.51032 \times 10^{-4}$
$A_6 = -7.12570 \times 10^{-6}$
$A_8 = 7.42959 \times 10^{-8}$
$A_{10} = 0$ 3rd surface K = -0.469
$A_4 = -8.90377 \times 10^{-5}$
$A_6 = -2.70516 \times 10^{-6}$
$A_8 = 1.34920 \times 10^{-7}$
$A_{10} = -6.48691 \times 10^{-9}$ 4th surface K = 0.000
$A_4 = -4.79022 \times 10^{-5}$
$A_6 = -2.20902 \times 10^{-6}$ $A_8 = 5.88068 \times 10^{-8}$
$A_{10} = -4.52956 \times 10^{-9}$ 9th surface K = -0.354
$A_4 = -1.20596 \times 10^{-4}$
$A_6 = -4.73292 \times 10^{-6}$
$A_8 = -2.19357 \times 10^{-7}$
$A_{10} = 0$ 10th surface K = 0.000
$A_4 = -2.02080 \times 10^{-4}$
$A_6 = -1.42932 \times 10^{-5}$
$A_8 = 0$
$A_{10} = 0$ 12th surface K = 0.000
$A_4 = 1.30109 \times 10^{-3}$
$A_6 = -2.61566 \times 10^{-5}$
$A_8 = 1.01606 \times 10^{-6}$
$A_{10} = 0$ Zooming Data (∞)

|  | WE | ST | TE |
|---|---|---|---|
| f (mm) | 8.04 | 11.69 | 22.91 |
| $F_{NO}$ | 1.79 | 1.99 | 2.75 |
| 2ω (°) | 62.15 | 41.58 | 21.63 |
| $d_2$ | 23.22 | 11.29 | 0.40 |
| $d_8$ | 5.20 | 4.91 | 12.25 |
| $d_{10}$ | 1.71 | 2.91 | 6.99 |
| $d_{12}$ | 1.58 | 2.27 | 0.76 |

EXAMPLE 14

| $r_1 = -28.621$ (Aspheric) | $d_1 = 0.90$ | $n_{d1} = 1.43875$ | $\nu_{d1} = 94.93$ |
|---|---|---|---|
| $r_2 = 13.270$ (Aspheric) | $d_2$ = (Variable) | | |
| $r_3 = 18.910$ (Aspheric) | $d_3 = 1.83$ | $n_{d2} = 1.76802$ | $\nu_{d2} = 49.24$ |
| $r_4 = -52.548$ (Aspheric) | $d_4 = 0.10$ | | |
| $r_5 = 7.084$ | $d_5 = 2.90$ | $n_{d3} = 1.88300$ | $\nu_{d3} = 40.76$ |
| $r_6 = 27.980$ | $d_6 = 0.55$ | $n_{d4} = 1.83918$ | $\nu_{d4} = 23.85$ |
| $r_7 = 5.338$ (Aspheric) | $d_7 = 1.72$ | | |
| $r_8 = \infty$ (Stop) | $d_8$ = (Variable) | | |
| $r_9 = -7.790$ | $d_9 = 0.80$ | $n_{d5} = 1.92286$ | $\nu_{d5} = 18.90$ |
| $r_{10} = -11.396$ | $d_{10} = 0.15$ | | |
| $r_{11} = 60.657$ (Aspheric) | $d_{11} = 2.34$ | $n_{d6} = 1.76802$ | $\nu_{d6} = 49.24$ |
| $r_{12} = -11.972$ (Aspheric) | $d_{12}$ = (Variable) | | |
| $r_{13} = -26.874$ (Aspheric) | $d_{13} = 1.00$ | $n_{d7} = 1.69350$ | $\nu_{d7} = 53.20$ |
| $r_{14} = -17.612$ (Aspheric) | $d_{14}$ = (Variable) | | |
| $r_{15} = \infty$ | $d_{15} = 0.74$ | $n_{d8} = 1.54771$ | $\nu_{d8} = 62.84$ |
| $r_{16} = \infty$ | $d_{16} = 0.50$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.30$ | | |
| $r_{19} = \infty$ (Imaging plane) | | | |

Aspherical Coefficients

1st surface

K = -0.134
$A_4 = 2.47196 \times 10^{-7}$
$A_6 = 2.34297 \times 10^{-7}$
$A_8 = 0.000$
$A_{10} = 0.000$ 2nd surface K = -1.454
$A_4 = 1.35646 \times 10^{-5}$ -continued $A_6 = -1.44746 \times 10^{-7}$
$A_8 = 6.88829 \times 10^{-9}$
$A_{10} = 0.000$
3rd surface $K = -0.093$
$A_4 = 3.65504 \times 10^{-5}$
$A_6 = -1.10311 \times 10^{-7}$
$A_8 = -4.25458 \times 10^{-8}$
$A_{10} = 2.18338 \times 10^{-10}$
4th surface $K = -18.402$
$A_4 = 3.23935 \times 10^{-5}$
$A_6 = -6.55955 \times 10^{-7}$
$A_8 = -3.93067 \times 10^{-8}$
$A_{10} = 4.20213 \times 10^{-10}$
7th surface $K = 0.004$
$A_4 = 1.46877 \times 10^{-4}$
$A_6 = 8.79444 \times 10^{-6}$
$A_8 = 1.86813 \times 10^{-7}$
$A_{10} = 8.06203 \times 10^{-9}$
11th surface $K = -12.098$
$A_4 = -1.37660 \times 10^{-4}$
$A_6 = 1.15212 \times 10^{-6}$
$A_8 = -2.15963 \times 10^{-7}$
$A_{10} = 0$
12th surface $K = -0.296$
$A_4 = -5.40491 \times 10^{-5}$
$A_6 = -2.16122 \times 10^{-6}$
$A_8 = -3.79109 \times 10^{-8}$
$A_{10} = -2.42168 \times 10^{-9}$
13th surface $K = -5.302$
$A_4 = -3.55522 \times 10^{-4}$
$A_6 = 2.30162 \times 10^{-5}$
$A_8 = 0$
$A_{10} = 0$
14th surface $K = 0.000$
$A_4 = 0.000$
$A_6 = 2.63358 \times 10^{-5}$
$A_8 = 1.38995 \times 10^{-8}$
$A_{10} = 0$ Zooming Data ($\infty$)

|  | WE | ST | TE |
|---|---|---|---|
| f (mm) | 8.14 | 14.00 | 23.45 |
| $F_{NO}$ | 1.86 | 2.31 | 3.68 |
| 2ω (°) | 60.86 | 35.29 | 21.39 |
| $d_2$ | 20.49 | 6.87 | 5.23 |
| $d_8$ | 4.12 | 3.63 | 17.92 |
| $d_{12}$ | 1.11 | 7.40 | 5.08 |
| $d_{14}$ | 3.67 | 1.80 | 0.28 |

EXAMPLE 15

$r_1 = -22.016$ (Aspheric)   $d_1 = 0.90$   $n_{d1} = 1.43875$   $\nu_{d1} = 94.93$
$r_2 = 15.461$ (Aspheric)   $d_2 = $ (Variable)
$r_3 = 14.701$ (Aspheric)   $d_3 = 2.06$   $n_{d2} = 1.74320$   $\nu_{d2} = 49.34$
$r_4 = -32.999$ (Aspheric)   $d_4 = 0.10$
$r_5 = 6.405$ (Aspheric)   $d_5 = 2.90$   $n_{d3} = 1.80610$   $\nu_{d3} = 40.92$
$r_6 = 33.244$   $d_6 = 0.50$   $n_{d4} = 2.00069$   $\nu_{d4} = 25.46$ -continued $r_7 = 4.856$   $d_7 = 1.72$
$r_8 = \infty$ (Stop)   $d_8 = $ (Variable)
$r_9 = -8.940$   $d_9 = 0.80$   $n_{d5} = 1.92286$   $\nu_{d5} = 18.90$
$r_{10} = -16.611$   $d_{10} = 0.18$
$r_{11} = 45.839$ (Aspheric)   $d_{11} = 2.55$   $n_{d6} = 1.80610$   $\nu_{d6} = 40.92$
$r_{12} = -11.009$ (Aspheric)   $d_{12} = $ (Variable)
$r_{13} = -10.879$ (Aspheric)   $d_{13} = 1.00$   $n_{d7} = 1.52542$   $\nu_{d7} = 55.78$
$r_{14} = -7.731$ (Aspheric)   $d_{14} = $ (Variable)
$r_{15} = \infty$   $d_{15} = 0.74$   $n_{d8} = 1.54771$   $\nu_{d8} = 62.84$
$r_{16} = \infty$   $d_{16} = 0.50$
$r_{17} = \infty$   $d_{17} = 0.50$   $n_{d9} = 1.51633$   $\nu_{d9} = 64.14$
$r_{18} = \infty$   $d_{18} = 0.30$
$r_{19} = \infty$ (Imaging plane)

Aspherical Coefficients

1st surface $K = -0.519$
$A_4 = 3.69695 \times 10^{-5}$
$A_6 = 5.65774 \times 10^{-8}$
$A_8 = 0.000$
$A_{10} = 3.73887 \times 10^{-12}$
2nd surface $K = -2.161$
$A_4 = 4.21993 \times 10^{-5}$
$A_6 = -1.75597 \times 10^{-7}$
$A_8 = 8.97310 \times 10^{-9}$
$A_{10} = 0.000$
3rd surface $K = -0.175$
$A_4 = -9.06679 \times 10^{-6}$
$A_6 = -3.53110 \times 10^{-7}$
$A_8 = -2.44657 \times 10^{-8}$
$A_{10} = 2.47234 \times 10^{-10}$
4th surface $K = -17.775$
$A_4 = -2.80828 \times 10^{-5}$
$A_6 = -1.49749 \times 10^{-7}$
$A_8 = -1.08247 \times 10^{-8}$
$A_{10} = 1.49523 \times 10^{-10}$
5th surface $K = 0.037$
$A_4 = -3.97693 \times 10^{-5}$
$A_6 = -1.02246 \times 10^{-6}$
$A_8 = -1.04292 \times 10^{-9}$
$A_{10} = -2.35540 \times 10^{-13}$
11th surface $K = -11.838$
$A_4 = -1.64575 \times 10^{-4}$
$A_6 = -3.82233 \times 10^{-6}$
$A_8 = -2.40636 \times 10^{-7}$
$A_{10} = 0$
12th surface $K = -0.837$
$A_4 = -6.41167 \times 10^{-5}$
$A_6 = -6.74867 \times 10^{-6}$
$A_8 = -4.23546 \times 10^{-8}$
$A_{10} = -2.74519 \times 10^{-9}$
13th surface $K = -2.908$
$A_4 = -1.08544 \times 10^{-3}$
$A_6 = 4.99868 \times 10^{-5}$
$A_8 = 0$
$A_{10} = 0$
14th surface $K = 0.000$
$A_4 = 0.000$
$A_6 = 4.25126 \times 10^{-5}$ -continued $A_8 = 1.52833 \times 10^{-7}$
$A_{10} = 0$ Zooming Data (∞)

|  | WE | ST | TE |
|---|---|---|---|
| f (mm) | 8.14 | 13.82 | 23.46 |
| $F_{NO}$ | 1.85 | 2.47 | 3.85 |
| 2ω (°) | 60.81 | 35.74 | 21.43 |
| $d_2$ | 20.70 | 9.76 | 6.47 |
| $d_8$ | 3.54 | 6.20 | 17.38 |
| $d_{12}$ | 1.23 | 5.56 | 4.71 |
| $d_{14}$ | 3.38 | 1.41 | 0.16 |

Aberration diagrams for Examples 1-15 upon focusing on an object point at infinity are given in FIGS. 16-30 wherein (a), (b) and (c) stand for spherical aberrations (SA), astigmatism (AS), distortion (DT) and chromatic aberrations (CC) at the wide-angle end (a), in the intermediate state (b) and at the telephoto end (c), respectively, with "ω" being indicative of a half angle of view (°).

The values of conditions (1) to (14) in the respective examples are set out just below.

| | Example | | | | | | | |
|---|---|---|---|---|---|---|---|---|
| | 1 | 2 | 3 | 4 | 5 | 6 | 7 | 8 |
| Condition(1) | 20.38 | 20.10 | 21.46 | 21.11 | 19.84 | 19.81 | 21.31 | 18.72 |
| Condition(2) | 20.38 | 20.10 | 21.46 | 21.11 | 19.84 | 19.81 | 21.31 | 18.72 |
| Condition(3) | 0.35 | 0.36 | 0.35 | 0.36 | 0.26 | 0.26 | 0.28 | 0.27 |
| Condition(4) | 2.05 | 1.71 | 2.09 | 1.81 | 1.53 | 1.49 | 1.54 | 1.72 |
| Condition(5) | 1.76 | 1.75 | 1.88 | 1.86 | 1.61 | 1.61 | 1.83 | 1.69 |
| Condition(6) | 1.40 | 1.43 | 1.44 | 1.40 | 1.11 | 1.10 | 1.55 | 1.62 |
| Condition(7) | 0.34 | 0.35 | 0.32 | 0.34 | 0.34 | 0.34 | 0.30 | 0.28 |
| Condition(8) | 0.48 | 0.48 | 0.47 | 0.48 | 0.47 | 0.48 | 0.46 | 0.48 |
| Condition(9) | 1.07 | 1.06 | 1.07 | 1.11 | 0.97 | 0.98 | 0.94 | 0.86 |
| Condition(10) | 0.81 | 0.78 | 0.91 | 0.90 | 0.79 | 0.97 | 0.80 | 0.70 |
| Condition(11) | 0.68 | 0.68 | 0.70 | 0.70 | 0.81 | 0.86 | 0.66 | 0.64 |
| Condition(12) | 2.88 | 2.88 | 2.89 | 2.90 | 2.88 | 2.84 | 2.87 | 2.88 |
| Condition(13) | 62.01 | 61.68 | 60.98 | 60.75 | 62.43 | 62.14 | 63.24 | 61.31 |
| Condition(14) | 2.74 | 2.86 | 2.51 | 2.56 | 2.66 | 2.14 | 3.46 | 3.21 |

| | Example | | | | | | |
|---|---|---|---|---|---|---|---|
| | 9 | 10 | 11 | 12 | 13 | 14 | 15 |
| Condition(1) | 17.91 | 19.79 | 18.48 | 21.63 | 19.60 | 19.97 | 19.85 |
| Condition(2) | 17.91 | 19.79 | 18.48 | 21.69 | 19.60 | 19.97 | 19.85 |
| Condition(3) | 0.27 | 0.27 | 0.28 | 0.28 | 0.28 | 0.27 | 0.27 |
| Condition(4) | 1.41 | 1.70 | 1.36 | 1.76 | 1.25 | 1.30 | 1.35 |
| Condition(5) | 1.58 | 1.70 | 1.60 | 1.71 | 1.80 | 1.69 | 1.68 |
| Condition(6) | 1.38 | 1.36 | 1.60 | 1.36 | 1.68 | 1.36 | 1.36 |
| Condition(7) | 0.32 | 0.32 | 0.31 | 0.33 | 0.31 | 0.32 | 0.33 |
| Condition(8) | 0.47 | 0.47 | 0.48 | 0.43 | 0.49 | 0.48 | 0.48 |
| Condition(9) | 0.89 | 0.95 | 0.89 | 0.91 | 0.99 | 0.98 | 0.99 |
| Condition(10) | 0.68 | 0.73 | 0.49 | 0.61 | 0.65 | 0.72 | 0.65 |
| Condition(11) | 0.59 | 0.72 | 0.64 | 0.42 | 0.75 | 0.48 | 0.44 |
| Condition(12) | 2.85 | 2.88 | 2.91 | 2.87 | 2.85 | 2.88 | 2.88 |
| Condition(13) | 62.67 | 63.07 | 61.86 | 66.51 | 62.15 | 60.86 | 60.81 |
| Condition(14) | 3.15 | 3.41 | 4.83 | 4.34 | 4.47 | 3.50 | 3.94 |

In these examples, there are zoom lenses achievable, which, albeit having a zoom ratio of as high as about 3 and an angle of view of about 60° at the wide-angle end, has an F-number value of as small as about 1.8 at the wide-angle end, exhibit fairly good optical performance all over the zoom range and object distance, and can be received compactly in an associated lens mount.

In the respective examples, the focusing on the farthest distance is tantamount to focusing on an object at infinity. Except Example 12, the full length of the zoom lens grows longest at the time of focusing on an infinite object at the wide-angle end. Note here that focusing on a near distance may be implemented by the third lens group G3 and/or the fourth lens group G4.

In each one of the examples, the aperture stop S may have a variable aperture size for brightness control. Alternatively, with the aperture size of the stop remaining fixed, the quantity of light may be controlled by inserting or de-inserting a light quantity control filter in or from other site.

In each one of the examples, the aperture stop S assumes on a circular form about the optical axis on full aperture, with the radius of that aperture given below.

| Example | Aperture Radius (mm) |
|---|---|
| 1 | 4.67 |
| 2 | 4.63 |
| 3 | 4.67 |
| 4 | 4.85 |
| 5 | 4.33 |
| 6 | 3.97 |
| 7 | 4.00 |
| 8 | 3.85 |
| 9 | 2.49 |
| 10 | 4.22 |
| 11 | 3.78 |
| 12 | 2.25 |
| 13 | 4.17 |
| 14 | 2.82 |
| 15 | 2.61 |

By the way, an antireflection coating is generally applied to the air contact surface of a lens for the purpose of preventing ghosts and flares.

At the cementing surface of a cemented lens, on the other hand, the refractive index of the adhesive material is much higher than that of air; in most cases, the cementing surface has a reflectivity that is on a par with or lower than that of a single layer coating, so that there is little need of applying the antireflection coating. However, if the antireflection coating is intentionally applied to the cementing surface too, there are then further reductions achievable in ghosts and flares, which could in turn make sure images of better quality.

Especially in recent years, vitreous materials having high refractive indices have grown popularity, and they have often been used with camera optical systems for the reasons of their enhanced effect on correction of aberrations. When a high-refractive-index vitreous material is used as a cemented lens, reflection at the cementing surface would also be not negligible. In such a case, it would be particularly effective to have an antireflection coat applied on the cementing surface.

Effective use of cementing surface coating is disclosed in JP-A's 2-27301, 2001-324676 and 2005-92115 and U.S. Pat. No. 7,116,482, etc. In those publications, there is the particular mention of the cementing lens surface coating in the first lens group of the zoom lens. In the examples of the invention, too, it goes without saying that the cementing surface coating on the basis of the same idea takes effect.

Depending on the refractive index of the lens involved and the refractive index of the adhesive material used, use may be made of coating materials of relatively high refractive index such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive index such as $MgF_2$, $SiO_2$, and $Al_2O_3$.

These coating materials may then have a suitable thickness selected in such a way as to meet phase conditions.

As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc.

And now, with the zoom lens of the invention, image distortion may be corrected in an electrically digital way. The basic concept of how image distortion is digitally corrected is now explained.

Figure 31:
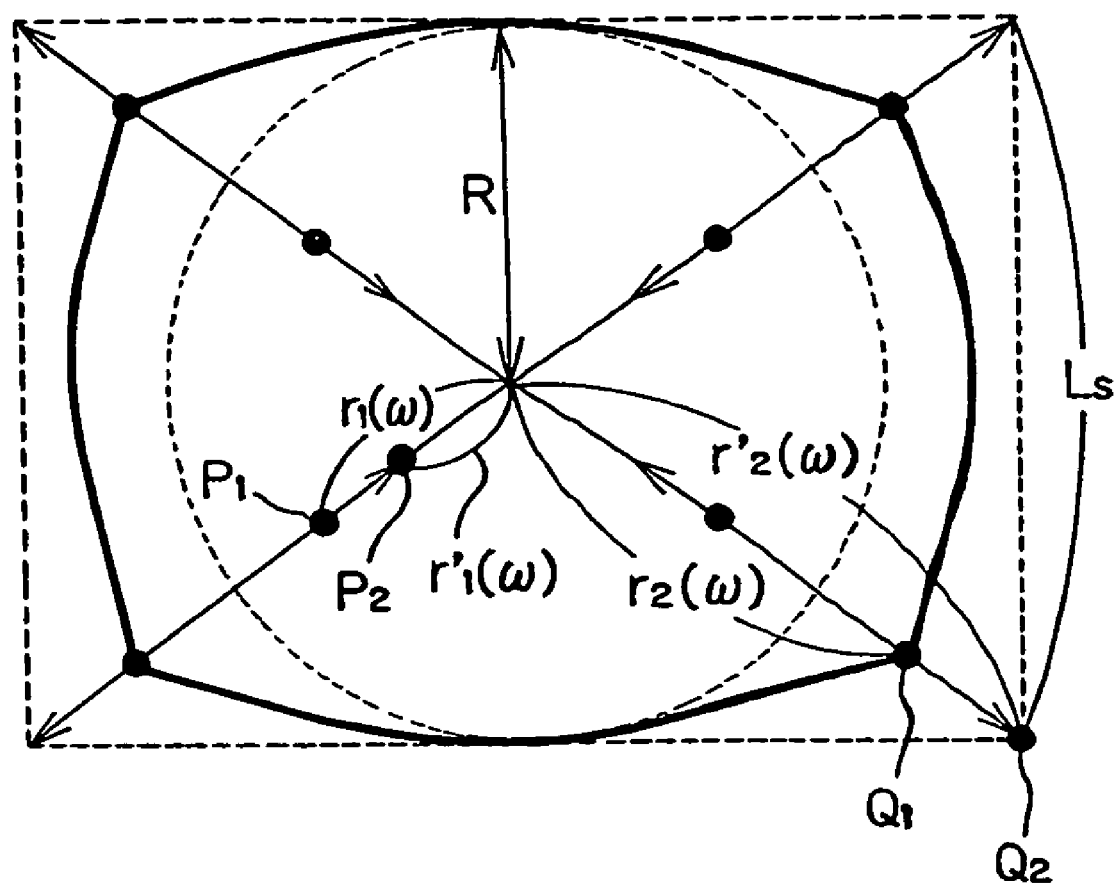
FIG. 31 is illustrative of the basic concept for digital correction of image distortion.

As shown typically in FIG. 31, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius $r(\omega)$ are moved in substantially radial directions; they are concentrically moved to a radius $r'(\omega)$ for correction. In FIG. 31 as an example, a point $P_1$ on the circumference of an arbitrary circle of radius $r_1(\omega)$ positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2(\omega)$ positioned outside the circle of radius R is moved to a point $Q_2$ on the circumference of a circle of radius $r_2'(\omega)$ to be corrected in a direction away from the center of the circle. Here, $r'(\omega)$ is represented by $$r'(\omega) = \alpha f \tan \omega \, (0 \leq \alpha \leq 1)$$

where $\omega$ is a subject half angle of view, and f is the focal length of an imaging optical system (the zoom lens in the invention).

Here let Y be an ideal image height corresponding to on the aforesaid circle of radius R. Then, $$\alpha = R/Y = R/f \tan \omega$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius $r(\omega)$ moved in substantially radial directions to move them concentrically to radius $r'(\omega)$.

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid circle. It is therefore preferable to make use of a method that determines coordinates $(X_i', Y_j')$ for where the points are to be moved to per each pixel $(X_i, Y_j)$. Note that when two or more points $(X_i, Y_j)$ are moved to the coordinates $(X_i', Y_j')$, there is the average of the values the respective pixels have taken, and when there are no incoming points, interpolation may be implemented using the values of the coordinates $(X_i', Y_j')$ for some neighboring pixels.

Such a method is effective for especially when the aforesaid circle of radius R drawn on the aforesaid optical image becomes badly distorted and asymmetric with respect to the optical axis for the reason of fabrication errors of the optical system and electronic imaging device of an electronic imaging system the zoom lens has. That method is also effective for correction of geometric distortion or the like occurring at the time of reproduction of signals as an image at the imaging device or various output devices.

With the electronic imaging system of the invention, $r(\omega)$, i.e., the relation between the half angle of view and the image height or the relation between the real image height r and the ideal image height $r'/\alpha$ may have been recorded in a recording medium built in it for the purpose of figuring out $r'(\omega) - r(\omega)$.

It is here noted that to prevent the image after the correction of distortion from running extremely short of light quantity at both ends in the short side direction, it is preferable for the aforesaid radius R to satisfy the following condition:

$$0 \leq R \leq 0.6 L_s$$

where $L_s$ is the length of the short side of the effective imaging plane.

For the aforesaid radius R it is more preferable to satisfy the following condition.

$$0.3 L_s \leq R \leq 0.6 L_s$$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of images; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially $r'(\omega) = \alpha f \tan \omega$ at or near the telephoto end within the divided focal zones. In that case, however, there is some barrel distortion remaining at the wide-angle end within the divided focal zones. Too many divided zones are not that preferable because of the need of storing too much intrinsic data necessary for correction in the recording medium. Therefore, one or few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially $r'(\omega) = \alpha f \tan \omega$ at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $$f = y/\tan \omega$$

Here y is the height (image height) of an image point from the optical axis, f is the focal length of an imaging system (the zoom lens in the invention), and $\omega$ is the angle (subject half angle of view) with the optical axis of an object point direction corresponding to an image point formed from the center on the imaging plane to the position of y.

When there is barrel distortion in the imaging system, $$f > y/\tan \omega$$

It follows that with both the focal length f of the imaging system and the image height y kept constant, the value of ω grows large.

Figure 32:
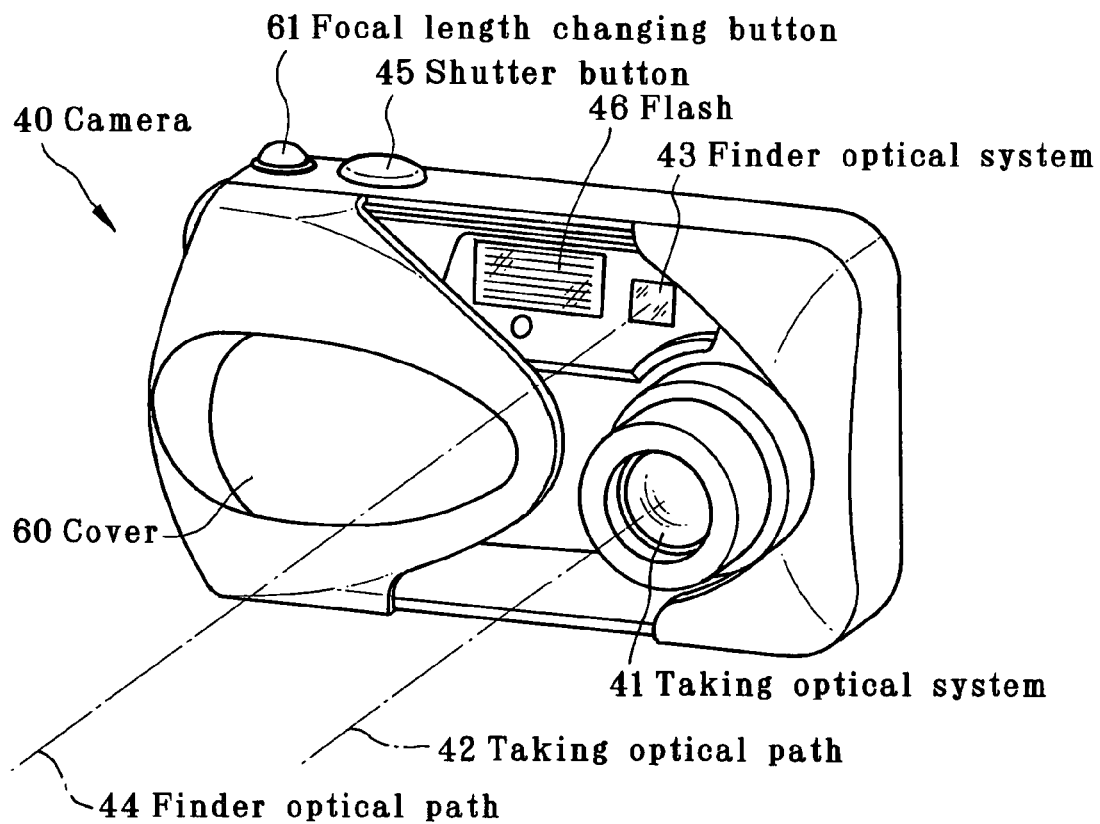
FIG. 32 is a front perspective schematic illustrative of the outside shape of the inventive digital camera.
Figure 33:
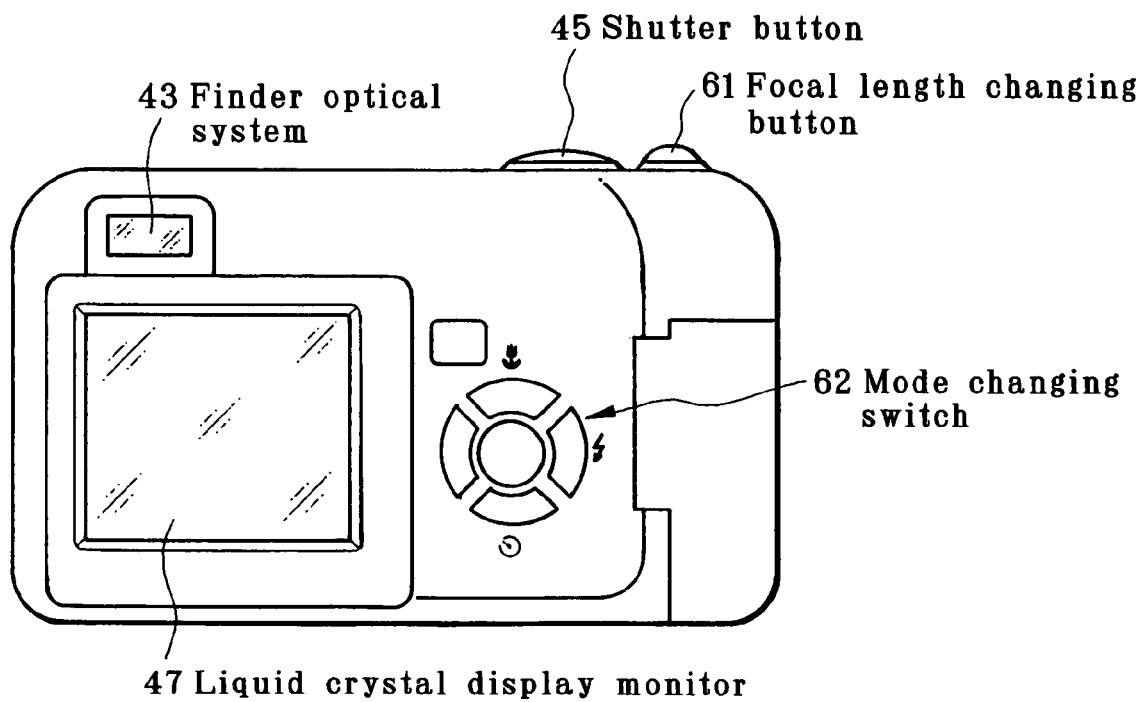
FIG. 33 is a rear perspective schematic of the digital camera of FIG. 32.
Figure 34:
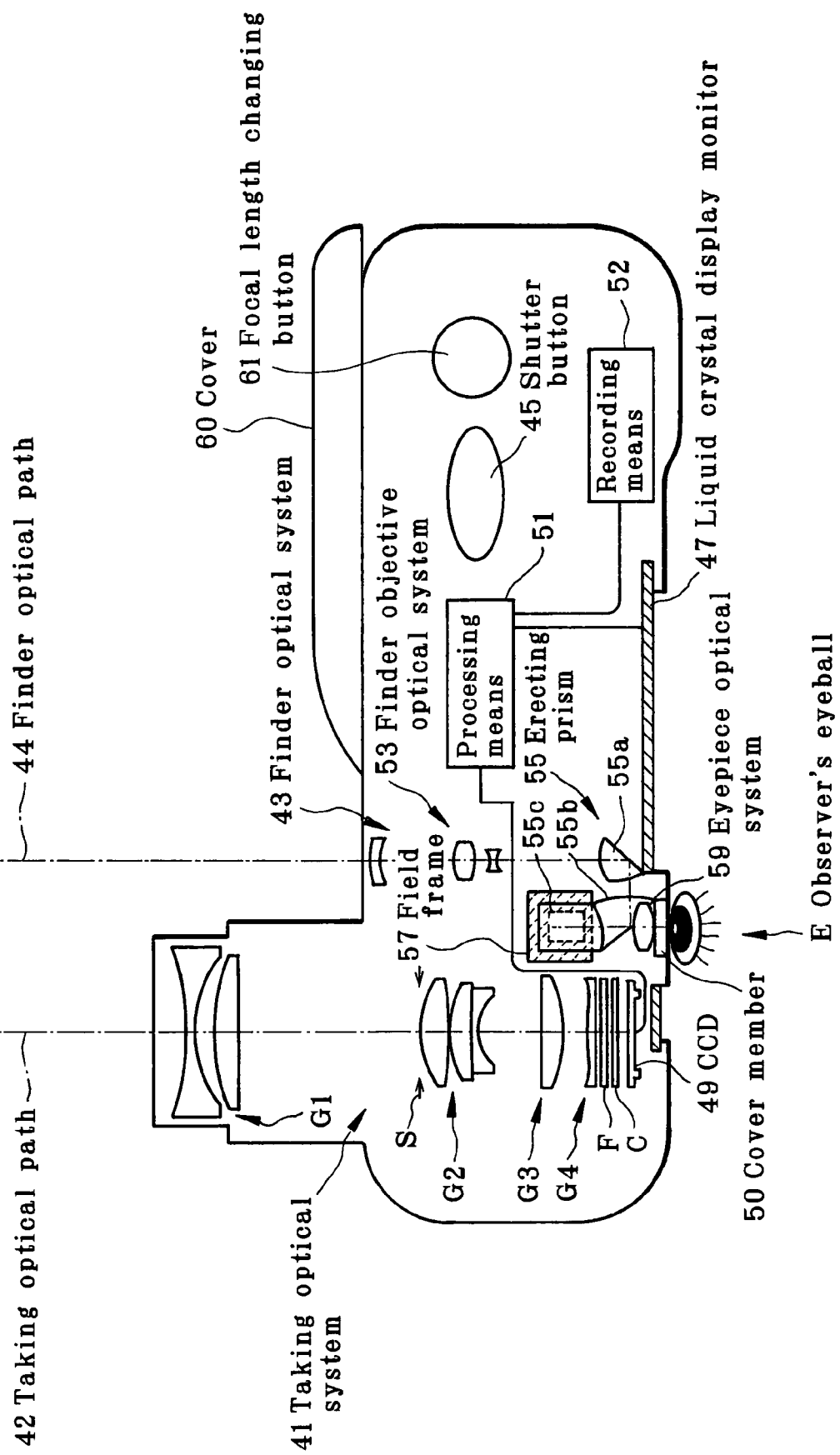
FIG. 34 is a sectional view of the digital camera of FIG. 32.

FIGS. 32, 33 and 34 are illustrative in conception of the construction of a digital camera according to the invention, in which the inventive zoom lens is built in its taking optical system 41. Specifically, FIG. 32 is a front perspective view of the appearance of a digital camera 40, FIG. 33 is a rear front view of the digital camera 40, and FIG. 34 is a sectional schematic view of the construction of the digital camera 40. Note here that FIGS. 32 and 34 show that the taking optical system 41 is housed in a camera body. In this embodiment, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62 and so on. When the taking optical system 41 is housed in the camera body, a cover 60 is slid over the taking optical system 41, the finder optical system 43 and the flash 46. As the cover 60 is slid open to place the camera 40 in a taking mode, the taking optical system 41 is put out of the camera body, as shown in FIG. 34. Then, as the shutter button 45 mounted on the upper side of the camera 40 is pressed down, it causes taking to be implemented through the taking optical system 41, for instance, the zoom lens of Example 1. An object image formed through the taking optical system 41 is formed on the imaging plane (photoelectric conversion plane) of CCD 49 via a low-pass filter LF with a wavelength range limiting coating applied on it and a cover glass CG. The object image received at CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens groups (three groups in the embodiment of FIGS. 32-34) and an erecting prism system 55 comprising erecting prisms 55a, 55b and 55c with its focal length variable in operable association with the zoom lens that is the taking optical system 41. An object image formed through the finder objective optical system 53 is formed on a field frame 57 of the erection prism system 55 that is an image-erecting member. In the rear of the erection prism system 55, there is an eyepiece optical system 59 located for guiding an erected image into the eyeball E of the viewer. Note here that a cover member 50 is located on the exit side of the eyepiece optical system 59.

Figure 35:
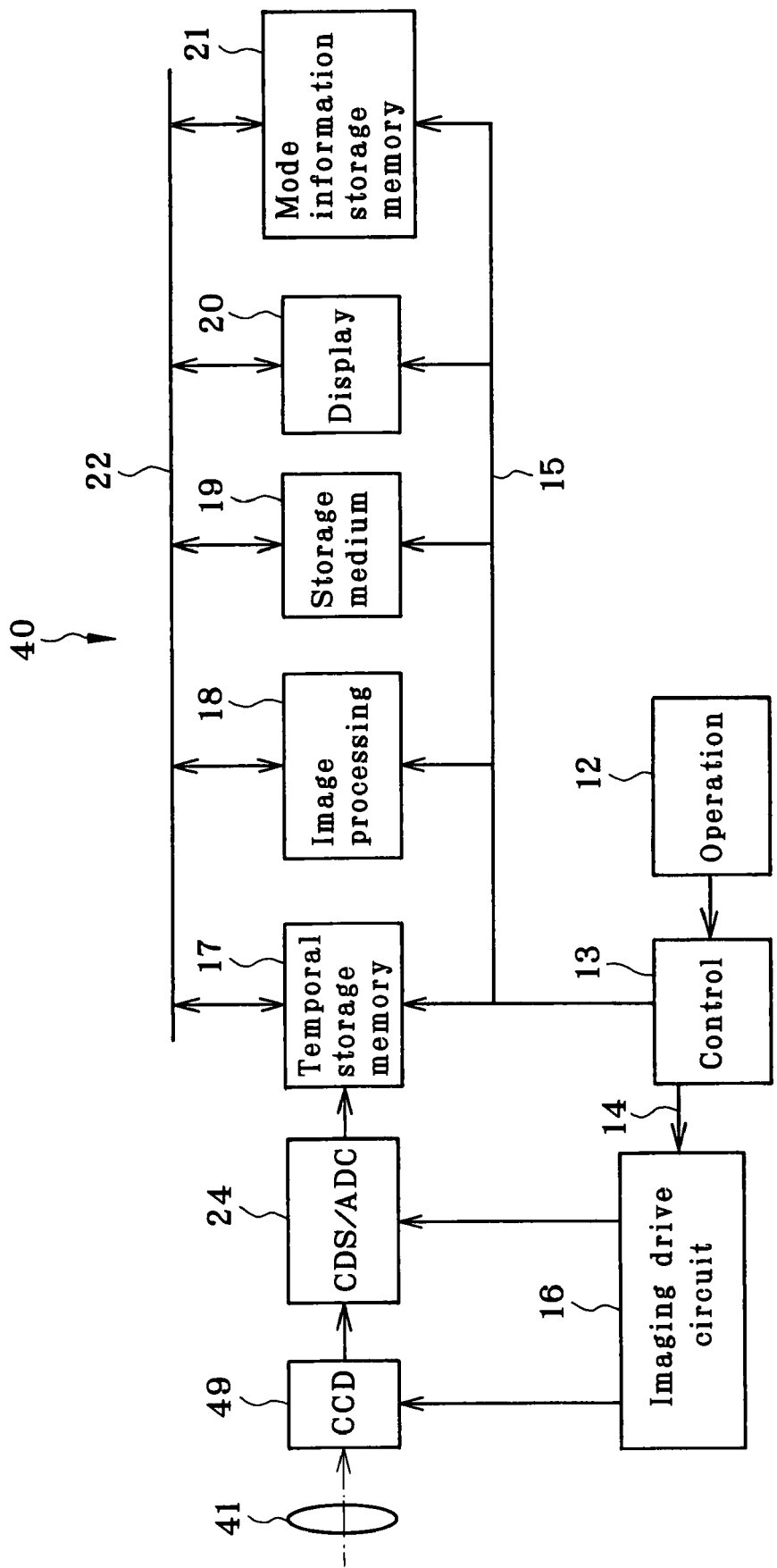
FIG. 35 is a component block diagram for an internal circuit in part of the digital camera of FIG. 32.

FIG. 35 is a component block diagram illustrative of the internal circuit of a main part of the aforesaid digital camera 40. In the following description, the aforesaid processing means 51, for instance, comprises a CDS/ADC portion 24, a temporary storage memory 17, an image processing portion 18 and so on, and the storage means 52, for instance, comprises a memory medium portion 19 and so on.

As shown in FIG. 35, the digital camera 40 comprises an operation portion 12, a control portion 13 connected to the operation portion 12, an imaging drive circuit 16 connected to the control signal output port of the control portion 13 via buses 14 and 15, a temporary storage memory 17, an image processing portion 18, a storage medium portion 19, a display portion 20 and a mode information storage memory portion 21.

The aforesaid temporary storage memory 17, image processing portion 18, storage medium portion 19, display portion 20 and mode information storage memory portion 20 are set up such that data can be mutually entered or outputted, and the imaging drive circuit 17 is connected with CCD 49 and CDS/ADC portion 24.

The operation portion 12 comprises various input buttons, switches and so on, and provides a circuit for notifying of the control portion event information entered from outside (a camera operator) via those input buttons or switches. The control portion 13, for instance, is a central processing unit made up of a CPU and so on, and has a built-in program memory (not shown). Pursuant to the program stored in that program memory, that circuit controls the whole digital camera 40 in response to a command entered by the camera operator via the control portion 12.

CCD 49 receives an object image formed through the inventive taking optical system 41. CCD 49 is an imaging device that is driven and controlled by the imaging drive circuit 17 so that the quantity of light of that object image per pixel is converted into electrical signals to enter them in the CDS/ADC portion 24.

The CDS/ADC portion 24 is a circuit adapted to amplify the electrical signals entered from CCD 49 and subject them to digital transformation, entering into the temporary storage memory 17 image raw data (VEYOR data or RAW data) subjected to amplification and digital transformation alone.

The temporary storage memory 17 is a buffer comprising SDRAM as an example and so on, and a memory device adapted to provide a temporal storage of the aforesaid RAW data produced out of the CDS/ADC portion 24. The image processing portion 18 is a circuit adapted to read the RAW data stored in the temporal storage memory 17 or RAW data stored in the storage medium portion 19, thereby implementing various image processing inclusive of distortion correction on the basis of an image quality parameter designated from the control portion 13.

The recording medium portion 19 is a control circuit for the device wherein a card or stick type storage medium comprising a flash memory as an example is attached or detached to record and store the RAW data transferred from the temporary storage memory 17 or the image data processed at the image processing portion 18 in the card or stick type flash memory.

The display memory 20 is a circuit comprising a liquid crystal display monitor 47 and adapted to display images, operating menus and so on that liquid crystal display monitor 47. The mode information storage memory portion 21 comprises a ROM section with various image quality parameters loaded in it and a RAM section adapted to store the image quality parameter selected by input operation of the operation portion 12 out of the image quality parameters read out of that ROM section. The mode information storage memory portion 21 is a circuit adapted to control inputs to and outputs from those memories.

The thus constructed digital camera 40 is much improved in terms of performance, size and wide-angle capabilities, because albeit having plenty of wide-angle area and compact size, the taking optical system 41 of the invention has a higher zoom ratio and very stable imaging capabilities all over the zooming range. Further, faster focusing operation is ensured at the wide-angle and telephoto sides.

The present invention is applicable not only to the so-called compact digital cameras designed to take images of such general subjects as described above but also to surveillance cameras requiring wide angles of view and cameras of the lens interchangeable type.

What we claim is:

1. A zoom lens, comprising, in order from an object side thereof:

a first lens group having negative refracting power,
a second lens group having positive refracting power, and
a third lens group having positive refracting power, wherein, upon zooming from a wide-angle end to a telephoto end of said zoom lens,
said first lens group, said second zoom lens and said third lens group each move along an optical axis of said zoom lens,
a spacing between said first lens group and said second lens group becomes narrow, and
a spacing between said second lens group and said third lens group becomes wide, wherein:
said first lens group comprises one single lens that is a double-concave negative lens or two lenses: a double-concave negative lens and a positive lens,
said first lens group includes a total of at most two lenses,
said second lens group comprises two positive lenses and one negative lens,
said second lens group includes a total of three lenses,
at least one of said two positive lenses in said second lens group has an aspheric lens surface, and
the following condition is satisfied:

$$16 < C_{jw}/h_{1w} < 23 \quad (1)$$

where $h_{1w}$ is a height of an axial marginal ray at an entrance surface in the first lens group at the wide-angle end and upon focusing on the farthest distance, and $C_{jw}$ is a length from the entrance surface in the first lens group to an image plane at the wide-angle end and upon focusing on the farthest distance.

2. The zoom lens according to claim 1, which satisfies the following condition (2):

$$16 < C_{jmax}/h_{1w} < 23 \quad (2)$$

where $C_{jmax}$ is the longest of axial lengths from the entrance surface in the first lens group to the image plane in every state of use.

3. The zoom lens according to claim 1, which further comprises an aperture stop somewhere from a space just before said second lens group to a space just after said second lens group, wherein said aperture stop moves together said second lens group during said zooming.

4. The zoom lens according to claim 1, which satisfies the following condition (3):

$$0.25 < h_{1'w}/f_w < 0.4 \quad (3)$$

where $h_{1'w}$ is a height of an axial marginal ray at an exit surface in the first lens group at the wide-angle end and upon focusing on the farthest distance, and $f_w$ is a focal length of the whole zoom lens system at the wide-angle end and upon focusing on the farthest distance.

5. The zoom lens according to claim 1, which satisfies the following condition (4):

$$1.0 < \Sigma d/f_w < 2.2 \quad (4)$$

where $\Sigma d$ is a total thickness on the optical axis of each lens group of the whole zoom lens system, and $f_w$ is a focal length of the whole zoom lens system at the wide-angle end and upon focusing on the farthest distance.

6. The zoom lens according to claim 1, which further comprises a fourth lens group located on an image side with respect to said third lens group and consisting of only one aspheric lens.

7. The zoom lens according to claim 6, wherein said third lens group and said fourth lens group are moved in an optical axis direction with a constant or varying spacing between them, thereby implementing focusing operation from focusing on the farthest distance from focusing on a near distance.

8. The zoom lens according to claim 1, wherein focusing operation from focusing on the farthest distance to focusing on a near distance is implemented by movement of said third lens group in an optical axis direction.

9. An imaging system, comprising:

a zoom lens as recited in claim 1, and
an imaging device having an image pickup plane located on an image side of said zoom lens, and adapted to convert an image formed by said zoom lens on said image pickup plane into electrical signals.

10. A zoom lens, comprising, in order from an object side thereof:

a first lens group having negative refracting power,
a second lens group having positive refracting power, and
a third lens group having positive refracting power, wherein, upon zooming from a wide-angle end to a telephoto end of said zoom lens,
said first lens group, said second zoom lens and said third lens group each move along an optical axis of said zoom lens,
a spacing between said first lens group and said second lens group becomes narrow, and
a spacing between said second lens group and said third lens group becomes wide, wherein:
said first lens group comprises one single lens that is a double-concave negative lens or two lenses: a double-concave negative lens and a positive lens,
said first lens group includes a total of at most two lenses,
said second lens group comprises two positive lenses and one negative lens,
said second lens group includes a total of three lenses,
at least one of said two positive lenses in said second lens group has an aspheric lens surface, and
the following condition (5) is satisfied:

$$1.5 < f_2/f_w < 1.9 \quad (5)$$

where $f_2$ is a focal length of the second lens group, and $f_w$ is a focal length of the whole zoom lens system at the wide-angle end and upon focusing on the farthest distance.

11. The zoom lens according to claim 10, which satisfies the following condition (6):

$$1.09 < |f_1|/(f_w \cdot F_{NOw}) < 1.7 \quad (6)$$

where $f_1$ is a focal length of the first lens group, and $F_{NOw}$ is an F-number of the zoom lens at the wide-angle end and upon focusing on the farthest distance.

12. The zoom lens according to claim 10, which satisfies the following condition (7):

$$0.28 < h_{2w}/f_2 < 0.35 \quad (7)$$

where $h_{2w}$ is a height of an axial marginal ray at an entrance surface in the second lens group at the wide-angle end and upon focusing on the farthest distance.

13. The zoom lens according to claim 10, which further comprises a fourth lens group located on an image side with respect to said third lens group and consisting of only one aspheric lens.

14. The zoom lens according to claim 13, wherein said third lens group and said fourth lens group are moved in an optical axis direction with a constant or varying spacing between them, thereby implementing focusing operation from focusing on the farthest distance to focusing on a near distance.

15. The zoom lens according to claim 10, wherein focusing operation from focusing on the farthest distance to focusing on a near distance is implemented by movement of said third lens group in an optical axis direction.

16. An imaging system, comprising:
a zoom lens as recited in claim 10, and
an imaging device having an image pickup plane located on an image side of said zoom lens, and adapted to convert an image formed by said zoom lens on said image pickup plane into electrical signals.

17. A zoom lens, comprising, in order from an object side thereof:
a first lens group having negative refracting power,
a second lens group having positive refracting power, and
a third lens group having positive refracting power, wherein, upon zooming from a wide-angle end to a telephoto end of said zoom lens,
said first lens group, said second zoom lens and said third lens group each move along an optical axis of said zoom lens,
a spacing between said first lens group and said second lens group becomes narrow, and
a spacing between said second lens group and said third lens group becomes wide, wherein:
said first lens group comprises one single lens that is a double-concave negative lens or two lenses: a double-concave negative lens and a positive lens,
said first lens group includes a total of at most two lenses,
said second lens group comprises two positive lenses and one negative lens,
said second lens group includes a total of three lenses,
at least one of said two positive lenses in said second lens group has an aspheric lens surface, and
the following condition (8) is satisfied:

$$0.4 < h_{1w}/IH < 0.5 \tag{8}$$

where $h_{1w}$ is a height of an axial marginal ray at an entrance surface in the first lens group at the wide-angle end and upon focusing on the farthest distance.

18. The zoom lens according to claim 17, which satisfies the following condition (9):

$$0.8 < h_{2w}/IH < 1.2 \tag{9}$$

where $h_{2w}$ is a height of an axial marginal ray at an entrance surface in the second lens group at the wide-angle end and upon focusing on the farthest distance.

19. The zoom lens according to claim 17, which satisfies the following condition (10):

$$0.4 < D_{2w}/f_w < 1.0 \tag{10}$$

where $D_{2w}$ is a spacing on the optical axis between the second lens group and the third lens group at the wide-angle end and upon focusing on the farthest distance, and $f_w$ is a focal length of the whole zoom lens system at the wide-angle end and upon focusing on the farthest distance.

20. The zoom lens according to claim 17, which satisfies the following condition (11):

$$0.4 < g_{3w}/g_{3t} < 0.88 \tag{11}$$

where $g_{3w}$ is a height of the most off-axis chief ray at an entrance surface in the third lens group at the wide-angle end and upon focusing on the farthest distance, and $g_{3t}$ is a height of the most off-axis chief ray at an entrance surface in the third lens group at the telephoto end and upon focusing on the farthest distance.

21. The zoom lens according to claim 17, which further comprises a fourth lens group located on an image side with respect to said third lens group and consisting of only one aspheric lens.

22. The zoom lens according to claim 21, wherein said third lens group and said fourth lens group are moved in an optical axis direction with a constant or varying spacing between them, thereby implementing focusing operation from focusing on the farthest distance to focusing on a near distance.

23. The zoom lens according to claim 17, wherein focusing operation from focusing on the farthest distance to focusing on a near distance is implemented by movement of said third lens group in an optical axis direction.

24. An imaging system, comprising:
a zoom lens as recited in claim 17, and
an imaging device having an image pickup plane located on an image side of said zoom lens, and adapted to convert an image formed by said zoom lens on said image pickup plane into electrical signals.

* * * * *